(12) United States Patent
Sasagawa et al.

(10) Patent No.: US 7,279,532 B2
(45) Date of Patent: Oct. 9, 2007

(54) MODIFIED HYDROGENATED COPOLYMER

(75) Inventors: Masahiro Sasagawa, Yokohama (JP); Shigeki Takayama, Tokyo (JP); Shigeru Sasaki, Yokohama (JP); Takahiro Hisasue, Yokohama (JP); Katsumi Suzuki, Kawasaki (JP); Shigeo Nakajima, Fujisawa (JP); Toshinori Shiraki, Yamato (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 330 days.

(21) Appl. No.: 10/500,610

(22) PCT Filed: Feb. 27, 2003

(86) PCT No.: PCT/JP03/02222

§ 371 (c)(1),
(2), (4) Date: Jul. 1, 2004

(87) PCT Pub. No.: WO03/074574

PCT Pub. Date: Sep. 12, 2003

(65) Prior Publication Data

US 2005/0119414 A1 Jun. 2, 2005

(30) Foreign Application Priority Data

| Mar. 1, 2002 | (JP) | 2002-55388 |
| Jun. 27, 2002 | (JP) | 2002-187325 |
| Jun. 28, 2002 | (JP) | 2002-189562 |
| Jul. 15, 2002 | (JP) | 2002-205350 |

(51) Int. Cl.
*C08F 36/14* (2006.01)
*C08F 236/10* (2006.01)
*C08C 19/02* (2006.01)
*C08C 19/22* (2006.01)

(52) U.S. Cl. .............. 525/332.9; 525/331.9; 525/338; 525/342; 525/374; 525/383

(58) Field of Classification Search ............. 525/332.9, 525/338, 331.9, 342, 374, 383
See application file for complete search history.

(56) References Cited

U.S. PATENT DOCUMENTS 5,043,396 A * 8/1991 Kitahara et al. ......... 525/332.9

FOREIGN PATENT DOCUMENTS

| JP | 56-30447 A | 3/1981 |
| JP | 2-158643 A | 6/1990 |
| JP | 3-185058 A | 8/1991 |
| JP | 6-287365 A | 10/1994 |
| JP | 9-316286 A | 12/1997 |
| WO | WO96/11241 A2 | 4/1996 |
| WO | WO98/12240 A1 | 3/1998 |

OTHER PUBLICATIONS

English language abstract of JP 9-316286 (Dec. 9, 1997).

* cited by examiner

*Primary Examiner*—Roberto Rabago
(74) *Attorney, Agent, or Firm*—Birch, Stewart, Kolasch & Birch, LLP

(57) ABSTRACT

A modified hydrogenated copolymer comprising a hydrogenated copolymer and a functional group-containing modifier group bonded to the hydrogenated copolymer, wherein the hydrogenated copolymer is obtained by hydrogenating an unhydrogenated copolymer comprising conjugated diene monomer units and vinyl aromatic monomer units, the unhydrogenated copolymer having at least one polymer block (H) of the vinyl aromatic monomer units, and wherein the modified hydrogenated copolymer has the following characteristics (1) to (4): (1) a content of the vinyl aromatic monomer units of from more than 60% by weight to less than 90% by weight, based on the weight of the hydrogenated copolymer, (2) a content of the polymer block (H) of from 0.1 to 40% by weight, based on the weight of the unhydrogenated copolymer, (3) a weight average molecular weight of from more than 100,000 to 1,000,000, and (4) a hydrogenation ratio of 70% or more, as measured with respect to the double bonds in the conjugated diene monomer units.

22 Claims, 1 Drawing Sheet

MODIFIED HYDROGENATED COPOLYMER

BACKGROUND OF THE INVENTION

1. Field of the Invention

The present invention relates to a modified hydrogenated copolymer. More particularly, the present invention is concerned with a modified hydrogenated copolymer comprising a hydrogenated copolymer and a functional group-containing modifier group bonded to the hydrogenated copolymer, wherein the hydrogenated copolymer is obtained by hydrogenating an unhydrogenated copolymer comprising conjugated diene monomer units and vinyl aromatic monomer units, the unhydrogenated copolymer having at least one polymer block (H) of vinyl aromatic monomer units, and wherein the content of the vinyl aromatic monomer units, content of the polymer block (H), weight average molecular weight, and hydrogenation ratio (as measured with respect to the double bonds in the conjugated diene monomer units) of the modified hydrogenated copolymer are, respectively, within specific ranges. The modified hydrogenated copolymer of the present invention not only has excellent flexibility, impact resilience, scratch resistance, abrasion resistance and handling property (anti-blocking property), but also exhibits excellent properties of adhesion to other resins and metals. The "anti-blocking property" means a resistance to adhesion phenomena (which is generally referred to as "blocking") wherein when, for example, stacked resin shaped articles or a rolled resin film (which have or has resin surfaces which are in contact with each other) are or is stored for a long time, unfavorably strong adhesion occurs between the resin surfaces, so that it becomes difficult to separate the resin surfaces from each other. Further, the present invention also relates to a modified hydrogenated copolymer composition comprising the above-mentioned modified hydrogenated copolymer (a), and at least one polymer (b) selected from the group consisting of a thermoplastic resin other than the modified hydrogenated copolymer (a) and a rubbery polymer other than the modified hydrogenated copolymer (a). The modified hydrogenated copolymer composition comprising the excellent modified hydrogenated copolymer of the present invention exhibits excellent properties, such as excellent tensile properties and abrasion resistance. Each of the modified hydrogenated copolymer and modified hydrogenated copolymer composition of the present invention can be advantageously used as a foam, various shaped articles, a building material, a vibration damping, soundproofing material, an electric wire coating material and the like.

2. Prior Art

A copolymer comprising a conjugated diene and a vinyl aromatic hydrocarbon (hereinafter, frequently referred to as a "conjugated diene/vinyl aromatic hydrocarbon copolymer") has unsaturated double bonds, so that such a copolymer have poor thermal stability, weatherability and ozone resistance. As a method for improving these properties of the conjugated diene/vinyl aromatic hydrocarbon copolymer, there has long been known a method in which the unsaturated double bonds of the copolymer are hydrogenated. Such a method is disclosed in, for example, Unexamined Japanese Patent Application Laid-Open Specification No. Sho 56-30447 and Unexamined Japanese Patent Application Laid-Open Specification No. Hei 2-36244.

On the other hand, a hydrogenation product of a conjugated diene/vinyl aromatic hydrocarbon block copolymer exhibits, even if not vulcanized, not only excellent elasticity at room temperature, which is comparable to that of a conventional vulcanized natural or synthetic rubber, but also excellent processability at high temperatures, which is comparable to that of a conventional thermoplastic resin. Therefore, the hydrogenated block copolymer is widely used in various fields, such as modifiers for plastics, adhesive agents, automobile parts, and parts for medical equipment. In recent years, it has been being attempted to obtain a random copolymer of a conjugated diene and a vinyl aromatic hydrocarbon, which has characteristics similar to those of the hydrogenated block copolymer.

For example, Unexamined Japanese Patent Application Laid-Open Specification No. Hei 2-158643 (corresponding to U.S. Pat. No. 5,109,069) discloses a composition containing a hydrogenated diene copolymer and a polypropylene resin, wherein the hydrogenated diene copolymer is obtained by hydrogenating a random copolymer of a conjugated diene and a vinyl aromatic hydrocarbon, which random copolymer has a vinyl aromatic hydrocarbon content of 3 to 50% by weight, a molecular weight distribution (weight average molecular weight (Mw)/number average molecular weight (Mn)) of 10 or less, and a vinyl bond content of 10 to 90% as measured with respect to the conjugated diene monomer units in the copolymer. Further, Unexamined Japanese Patent Application Laid-Open Specification No. Hei 6-287365 discloses a composition containing a hydrogenated diene copolymer and a polypropylene resin, wherein the hydrogenated diene copolymer is obtained by hydrogenating a random copolymer of a conjugated diene and a vinyl aromatic hydrocarbon, which random copolymer has a vinyl aromatic hydrocarbon content of 5 to 60% by weight, and a vinyl bond content of 60% or more as measured with respect to the conjugated diene monomer units in the copolymer.

With respect to the above-mentioned hydrogenated diene copolymers, it has been attempted to use the copolymers as substitutes for a flexible vinyl chloride resin. The flexible vinyl chloride resin causes environmental problems, such as generation of halogen gas when the resin is on fire, and generation of environmental hormones due to the plasticizer used in the resin. Therefore, there is a pressing need for development of a substitute material for the flexible vinyl chloride resin. However, the above-mentioned hydrogenated diene copolymers are unsatisfactory with respect to the properties (such as impact resilience, scratch resistance and abrasion resistance) which are needed for a material used as a substitute for the flexible vinyl chloride resin.

Further, with respect to molding materials containing the above-mentioned hydrogenated diene copolymer in combination with various thermoplastic resins or rubbers, it has been desired to improve the mechanical strength and abrasion resistance of the hydrogenated diene copolymer.

WO98/12240 discloses a molding material composed mainly of, as a polymer similar to the vinyl chloride resin, a hydrogenated block copolymer comprising a polymer block composed mainly of styrene and a polymer block composed mainly of butadiene and styrene. Further, Unexamined Japanese Patent Application Laid-Open Specification No. Hei 3-185058 discloses a resin composition comprising a polyphenylene ether resin, a polyolefin resin, and a hydrogenation product of a vinyl aromatic hydrocarbon/conjugated diene copolymer, wherein the same hydrogenated block copolymer as used in the above-mentioned WO98/12240 is used as the hydrogenation product of a vinyl aromatic hydrocarbon/conjugated diene copolymer. However, the hydrogenated copolymer used in each of the above-mentioned patent documents is a crystalline polymer and, hence, has poor flexibility and is not suitable for use as a substitute for the flexible vinyl chloride resin.

Thus, although there has been a pressing need for development of a substitute material for the flexible vinyl chloride resin, a material having excellent properties (such as flexibility and scratch resistance) which are comparable to those of the flexible vinyl chloride resin has not yet been obtained.

Further, the vinyl chloride resin and the above-mentioned substitute materials for the vinyl chloride resin are unsatisfactory with respect to the properties of adhesion to other resins and metals. Therefore, it has been desired to improve the adhesion properties of the vinyl chloride resin and the substitute materials therefor.

SUMMARY OF THE INVENTION

In this situation, the present inventors have made extensive and intensive studies with a view toward solving the above-mentioned problems accompanying the prior art. As a result, it has unexpectedly been found that the above-mentioned problem can be solved by a modified hydrogenated copolymer comprising a hydrogenated copolymer and a functional group-containing modifier group bonded to the hydrogenated copolymer, wherein the hydrogenated copolymer is obtained by hydrogenating an unhydrogenated copolymer comprising conjugated diene monomer units and vinyl aromatic monomer units, the unhydrogenated copolymer having at least one polymer block (H) of vinyl aromatic monomer units, and wherein the content of the vinyl aromatic monomer units, content of the polymer block (H), weight average molecular weight and hydrogenation ratio (as measured with respect to the double bonds in the conjugated diene monomer units) of the modified hydrogenated copolymer are, respectively, within specific ranges. The present invention has been completed based on this novel finding.

Accordingly, it is an object of the present invention to provide a modified hydrogenated copolymer which not only has excellent flexibility, impact resilience, scratch resistance, abrasion resistance and handling property (anti-blocking property), but also has excellent properties of adhesion to other resins and metals.

It is another object of the present invention to provide a modified hydrogenated copolymer composition obtained by blending the above-mentioned modified hydrogenated copolymer with a thermoplastic resin and/or rubbery polymer which are/is other than the modified hydrogenated copolymer, which composition has excellent properties, such as high tensile strength and abrasion resistance.

The foregoing and other objects, features and advantages of the present invention will be apparent from the following detailed description and appended claims taken in connection with the accompanying drawing.

DETAILED DESCRIPTION OF THE INVENTION

Figure 1:
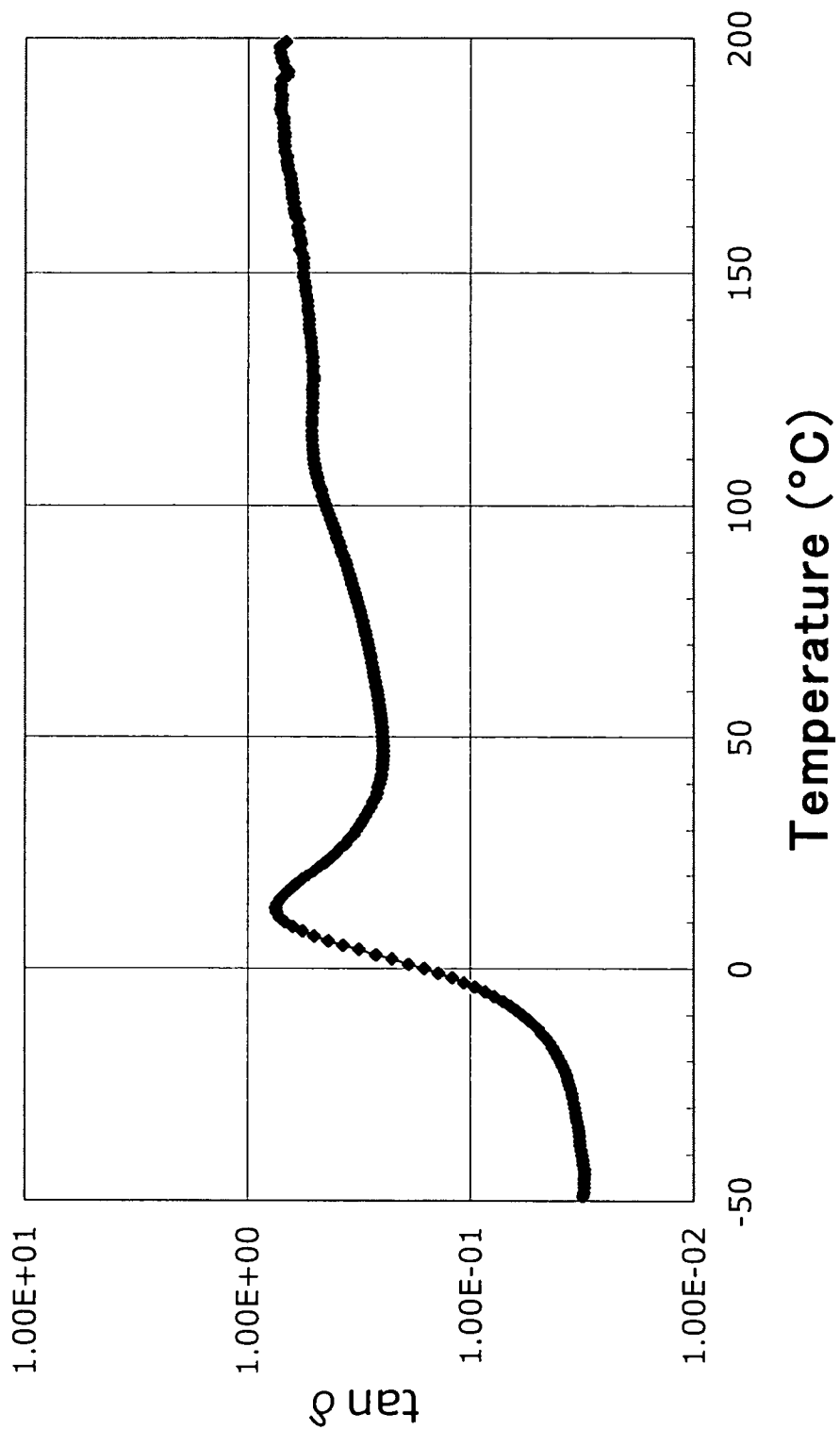
FIG. 1 is a chart showing a dynamic viscoelastic spectrum of the composition obtained in Example 20.

In one aspect of the present invention, there is provided a modified hydrogenated copolymer comprising:
a hydrogenated copolymer obtained by hydrogenating an unhydrogenated copolymer comprising conjugated diene monomer units and vinyl aromatic monomer units, the unhydrogenated copolymer having at least one polymer block (H) of the vinyl aromatic monomer units, and
a functional group-containing modifier group bonded to the hydrogenated copolymer,
the modified hydrogenated copolymer having the following characteristics (1) to (4):

(1) a content of the vinyl aromatic monomer units of from more than 60% by weight to less than 90% by weight, based on the weight of the hydrogenated copolymer, (2) a content of the polymer block (H) of from 0.1 to 40% by weight, based on the weight of the unhydrogenated copolymer, (3) a weight average molecular weight of from more than 100,000 to 1,000,000, and (4) a hydrogenation ratio of 70% or more, as measured with respect to the double bonds in the conjugated diene monomer units.

For easy understanding of the present invention, the essential features and various preferred embodiments of the present invention are enumerated below.

1. A modified hydrogenated copolymer comprising:
a hydrogenated copolymer obtained by hydrogenating an unhydrogenated copolymer comprising conjugated diene monomer units and vinyl aromatic monomer units, the unhydrogenated copolymer having at least one polymer block (H) of the vinyl aromatic monomer units, and
a functional group-containing modifier group bonded to the hydrogenated copolymer,
the modified hydrogenated copolymer having the following characteristics (1) to (4):

(1) a content of the vinyl aromatic monomer units of from more than 60% by weight to less than 90% by weight, based on the weight of the hydrogenated copolymer, (2) a content of the polymer block (H) of from 0.1 to 40% by weight, based on the weight of the unhydrogenated copolymer, (3) a weight average molecular weight of from more than 100,000 to 1,000,000, and (4) a hydrogenation ratio of 70% or more, as measured with respect to the double bonds in the conjugated diene monomer units.

2. The modified hydrogenated copolymer according to item 1 above, which is represented by a formula selected from the group consisting of the following formulae (I) to (V):

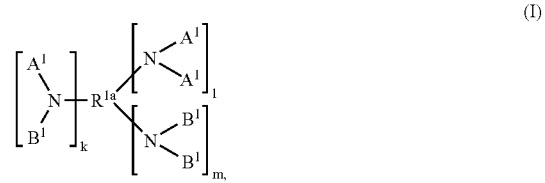

(I)

(II)

(III)

(IV)

(V)

wherein:

A¹ represents a unit which is represented by any one of the following formulae (a-1) and (b-1):

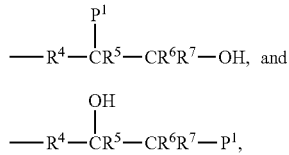

B¹ represents a unit which is represented by the following formula (c-1):

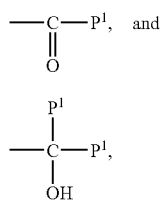

C¹ represents a unit which is represented by any one of the following formulae (d-1) and (e-1):

D¹ represents a unit which is represented by the following formula (f-1):

$$—R^8—NHR^3 \qquad (f-1)$$

E¹ represents a unit which is represented by the following formula (g-1):

$$—R^9—P^1, \qquad (g-1)$$

F¹ represents a unit which is represented by any one of the following formulae (h-1) to (j-1):

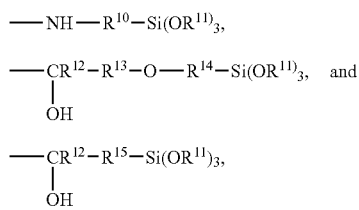

wherein, in the formulae (I) to (III) and (a-1) to (j-1):
N represents a nitrogen atom, Si represents a silicon atom, O represents an oxygen atom, C represents a carbon atom, and H represents a hydrogen atom,
P¹ represents the hydrogenated copolymer,
each of $R^{1a}$, $R^{1b}$, $R^3$, $R^4$, $R^8$ to $R^{10}$ and $R^{13}$ to $R^{15}$ independently represents a $C_1$-$C_{48}$ hydrocarbon group and optionally independently has at least one functional group selected from the group consisting of a hydroxyl group, an epoxy group, an amino group, a silanol group and a $C_1$-$C_{24}$ alkoxysilane group,
each of $R^2$ and $R^{11}$ independently represents a $C_1$-$C_{48}$ hydrocarbon group,
each of $R^5$ to $R^7$ and $R^{12}$ independently represents a hydrogen atom or a $C_1$-$C_{48}$ hydrocarbon group,
wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, the at least one atom being present in a linkage other than a hydroxyl group, an epoxy group, an amino group, a silanol group and an alkoxysilane group, and
each of k, l, m and o is independently an integer of 0 or more, provided that both k and l are not simultaneously 0, and n is an integer of 1 or more.

3. The modified hydrogenated copolymer according to item 1 above, which exhibits substantially no crystallization peak observed at −50 to 100° C. in a differential scanning calorimetry (DSC) chart obtained with respect to the modified hydrogenated copolymer.

4. The modified hydrogenated copolymer according to item 1 above, which has a molecular weight distribution of from 1.5 to 5.0.

5. The modified hydrogenated copolymer according to item 2 above, which is represented by the formula (I).

6. The modified hydrogenated copolymer according to item 2 above, which is represented by the formula (II).

7. The modified hydrogenated copolymer according to item 2 above, which is represented by the formula (III).

8. The modified hydrogenated copolymer according to item 2 above, which is represented by the formula (IV).

9. The modified hydrogenated copolymer according to item 2 above, which is represented by the formula (V).

10. The modified hydrogenated copolymer according to any one of items 1 to 4 above, which is a foam.

11. The modified hydrogenated copolymer according to any one of items 1 to 4 above, which is a shaped article.

12. The modified hydrogenated copolymer according to item 11 above, which is a multilayer film or a multilayer sheet.

13. The modified hydrogenated copolymer according to item 11 above, which is a shaped article produced by a method selected from the group consisting of an extrusion molding, an injection molding, a blow molding, an air-pressure molding, a vacuum molding, a foam molding, a multilayer extrusion molding, a multilayer injection molding, a high frequency weld molding, a slush molding and a calender molding.

14. The modified hydrogenated copolymer according to any one of items 1 to 4 above, which is a building material, a vibration damping, soundproofing material or an electric wire coating material.

15. A crosslinked, modified hydrogenated copolymer obtained by subjecting the modified hydrogenated copolymer of any one of items 1 to 4 above to a crosslinking reaction in the presence of a vulcanizing agent.

16. A modified hydrogenated copolymer composition comprising:
1 to 99 parts by weight, relative to 100 parts by weight of the total of components (a) and (b), of (a) the modified hydrogenated copolymer of any one of items 1 to 4 above, and
99 to 1 part by weight, relative to 100 parts by weight of the total of components (a) and (b), of (b) at least one polymer selected from the group consisting of a thermoplastic resin other than the modified hydrogenated copolymer (a) and a rubbery polymer other than the modified hydrogenated copolymer (a).
17. The modified hydrogenated copolymer composition according to item 16 above, which is a foam.
18. The modified hydrogenated copolymer composition according to item 16 above, which is a shaped article.
19. The modified hydrogenated copolymer composition according to item 18 above, which is a multilayer film or a multilayer sheet.
20. The modified hydrogenated copolymer composition according to item 18 above, which is a shaped article produced by a method selected from the group consisting of an extrusion molding, an injection molding, a blow molding, an air-pressure molding, a vacuum molding, a foam molding, a multilayer extrusion molding, a multilayer injection molding, a high frequency weld molding, a slush molding and a calender molding.
21. The modified hydrogenated copolymer composition according to item 16 above, which is a building material, a vibration damping, soundproofing material or an electric wire coating material.
22. A crosslinked, modified hydrogenated copolymer composition obtained by subjecting the modified hydrogenated copolymer composition of item 16 above to a crosslinking reaction in the presence of a vulcanizing agent.

Hereinbelow, the present invention is described in detail.

In the present invention, the monomer units of the polymer are named in accordance with a nomenclature wherein the names of the original monomers from which the monomer units are derived are used with the term "monomer unit" attached thereto. For example, the term "vinyl aromatic monomer unit" means a monomer unit which is formed in a polymer obtained by the polymerization of the vinyl aromatic monomer. The vinyl aromatic monomer unit has a molecular structure wherein the two carbon atoms of a substituted ethylene group derived from a substituted vinyl group respectively form linkages to adjacent vinyl aromatic monomer units. Similarly, the term "conjugated diene monomer unit" means a monomer unit which is formed in a polymer obtained by the polymerization of the conjugated diene monomer. The conjugated diene monomer unit has a molecular structure wherein the two carbon atoms of an olefin corresponding to the conjugated diene monomer respectively form linkages to adjacent conjugated diene monomer units.

The modified hydrogenated copolymer of the present invention comprises a hydrogenated copolymer obtained by hydrogenating an unhydrogenated copolymer comprising conjugated diene monomer units and vinyl aromatic monomer units, and a functional group-containing modifier group (i.e., at least one modifier group having at least one functional group) bonded to the hydrogenated copolymer. The modified hydrogenated copolymer of the present invention has a content of the vinyl aromatic monomer units of from more than 60% by weight to less than 90% by weight, based on the weight of the hydrogenated copolymer. When the content of the vinyl aromatic monomer units is more than 60% by weight, the modified hydrogenated copolymer exhibits excellent scratch resistance. When the content of the vinyl aromatic monomer units is less than 90% by weight, the modified hydrogenated copolymer is advantageous not only in that it exhibits excellent flexibility and impact resilience, but also in that a resin composition containing such a modified hydrogenated copolymer exhibits excellent tensile properties and abrasion resistance. The content of the vinyl aromatic monomer units is preferably in the range of from 62 to 88% by weight, more preferably from 64 to 86% by weight, still more preferably from 65 to 80% by weight. The content of the vinyl aromatic monomer units can be measured by means of an ultraviolet spectrophotometer. In the present invention, the content of the vinyl aromatic monomer units in the copolymer prior to the hydrogenation (i.e., unhydrogenated copolymer) may be used as the content of the vinyl aromatic monomer units in the hydrogenated copolymer of the present invention. Further, the content of the vinyl aromatic monomer unit can be measured either prior to or after the modification.

In the modified hydrogenated copolymer of the present invention, from the viewpoint of flexibility and scratch resistance of the modified hydrogenated copolymer, the content of the polymer block (H) of vinyl aromatic monomer units (hereinafter, frequently referred to as "vinyl aromatic polymer block (H)") is in the range of from 0.1 to 40% by weight, preferably 1 to 40% by weight, more preferably from 5 to 35% by weight, still more preferably from 10 to 30% by weight, most preferably from 13 to 20% by weight, based on the weight of the unhydrogenated copolymer. In the present invention, the content of the vinyl aromatic polymer block (H) can be measured by the following method. The weight of the vinyl aromatic polymer block (H) is obtained by a method in which the unhydrogenated copolymer is subjected to oxidative degradation in the presence of osmium tetraoxide as a catalyst using tert-butyl hydroperoxide (i.e., method described in I. M. KOLTHOFF et al., J. Polym. Sci. 1, 429 (1946)) (hereinafter, frequently referred to as "osmium tetraoxide degradation method"). Using the obtained weight of the vinyl aromatic polymer block (H), the content of the vinyl aromatic polymer block (H) in the hydrogenated copolymer is calculated by the following formula, with the proviso that, among the polymer chains (formed by the oxidative degradation) corresponding to the vinyl aromatic polymer blocks (H), the polymer chains having an average polymerization degree of 30 or less are not taken into consideration in the measurement of the content of the vinyl aromatic polymer block (H).

$$\text{Content of the vinyl aromatic polymer block }(H)\ (\%\text{ by weight}) = $$
$$(\text{weight of the vinyl aromatic polymer block }(H)\text{ in the copolymer prior to the hydrogenation/weight of the copolymer prior to the hydrogenation}) \times 100.$$

The content of the vinyl aromatic polymer block (H) can be measured either prior to or after the modification.

In the present invention, the vinyl aromatic polymer block (H) content of the modified hydrogenated copolymer can also be measured by a method using a nuclear magnetic resonance (NMR) apparatus (i.e., NMR method which is described in Y. Tanaka et al., "RUBBER CHEMISTRY and TECHNOLOGY 54", 685 (1981), published by American Chemical Society, Inc., U.S.A.). However, in the present invention, the vinyl aromatic polymer block (H) content measured by the above-mentioned osmium tetraoxide degradation method (which is simpler than the NMR method) is used as the vinyl aromatic polymer block (H) content of the modified hydrogenated copolymer. There is a correlation between the vinyl aromatic polymer block (H) content of an unhydrogenated copolymer (hereinafter, referred to as an "Os value") obtained by the osmium tetraoxide degradation method and the vinyl aromatic polymer block (H) content of a modified hydrogenated copolymer (hereinafter, referred to as an "Ns value") obtained by the NMR method. More specifically, as a result of the studies made with respect to various copolymers having different contents of vinyl aromatic polymer block (H), it has been found that the above-mentioned correlation is represented by the following formula:

$$Os \text{ value} = -0.012(Ns \text{ value})^2 + 1.8(Ns \text{ value}) - 13.0.$$

In the present invention, when the vinyl aromatic polymer block (H) content is obtained by the NMR method, the obtained Ns value is converted into the Os value, utilizing the above-mentioned formula representing the correlationship between the Os value and the Ns value.

The modified hydrogenated copolymer of the present invention has a weight average molecular weight of from more than 100,000 to 1,000,000. When the weight average molecular weight is more than 100,000, the modified hydrogenated copolymer exhibits excellent anti-blocking property, impact resilience and scratch resistance. When the weight average molecular weight is 1,000,000 or less, the modified hydrogenated copolymer exhibits excellent moldability. The weight average molecular weight of the modified hydrogenated copolymer is preferably in the range of from 130,000 to 800,000, more preferably from 150,000 to 500,000. The weight average molecular weight can be measured by gel permeation chromatography (GPC) using a calibration curve obtained using a chromatogram of standard polystyrene samples commercially available. The weight average molecular weight is measured after modifying the copolymer. However, the weight average molecular weight can be measured either prior to or after the hydrogenation.

With respect to the molecular weight distribution of the modified hydrogenated copolymer, there is no particular limitation; however, from the viewpoint of moldability thereof, the molecular weight distribution is preferably in the range of from 1.5 to 5.0, more preferably from 1.6 to 4.5, still more preferably from 1.8 to 4.0. The molecular weight distribution can also be obtained by GPC as in the case of the measurement of the weight average molecular weight, in terms of a ratio (Mw/Mn) of the weight average molecular weight (Mw) to the number average molecular weight (Mn).

In the modified hydrogenated copolymer of the present invention, the hydrogenation ratio is 70% or more, as measured with respect to the double bonds in the conjugated diene monomer units in the modified hydrogenated copolymer. Due to such a high hydrogenation ratio of the double bonds of the conjugated diene monomer units, the modified hydrogenated copolymer of the present invention exhibits excellent scratch resistance and anti-blocking property. In the present invention, the hydrogenation ratio is preferably 80% or more, more preferably 85% or more, still more preferably 90% or more, still more preferably 95% or more. With respect to the copolymer prior to the hydrogenation (unhydrogenated copolymer), the vinyl bond content of the conjugated diene monomer units can be measured by a method (Hampton method) using an infrared spectrometer. The hydrogenation ratio of the modified hydrogenated copolymer can be measured by means of a nuclear magnetic resonance (NMR) apparatus.

From the viewpoint of the desired flexibility of the modified hydrogenated copolymer, it is preferred that the modified hydrogenated copolymer of the present invention has a characteristic that substantially no crystallization peak is observed at −50 to 100° C. in a differential scanning calorimetry (DSC) chart obtained with respect to the modified hydrogenated copolymer. The modified hydrogenated copolymer having such a characteristic is advantageous for achieving the object of the present invention, that is to provide a substitute material for the flexible vinyl chloride resin. In the present invention, "substantially no crystallization peak is observed at −50 to 100° C." means that no peak indicating the occurrence of crystallization (i.e., crystallization peak) is observed within the above-mentioned temperature range, or that a crystallization peak is observed within the above-mentioned temperature range but the quantity of heat at the crystallization peak is less than 3 J/g, preferably less than 2 J/g, more preferably less than 1 J/g. In the present invention, it is most preferred that no crystallization peak is observed within the above-mentioned temperature range. The modified hydrogenated copolymer exhibiting substantially no crystallization peak at −50 to 100° C. can be obtained by the use of an unhydrogenated copolymer which is obtained by a polymerization reaction conducted using the below-described vinyl bond formation-controlling agent under the below-described conditions.

It is one of the characteristic features of the modified hydrogenated copolymer of the present invention that the modified hydrogenated copolymer exhibits excellent flexibility, so that the modified hydrogenated copolymer exhibits a low value with respect to the 100% modulus in a tensile test. It is recommended that the 100% modulus of the modified hydrogenated copolymer of the present invention is 120 kg/cm² or less, preferably 90 kg/cm² or less, more preferably 60 kg/cm² or less.

In the present invention, the conjugated diene monomer is a diolefin having a pair of conjugated double bonds. Examples of conjugated diene monomers include 1,3-butadiene, 2-methyl-1,3-butadiene (isoprene), 2,3-dimethyl-1,3-butadiene, 1,3-pentadiene, 2-methyl-1,3-pentadiene and 1,3-hexadiene. Of these, especially preferred are 1,3-butadiene and isoprene. The above conjugated diene monomer can be used individually or in combination. Examples of vinyl aromatic monomers include styrene, α-methylstyrene, p-methylstyrene, divinylbenzene, 1,1-diphenylethylene, N,N-dimethyl-p-aminoethylstyrene and N,N-diethyl-p-aminoethylstyrene. Of these, styrene is preferred. These vinyl aromatic monomers can be used individually or in combination.

In the present invention, the microstructure (including the amounts of a cis bond, a trans bond and a vinyl bond) of the conjugated diene monomer units in the copolymer prior to the hydrogenation can be appropriately controlled by using the below-described polar compound and the like. When 1,3-butadiene (which is addition-polymerized through a cis-1,4 bond, a trans-1,4 bond or a 1,2-vinyl bond) is used as the conjugated diene monomer, it is generally recommended that the 1,2-vinyl bond content is in the range of from 5 to 80 mol %, preferably from 10 to 60 mol %, still more preferably from 12 to 50 mol %, still more preferably 12 to 30 mol %, based on the total molar amount of the cis-1,4 bond, trans-1,4 bond and 1,2-vinyl bond. For obtaining a copolymer having excellent flexibility, it is preferred that the 1,2-vinyl bond content is 12 mol % or more. When isoprene solely or a combination of 1,3-butadiene and isoprene is used as the conjugated diene monomer, it is generally recommended that the total content of the 1,2-vinyl bond and 3,4-vinyl bond is in the range of from 3 to 75 mol %, preferably from 5 to 60 mol %, based on the total molar amount of the cis-1,4 bond, trans-1,4 bond, 1,2-vinyl bond and 3,4-vinyl bond. In the present invention, the total content of the 1,2-vinyl bond and 3,4-vinyl bond (or the content of the 1,2-vinyl bond in the case where 1,3-butadiene is used as the conjugated diene monomer) is defined as the vinyl bond content.

Further, in the present invention, from the viewpoint of the desired impact resilience of the hydrogenated copolymer, it is recommended that the difference between the maximum value and minimum value of the vinyl bond content of the unhydrogenated copolymer is less than 10 mol %, preferably 8 mol % or less, more preferably 6 mol % or less. The difference between the maximum value and minimum value of the vinyl bond content of the unhydrogenated copolymer can be obtained by the following method. For example, in the case where the production of the unhydrogenated copolymer is conducted in a batchwise manner in which monomers are stepwise fed to the reactor, a sample of the copolymer is taken just before each of the monomer feeding steps, and the vinyl bond content is measured with respect to each of the obtained samples. With respect to the obtained values of the vinyl bond content, the difference between the maximum value and the minimum value is calculated. In the unhydrogenated copolymer, the vinyl bonds may be uniformly distributed or may be distributed in a tapered configuration. The difference in the vinyl bond content between the above-mentioned samples is caused by the influence of polymerization conditions, such as the type and amount of the vinyl bond formation-controlling agent (such as a tertiary amine compound or an ether compound) and polymerization reaction temperature. Therefore, the difference between the maximum value and minimum value of the vinyl bond content of the unhydrogenated copolymer can be controlled by, for example, adjusting the polymerization reaction temperature. When the type and amount of the vinyl bond formation-controlling agent (such as a tertiary amine or an ether compound) are not changed during the polymerization reaction, the amount of the vinyl bonds formed in the resultant copolymer is influenced only by the polymerization reaction temperature. Therefore, in this case, when the polymerization reaction is conducted at a constant polymerization reaction temperature, the vinyl bonds are uniformly distributed in the resultant copolymer. On the other hand, when the polymerization is conducted while elevating the polymerization reaction temperature, the resultant copolymer has a non-uniform distribution with respect to the vinyl bonds, wherein a portion of the copolymer which is formed at an early stage of the polymerization (where the polymerization reaction temperature is low) has a high vinyl bond content and a portion of the copolymer which is formed at a late stage of the polymerization (where the polymerization reaction temperature is high) has a low vinyl bond content. Therefore, in the present invention, it is recommended that the difference between the highest reaction temperature and the lowest reaction temperature is 20° C. or less, preferably 15° C. or less, more preferably 10° C. or less.

The modified hydrogenated copolymer of the present invention is produced as follows. Firstly, an unmodified, unhydrogenated copolymer (hereinafter, frequently referred to as a "base copolymer") is produced and, then, the produced base copolymer is subjected to modification followed by hydrogenation. Alternatively, the base copolymer is subjected to hydrogenation followed by modification.

The base copolymer can be produced, for example, by a living anionic polymerization conducted in a hydrocarbon solvent using a polymerization initiator, such as an organic alkali metal compound. Examples of hydrocarbon solvents include aliphatic hydrocarbons, such as n-butane, isobutane, n-pentane, n-hexane, n-heptane and n-octane; alicyclic hydrocarbons, such as cyclohexane, cycloheptane and methylcycloheptane; and aromatic hydrocarbons, such as benzene, toluene, xylene and ethylbenzene.

As the polymerization initiator, it is possible to use aliphatic hydrocarbon-alkali metal compounds, aromatic hydrocarbon-alkali metal compounds, organic amino-alkali metal compounds, which are generally known to have a living anionic polymerization activity with respect to a conjugated diene and a vinyl aromatic compound. Examples of alkali metals include lithium, sodium and potassium. As preferred examples of organic alkali metal compounds, there can be mentioned lithium compounds having at least one lithium atom in a molecule of $C_1$-$C_{20}$ aliphatic or aromatic hydrocarbons (such as a dilithium compound, a trilithium compound and a tetralithium compound). Specific examples of lithium compounds include n-propyllithium, n-butyllithium, sec-butyllithium, tert-butyllithium, a reaction product of diisopropenylbenzene and sec-butyllithium, and a reaction product obtained by reacting divinylbenzene, sec-butyllithium and a small amount of 1,3-butadiene. Further, it is also possible to use any of the organic alkali metal compounds described in U.S. Pat. No. 5,708,092, GB Patent No. 2,241,239 and U.S. Pat. No. 5,527,753.

In the present invention, when the copolymerization of a conjugated diene monomer and a vinyl aromatic monomer is performed in the presence of the organic alkali metal compound as a polymerization initiator, it is possible to use a tertiary amine compound or an ether compound as a vinyl bond formation-controlling agent, which is used for controlling the amount of vinyl bonds (i.e., a 1,2-vinyl bond and a 3,4-vinyl bond) formed by the conjugated diene monomers, and for controlling the occurrence of a random copolymerization of a conjugated diene and a vinyl aromatic compound. As the tertiary amine compound, it is possible to use a compound represented by the formula: $R^{16}R^{17}R^{18}N$, wherein each of $R^{16}$, $R^{17}$ and $R^{18}$ independently represents a $C_1$-$C_{20}$ hydrocarbon group or a $C_1$-$C_{20}$ hydrocarbon group substituted with a tertiary amino group. Specific examples of tertiary amine compounds include N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine and N,N'-dioctyl-p-phenylenediamine.

As the above-mentioned ether compound, it is possible to use a linear ether compound and a cyclic ether compound. Examples of linear ether compounds include dimethyl ether; diethyl ether; diphenyl ether; ethylene glycol dialkyl ethers, such as ethylene glycol dimethyl ether, ethylene glycol diethyl ether and ethylene glycol dibutyl ether; and diethylene glycol dialkyl ethers, such as diethylene glycol dimethyl ether, diethylene glycol diethyl ether and diethylene glycol dibutyl ether. Examples of cyclic ether compounds include tetrahydrofuran, dioxane, 2,5-dimethyloxolane, 2,2,5,5-tetramethyloxolane, 2,2-bis(2-oxolanyl)propane and an alkyl ether of a furfuryl alcohol.

In the present invention, the copolymerization of a conjugated diene monomer and a vinyl aromatic monomer in the presence of the organic alkali metal compound as a polymerization initiator can be conducted either in a batchwise manner or in a continuous manner. Further, the copolymerization may be conducted in a manner wherein a batchwise operation and a continuous operation are used in combination. For achieving a molecular weight distribution suitable for improving the processability of the modified hydrogenated copolymer, it is preferred to conduct the copolymerization in a continuous manner. The reaction temperature for the copolymerization is generally in the range of from 0 to 180° C., preferably from 30 to 150° C. The reaction time for the copolymerization varies depending on other conditions, but is generally within 48 hours, preferably in the range of from 0.1 to 10 hours. It is preferred that the atmosphere of the copolymerization reaction system is an atmosphere of an inert gas, such as nitrogen gas. With respect to the polymerization reaction pressure, there is no particular limitation so long as the pressure is sufficient for maintaining each of the monomers and the solvent in a liquid state. Further, care must be taken to prevent the intrusion of impurities (such as water, oxygen and carbon dioxide), which deactivate the catalyst and/or the living polymer, into the polymerization reaction system.

With respect to the structure of the modified hydrogenated copolymer of the present invention, there is no particular limitation, and the modified hydrogenation copolymer may have any structure. For example, use can be made of a modified hydrogenated copolymer having a structure represented by a formula selected from the group consisting of the following formulae:

$(S-H)_n-Y$, $(H-S)_n-Y$, $H-(S-H)_n-Y$, $S-(H-S)_n-Y$, $Y-(H-S)_n-Y$, $Y-H-(S-H)_n-Y$, $Y-S-(H-S)_n-Y$, $[(S-H)_n]_m-Y$, $[(H-S)_n]_mY$, $[(S-H)_nS]_mY$, $[(H-S)_n-H]_m-Y$, $[(S-H)_n]_m-Y-(H)_p$, and $[(H-S)_n-H]_m-Y-(H)_p$.

wherein each S independently represents a random copolymer block comprised of conjugated diene monomer units and vinyl aromatic monomer units, each H independently represents a polymer block of vinyl aromatic monomer units, each Y independently represents a modifier group having at least one functional group, m represents an integer of 2 or more, preferably in the range of from 2 to 10, and each of n and p independently represents an integer of 1 or more, preferably in the range of from 1 to 10. When Y is addition-bonded to the block copolymer by a metalation reaction (described below), Y is bonded to a side chain of polymer block S and/or H.

It is especially preferred that the modified hydrogenated copolymer of the present invention is a hydrogenation product of a modified copolymer having a structure selected from the group consisting of the below-mentioned formulae (a) to (h). From the viewpoint of productivity and flexibility of the hydrogenated copolymer, it is especially preferred to use the copolymer of the below-mentioned formulae (a) and (b). In the present invention, the modified hydrogenated copolymer may be in the form of a mixture of hydrogenated products of at least two modified copolymers selected from the group consisting of the below-mentioned modified copolymer of formulae (a) to (h). Further, the modified hydrogenated copolymer of the present invention may be in the form of a mixture thereof with a vinyl aromatic polymer or a modified vinyl aromatic polymer.

(a) S—H—Y,
(b) H—S—Y,
(c) S—H—S—Y,
(d) H—S—H—Y,
(e) Y—S—H—S—Y,
(f) $(S-H)_m-Y$,
(g) $(H-S)_m-Y$,
(h) $(S-H)_n-Y-(H)_p$ wherein each of S, H, Y, m, n and p is as defined for formulae above.

With respect to each of the copolymers of the above formulae (a) to (h), there is no particular limitation with respect to the distribution of the vinyl aromatic monomer units in the random copolymer block S. For example, the vinyl aromatic monomer units may be uniformly distributed or may be distributed in a tapered configuration in the random copolymer block S. The random block copolymer S may have a plurality of segments in which the vinyl aromatic monomer units are uniformly distributed and/or may have a plurality of segments in which the vinyl aromatic monomer units are distributed in a tapered configuration. Further, the random copolymer block S may have a plurality of segments having different vinyl aromatic monomer unit contents. When the block copolymer comprises a plurality of polymer blocks S and a plurality of polymer blocks H, the structures of polymer blocks S are the same or different, and the structures of polymer blocks H are the same or different. Further, the structures of the polymer chains each having Y bonded thereto are the same or different.

The modified hydrogenated copolymer of the present invention comprises a hydrogenated copolymer obtained by hydrogenating an unhydrogenated copolymer comprising conjugated diene monomer units and vinyl aromatic monomer units, and a functional group-containing modifier group (i.e., at least one modifier group having at least one functional group) bonded to the hydrogenated copolymer. As functional groups contained in the modifier group, there can be mentioned, for example, a polar group selected from the group consisting of a hydroxide group, a carboxylic group, a carbonyl group, a thiocarbonyl group, an acid halide group, an acid anhydride group, a carboxylic acid group, a thiocarboxylic acid group, an aldehyde group, a thioaldehyde group, a carboxylic ester group, an amide group, a sulfonic acid group, a sulfonic ester group, a phosphoric acid group, a phosphoric ester group, an amino group, an imino group, a nitrile group, a pyridyl group, a quinolinic group, an epoxy group, a thioepoxy group, a sulfide group, an isocyanate group, an isothiocyanate group, a silicon halide group, a silanol group, a silicon alkoxide group, a tin halide group, a tin alkoxide group and a phenyltin group.

It is preferred that the modified hydrogenated copolymer of the present invention is represented by a formula selected from the group consisting of the following formulae (I) to (V):

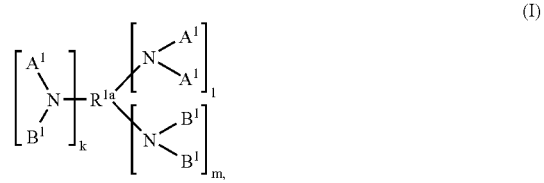

(I)

(II)

$C^1-NR^3-D^1$, (III)

$C^1-D^1$, and (IV)

$E^1-F^1$, (V)

wherein:

$A^1$ represents a unit which is represented by any one of the following formulae (a-1) and (b-1):

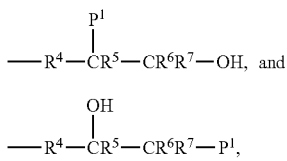  (a-1)

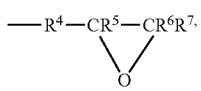  (b-1)

$B^1$ represents a unit which is represented by the following formula (c-1):

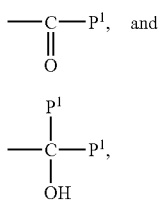  (c-1)

$C^1$ represents a unit which is represented by any one of the following formulae (d-1) and (e-1):

  (d-1)

  (e-1)

$D^1$ represents a unit which is represented by the following formula (f-1):

—$R^8$—$NHR^3$,  (f-1)

$E^1$ represents a unit which is represented by the following formula (g-1):

—$R^9$—$P^1$, and  (g-1)

$F^1$ represents a unit which is represented by any one of the following formulae (h-1) to (j-1):

—NH—$R^{10}$—Si(O$R^{11}$)$_3$  (h-1)

  (h-1)

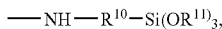  (i-1)

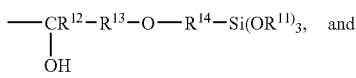

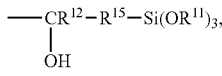  (j-1)

wherein, in the formulae (I) to (III) and (a-1) to (j-1):

N represents a nitrogen atom, Si represents a silicon atom, O represents an oxygen atom, C represents a carbon atom, and H represents a hydrogen atom, $P^1$ represents the hydrogenated copolymer, each of $R^{1a}$, $R^{1b}$, $R^3$, $R^4$, $R^8$ to $R^{10}$ and $R^{13}$ to $R^{15}$ independently represents a $C_1$-$C_{48}$ hydrocarbon group and optionally independently has at least one functional group selected from the group consisting of a hydroxyl group, an epoxy group, an amino group, a silanol group and a $C_1$-$C_{24}$ alkoxysilane group, each of $R^2$ and $R^{11}$ independently represents a $C_1$-$C_{48}$ hydrocarbon group, each of $R^5$ to $R^7$ and $R^{12}$ independently represents a hydrogen atom or a $C_1$-$C_{48}$ hydrocarbon group, wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, the at least one atom being present in a linkage other than a hydroxyl group, an epoxy group, an amino group, a silanol group and an alkoxysilane group, and each of k, l, m and o is independently an integer of 0 or more, provided that both k and l are not simultaneously 0, and n is an integer of 1 or more.

In the formulae (I) to (III) and (a-1) to (j-1) above, specific examples of $R^{1a}$ to $R^{15}$ are as follows.

$R^{1a}$ represents a $C_1$-$C_{48}$ trivalent aliphatic hydrocarbon group;

each of $R^{1b}$, $R^4$, $R^8$ to $R^{10}$ and $R^{13}$ to $R^{15}$ independently represents a $C_1$-$C_{48}$ alkylene group;

each of $R^2$, $R^3$ and $R^{11}$ independently represents a $C_1$-$C_{48}$ alkylene group, a $C_6$-$C_{48}$ aryl group, a $C_7$-$C_{48}$ alkylaryl group, a $C_7$-$C_{48}$ aralkyl group or a $C_3$-$C_{48}$ cycloalkyl group;

each of $R^5$ to $R^7$ and $R^{12}$ independently represents a hydrogen atom or a $C_1$-$C_{48}$ alkyl group, a $C_6$-$C_{48}$ aryl group, a $C_7$-$C_{48}$ alkylaryl group, a $C_7$-$C_{48}$ aralkyl group or a $C_3$-$C_{48}$ cycloalkyl group;

wherein, as mentioned above, each of $R^{1a}$, $R^{1b}$, $R^3$, $R^4$, $R^8$ to $R^{10}$ and $R^{13}$ to $R^{15}$ optionally independently has at least one functional group selected from the group consisting of a hydroxyl group, an epoxy group, an amino group, a silanol group and a $C_1$-$C_{24}$ alkoxysilane group, and each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, the at least one atom being present in a linkage other than a hydroxyl group, an epoxy group, an amino group, a silanol group and an alkoxysilane group.

The modified copolymer prior to hydrogenation can be produced, for example, by a process in which a base copolymer having a living terminal is produced by a living anionic polymerization, and a modifier containing the above-mentioned functional group is addition-bonded to the living terminal of the base copolymer to obtain a modified copolymer. As the modifiers for producing the modified copolymer, for example, use can be made of the terminal modifiers described in Examined Japanese Patent Application Publication No. Hei 4-39495. The modified hydrogenated copolymers obtained using the modifiers described in the above-mentioned patent document are represented by, for example, the above-mentioned formulae (I) to (V).

As mentioned above, as a method for modifying a copolymer in the present invention, there can be mentioned method in which the functional group-containing modifier is addition-bonded to the living terminal of the base copolymer which is obtained by a living anionic polymerization. The functional group of the modifier may be protected by a conventional method. As another method for producing the modified copolymer, there can be mentioned a method in which an organic alkali metal compound, such as an organolithium compound, is addition-bonded to a base copolymer which does not have a living terminal (this addition reaction is called "metalation reaction"), followed by the addition-bonding of a modifier to the base copolymer. In this method, the base copolymer may be hydrogenated before the metalation reaction and the subsequent addition-bonding of the modifier.

In the present invention, in either of the above-mentioned modification methods, the reaction temperature for the modification of the base copolymer is preferably in the range of from 0 to 150° C., more preferably 20 to 120° C. The reaction time for the modification reaction varies depending on other conditions, but it is preferably within 24 hours, advantageously 0.1 to 10 hours.

When the base copolymer is reacted with a modifier, it is possible that a hydroxyl group, an amino group and the like, which are contained in the resultant modifier group of the modified copolymer, are converted to alkali metal salts thereof, depending on the type of modifier. In such case, the alkali metal salts can be reconverted back to functional groups (i.e., a hydroxyl group, an amino group and the like) by reacting the alkali metal salts with an active hydrogen-containing compound, such as water, an alcohol, an inorganic acid and the like.

In the present invention, a modified copolymer obtained by addition-bonding of the modifier to the living terminal of the base copolymer, may contain an unmodified copolymer fraction. It is recommended that the amount of such unmodified copolymer fraction in the modified block copolymer is preferably not more than 70% by weight, more preferably not more than 60% by weight, still more preferably not more than 50% by weight, based on the weight of the modified copolymer.

Examples of modifiers used in the present invention for producing the modified copolymer having a functional group-containing modifier group (i.e., at least one modifier group having at least one functional group) bonded thereto are as follows.

Examples of modifiers used for producing a modified hydrogenated copolymer represented by the above-mentioned formula (I) or (II) include polyepoxy compounds, such as tetraglycidyl-m-xylenediamine, tetraglycidyl-1,3-bisaminomethylcyclohexane, tetraglycidyl-p-phenylenediamine, tetraglycidyldiaminodiphenylmethane, diglycidylaniline, diglycidyl-o-toluidine, 4,4'-diglycidyl-diphenylmethylamine, 4,4'-diglycidyl-dibenzylmethylamine and diglycidyl-aminomethylcyclohexane.

Examples of modifiers used for producing a modified hydrogenated copolymer represented by the above-mentioned formula (V) include γ-glycidoxyethyltrimethoxysilane, γ-glycidoxypropyltrimethoxysilane, γ-glycidoxybutyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane, γ-glycidoxypropyldimethylethoxysilane, γ-glycidoxypropyldimethylphenoxysilane, γ-glycidoxypropyldiethylmethoxysilane, γ-glycidoxypropylmethyldiisopropeneoxysilane, bis(γ-glycidoxypropyl)dimethoxysilane and bis(γ-glycidoxypropyl)diethoxysilane.

Further examples of such modifiers include bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methyl-phenoxysilane, tris(γ-glycidoxypropyl)methoxysilane, γ-methacryloxypropyltrimethoxysilane, γ-methacryloxypropyltriethoxysilane, γ-methacryloxymethyltrimethoxy-silane, γ-methacryloxyethyltriethoxysilane, bis(γ-methacryloxypropyl)dimethoxysilane and tris(γ-methacryloxypropyl)methoxysilane.

Still further examples of such modifiers include β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)ethyl-tributoxysilane and β-(3,4-epoxycyclohexyl)ethyl-triphenoxysilane.

Still further examples of such modifiers include β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethyethoxysilane, β-(3,4-epoxycyclohexyl)ethyl-dimethylpropoxysilane, β-(3,4-epoxycyclohexyl)ethyl-dimethylbutoxysilane and β-(3,4-epoxycyclohexyl)ethyl-dimethylphenoxysilane.

Still further examples of such modifiers include β-(3,4-epoxycyclohexyl)ethyl-diethylmethoxysilane, β-(3,4-epoxycyclohexyl)ethyl-methyldiisopropeneoxysilane and N-(1,3-dimethylbutylidene)-3-(triethoxysilyl)-1-propaneamine.

Examples of modifiers used for producing a modified hydrogenated copolymer represented by the above-mentioned formula (III) include 1,3-dimethyl-2-imidazolidinone, 1,3-diethyl-2-imidazolidinone, N,N'-dimethylpropyleneurea, 1,3-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, 1,3-di-(2-ethoxyethyl)-2-imidazolidinone, 1,3-dimethylethylenethiourea, N,N'-diethylpropyleneurea and N-methyl-N'-ethylpropyleneurea.

Examples of modifiers used for producing a modified hydrogenated copolymer represented by the above-mentioned formula (IV) include 1-methyl-2-pyrrolidone, 1-cyclohexyl-2-pyrrolidone, 1-ethyl-2-pyrrolidone, 1-propyl-2-pyrrolidone, 1-butyl-2-pyrrolidone, 1-isopropyl-2-pyrrolidone, 1,5-dimethyl-2-pyrrolidone, 1-methoxymethyl-2-pyrrolidone, 1-methyl-2-piperidone, 1,4-dimethyl-2-piperidone, 1-ethyl-2-piperidone, 1-isopropyl-2-piperidone, and 1-isopropyl-5,5-dimethyl-2-piperidone.

By reacting the living terminal of a base copolymer with any of the above-mentioned modifiers, a modified copolymer having a functional group-containing modifier group (i.e., at least one modifier group having at least one functional group) bonded thereto can be obtained. The modified hydrogenated copolymer of the present invention contains a nitrogen atom, an oxygen atom or a silicon atom in the form of the functional group (for example, a hydroxyl group, an epoxy group, an amino group, a silanol group, an alkoxysilane group or a carbonyl group) of the functional group-containing modifier group. Between these functional groups and the polar groups of the thermoplastic resin and/or rubbery polymer, inorganic filler, and a polar group-containing additives, interactions due to chemical linkage and a physical affinity, such as a hydrogen bond or the like, are effectively caused to occur, thereby obtaining the advantageous effects aimed by the present invention.

With respect to the functional group-containing modifier, it is recommended that the amount of functional group-containing modifier used for producing the modified copolymer is from more than 0.5 equivalent to not more than 10 equivalents, preferably from more than 0.7 equivalent to not more than 5 equivalents, more preferably from more than 0.9 equivalent to not more than 4 equivalents, relative to one equivalent of the living terminal of the base copolymer. In the present invention, the amount of the living terminal of the base copolymer can be calculated from the amount of the organolithium compound used in the copolymerization reaction for producing the base copolymer and the amount of lithium atoms contained in the organolithium compound. Alternatively, the amount of the living terminal of the base copolymer can be calculated from the number average molecular weight of the base copolymer.

By hydrogenating the thus obtained modified copolymer (modified unhydrogenated copolymer) in the presence of a hydrogenation catalyst, the modified hydrogenated copolymer of the present invention can be produced. With respect to the hydrogenation catalyst, there is no particular limitation, and any of the conventional hydrogenation catalysts can be used. Examples of hydrogenation catalysts include:

(1) a carried, heterogeneous hydrogenation catalyst comprising a carrier (such as carbon, silica, alumina or diatomaceous earth) having carried thereon a metal, such as Ni, Pt, Pd or Ru;
(2) the so-called Ziegler type hydrogenation catalyst which uses a transition metal salt (such as an organic acid salt or acetylacetone salt of a metal, such as Ni, Co, Fe or Cr) in combination with a reducing agent, such as an organoaluminum; and
(3) a homogeneous hydrogenation catalyst, such as the so-called oraganometal complex of an organometal compound containing a metal, such as Ti, Ru, Rh or Zr.

Specific examples of hydrogenation catalysts include those which are described in Examined Japanese Patent Publication Nos. Sho 42-8704 and Hei 1-37970 (corresponding to U.S. Pat. Nos. 3,706,814 and 4,673,714, respectively). As preferred examples of hydrogenation catalysts, there can be mentioned a titanocene compound and a mixture of a titanocene compound and a reductive organometal compound.

Examples of titanocene compounds include those which are described in Unexamined Japanese Patent Application Laid-Open Specification No. Hei 8-109219. As specific examples of titanocene compounds, there can be mentioned compounds, each independently having at least one ligand (e.g., biscyclopentadienyltitanium dichloride and monopentamethylcyclopentadienyltitanium trichloride) having a (substituted) cyclopentadienyl skeleton, an indenyl skeleton or a fluorenyl skeleton. Examples of reductive organometal compounds include organic alkali metal compounds, such as an organolithium compound; an organomagnesium compound; an organoaluminum compound; an organoboron compound; and an organozinc compound.

The hydrogenation reaction for producing the modified hydrogenated copolymer of the present invention is generally conducted at 0 to 200° C., preferably 30 to 150° C. The hydrogen pressure in the hydrogenation reaction is generally in the range of from 0.1 to 15 MPa, preferably from 0.2 to 10 MPa, more preferably from 0.3 to 5 MPa. The hydrogenation reaction time is generally in the range of from 3 minutes to 10 hours, preferably from 10 minutes to 5 hours. The hydrogenation reaction may be performed either in a batchwise manner or in a continuous manner. Further, the hydrogenation reaction may be performed in a manner wherein a batchwise operation and a continuous operation are used in combination.

By the hydrogenation reaction of the unhydrogenated, modified copolymer, a solution of a modified hydrogenated copolymer in a solvent used is obtained. From the obtained solution, the modified hydrogenated copolymer is separated. If desired, before the separation of the modified hydrogenated copolymer, a catalyst residue may be separated from the solution. Examples of methods for separating the modified hydrogenated copolymer from the solution include a method in which a polar solvent, such as acetone or alcohol (which is a poor solvent for the modified hydrogenated copolymer) is added to the solution containing the modified hydrogenated copolymer, thereby precipitating the modified hydrogenated copolymer, followed by recovery of the modified hydrogenated copolymer; a method in which the solution containing the modified hydrogenated copolymer is added to hot water, while stirring, followed by removal of the solvent by steam stripping; and a method in which the solution containing the modified hydrogenated copolymer is directly heated to evaporate the solvent.

The modified hydrogenated copolymer of the present invention may further contain any of the conventional stabilizers, such as phenol type stabilizers, phosphorus type stabilizers, sulfur type stabilizers and amine type stabilizers.

The modified hydrogenated copolymer of the present invention may be graft-modified using an $\alpha,\beta$-unsaturated carboxylic acid or a derivative (such as an anhydride, an ester, an amide or an imide) thereof. When the modified hydrogenated copolymer of the present invention is graft-modified, the base copolymer is subjected to hydrogenation prior to the graft-modification. Specific examples of $\alpha,\beta$-unsaturated carboxylic acids or derivatives thereof include maleic anhydride, maleic acid imide, acrylic acid or an ester thereof, methacrylic acid or an ester thereof, and endo-cis-bicyclo(2,2,1)-5-heptene-2,3-dicarboxylic acid or an anhydride thereof. The amount of the $\alpha,\beta$-unsaturated carboxylic acid or a derivative thereof is generally in the range of from 0.01 to 20 parts by weight, preferably from 0.1 to 10 parts by weight, relative to 100 parts by weight of the hydrogenated copolymer.

In the present invention, when the modified hydrogenated copolymer of the present invention is subjected to graft-modification, the graft-modification is preferably conducted at 100 to 300° C., more preferably 120 to 280° C. With respect to the details of the graft-modification, reference can be made to Unexamined Japanese Patent Application Laid-Open Specification No. Sho 62-79211.

In another aspect of the present invention, there is provided a modified hydrogenated copolymer composition comprising:

1 to 99 parts by weight, relative to 100 parts by weight of the total of components (a) and (b), of (a) the modified hydrogenated copolymer of the present invention, and 99 to 1 part by weight, relative to 100 parts by weight of the total of components (a) and (b), of (b) at least one polymer selected from the group consisting of a thermoplastic resin other than the modified hydrogenated copolymer (a) and a rubbery polymer other than the modified hydrogenated copolymer (a).

By the combined use of the modified hydrogenated copolymer (a) of the present invention and the other polymer (b) (such as a thermoplastic resin and a rubbery polymer), it becomes possible to obtain a modified hydrogenated copolymer composition which can be advantageously used as various molding materials. With respect to the amounts of the modified hydrogenated copolymer (a) (hereinafter, frequently referred to as "component (a)") and the thermoplastic resin and/or the rubbery polymer (hereinafter, frequently referred to as "component (b)"), the component (a)/component (b) weight ratio is in the range of from 1/99 to 99/1, preferably from 2/98 to 90/10, more preferably from 5/95 to 80/20.

When the modified hydrogenated copolymer (a) of the present invention is mixed with the thermoplastic resin (b), the resultant modified hydrogenated copolymer composition exhibits excellent mechanical properties.

Examples of thermoplastic resins usable as component (b) include a block copolymer of a conjugated diene monomer and a vinyl aromatic monomer, which has a vinyl aromatic monomer unit content of more than 60% by weight, and a hydrogenation product thereof (other than the modified hydrogenated copolymer (a) of the present invention); a polymer of the above-mentioned vinyl aromatic monomer; a copolymer of the above-mentioned vinyl aromatic monomer with at least one vinyl monomer (other than the vinyl aromatic monomer), such as ethylene, propylene, butylene, vinyl chloride, vinylidene chloride, vinyl acetate, acrylic acid and an ester thereof (e.g., methyl acrylate), methacrylic acid and an ester thereof (e.g., methyl methacrylate), acrylonitrile and methacrylonitrile; a rubber-modified styrene resin (HIPS); an acrylonitrile/butadiene/styrene copolymer resin (ABS); a methacrylic ester/butadiene/styrene copolymer resin (MBS); ethylene polymers, such as polyethylene, a copolymer of ethylene with a comonomer copolymerizable with ethylene, which has an ethylene content of 50% by weight or more (e.g., an ethylene/propylene copolymer, an ethylene/butylene copolymer, an ethylene/hexene copolymer, an ethylene/octene copolymer, or an ethylene/vinyl acetate copolymer or a hydrolysis product thereof), an ethylene/acrylic acid ionomer, and a chlorinated polyethylene; propylene polymers, such as polypropylene, a copolymer of propylene with a comonomer copolymerizable with propylene, which has a propylene content of 50% by weight or more (e.g., a propylene/ethylene copolymer or a propylene/ethyl acrylate copolymer) and a chlorinated polypropylene; cyclic olefin type resins, such as an ethylene/norbornene resin; a polybutene resin; a polyvinyl chloride resin; a polyvinyl acetate resin and a hydrolysis product thereof; a polymer of acrylic acid, and an ester or amide thereof; a polyacrylate resin; a polymer of acrylonitrile and/or methacrylonitrile; a nitrile resin which is a copolymer of an (meth)acrylonitrile with a comonomer copolymerizable with the (meth)acrylonitrile, which has a (meth)acrylonitrile content of 50% by weight or more; polyamide resins, such as nylon-46, nylon-6, nylon-66, nylon-610, nylon-11, nylon-12 and nylon-6/nylon-12 copolymer; a polyester resin; a thermoplastic polyurethane resin; carbonate polymers, such as poly-4,4'-dioxydiphenyl-2,2'-propane carbonate; thermoplastic polysulfones, such as a polyether sulfone and a polyallylsulfone; a polyoxymethylene resin; polyphenylene ether resins, such as poly(2,6-dimethyl-1,4-phenylene) ether; polyphenylene sulfide resins, such as polyphenylene sulfide and poly-4,4'-diphenylene sulfide; a polyallylate resin; an ether ketone homopolymer or copolymer; a polyketone resin; a fluororesin; a polyoxybenzoyl type polymer; a polyimide resin; and polybutadiene resins, such as 1,2-polybutadiene and trans-polybutadiene. Among these thermoplastic resins (b), from the viewpoint of compatibility with the modified hydrogenated copolymer (a), preferred are styrene resins (e.g., polystyrene and a rubber-modified styrene resin), polypropylene resins (e.g., polypropylene and a propylene/ethylene copolymer), a polyamide resin, a polyester resin and a polycarbonate resin. Each of these thermoplastic resins (b) may have bonded thereto a group containing a polar group, such as a hydroxyl group, an epoxy group, an amino group, a carboxyl group, an acid anhydride group or an isocyanate group. The number average molecular weight of the thermoplastic resin (b) used in the present invention is generally 1,000 or more, preferably in the range of from 5,000 to 5,000,000, more preferably in the range of from 10,000 to 1,000,000. The number average molecular weight of the thermoplastic resin (b) also can be measured by GPC as in the case of the modified hydrogenated copolymer of the present invention.

When the modified hydrogenated copolymer (a) of the present invention is mixed with the rubbery polymer (b), the resultant modified hydrogenated copolymer composition exhibits excellent tensile strength and elongation properties, and excellent abrasion resistance.

Examples of rubbery polymers usable as component (b) include a butadiene rubber and a hydrogenation product thereof; a styrene/butadiene rubber and a hydrogenation product thereof (other than the modified hydrogenated copolymer (a) of the present invention); an isoprene rubber; an acrylonitrile/butadiene rubber and a hydrogenation product thereof; olefin type elastomers, such as a chloroprene rubber, an ethylene/propylene rubber, an ethylene/propylene/diene rubber, an ethylene/butene/diene rubber, an ethylene/butene rubber, an ethylene/hexene rubber and an ethylene/octene rubber; an olefin type thermoplastic elastomer (TPE) containing an ethylene/propylene/diene terpolymer (EPDM) or an ethylene/propylene copolymer (EPM) as a soft segment; a butyl rubber; an acrylic rubber; a fluororubber; a silicone rubber; a chlorinated polyethylene rubber; an epichlorohydrin rubber; an α,β-unsaturated nitrile/acrylic ester/conjugated diene copolymer rubber; a urethane rubber; a polysulfide rubber; a styrene/butadiene block copolymer and a hydrogenation product thereof; a styrene/isoprene block copolymer and a hydrogenation product thereof; styrene type elastomers having a styrene content of 60% by weight or less, such as a styrene/butadiene/isoprene block copolymer and a hydrogenation product thereof; and a natural rubber. Among these rubber polymers (b), from the viewpoint of compatibility with the modified hydrogenated copolymer (a), preferred are styrene type elastomers (e.g., a styrene/butadiene block copolymer and a hydrogenation product thereof, a styrene/isoprene block copolymer and a hydrogenation product thereof) and olefin type elastomers (e.g., an ethylene/propylene rubber, an ethylene/butene rubber and ethylene/octene rubber). Each of these rubbery polymers may be modified by introducing thereto a functional group, such as a carboxyl group, a carbonyl group, an acid anhydride group, a hydroxyl group, an epoxy group, an amino group, a silanol group and an alkoxysilane group. The number average molecular weight of the rubbery polymer (b) used in the present invention is generally 10,000 or more, preferably in the range of from 20,000 to 1,000,000, more preferably in the range of from 30,000 to 800,000. The number average molecular weight of the rubbery polymer (b) also can be measured by GPC as in the case of the modified hydrogenated copolymer of the present invention.

The above-exemplified thermoplastic resins (b) and rubbery polymers (b) may be used individually or in any combination. With respect to the combination of different polymers as component (b), there is no particular limitation. For example, as component (b), it is possible to use a plurality of different thermoplastic resins or a plurality of different rubbery polymers. Further, it is also possible to use the thermoplastic resin and the rubbery polymer in combination. Specifically, for example, with respect to the composition of the present invention which is a resinous composition (i.e., a composition containing a large amount of the thermoplastic resin (b)), it is possible to improve the impact strength of the composition and to soften the composition by adding the rubbery polymer (b) thereto. On the other hand, with respect to the composition of the present invention which is a rubbery composition (i.e., a composition containing a large amount of the rubbery polymer (b)), it is possible to improve the strength and heat resistance of the copolymer by adding the thermoplastic resin (b) thereto.

In the present invention, if desired, an additive may be added to the modified hydrogenated copolymer and the modified hydrogenated copolymer composition. With respect to the additive, there is no particular limitation, and any additives which are conventionally used in thermoplastic resins or rubbery polymers can be used. For example, in the present invention, the additives as described in "Gomu Purasuchikku Haigou Yakuhin (Additives for Rubber and Plastic)" (Rubber Digest Co., Ltd., Japan) can be used. Specific examples of additives include inorganic fillers, such as a reinforcing filler (described below), calcium sulfate and barium sulfate; pigments, such as carbon black and iron oxide; lubricants, such as stearic acid, amide acid, zinc stearate, calcium stearate, magnesium stearate and ethylene bis-stearamide; blocking-preventive reagents, such as stearic acid amide, erucic acid amide, oleic acid amide, stearic acid monoglyceride, stearyl alcohol, a petroleum wax (e.g., microcrystalline wax) and a low molecular weight vinyl aromatic resin; mold release agents; plasticizers, such as an organopolysiloxane and a mineral oil; antioxidants, such as a hindered phenol type antioxidant and a phosphorus type thermal stabilizer; hindered amine type light stabilizers; benzotriazole type ultraviolet absorbers; flame retardants; antistatic agents; reinforcing agents, such as an organic fiber, a glass fiber, a carbon fiber and a metal whisker; coloring agents; and mixtures thereof.

With respect to the method for producing the modified hydrogenated copolymer composition of the present invention, there is no particular limitation, and any of the conventional methods can be employed. For example, the modified hydrogenated copolymer composition of the present invention can be produced by melt-kneading method using a conventional mixing machine, such as a Banbury mixer, a single-screw extruder, a twin-screw extruder, a co-kneader, a multi-screw extruder, or a method in which the components for the composition are added to a solvent, to thereby obtain a solution or dispersion of a mixture of the components in the solvent, followed by heating to remove the solvent. From the viewpoint of productivity of the composition and uniform mixing of the components of the composition, it is preferred to use the melt-kneading method using an extruder. With respect to the form of the modified hydrogenated copolymer composition, there is no particular limitation, and the composition may be in the form of pellets, a sheet, a strand or a chip. Further, immediately after the melt-kneading, the resultant molten composition can be directly formed into a shaped article.

As mentioned above, the modified hydrogenated copolymer or modified hydrogenated copolymer composition of the present invention, if desired, can be used in the form of a mixture thereof with any of various conventional additives, and such a mixture may be used in various fields. Preferred examples of specific forms of the modified hydrogenated copolymer and modified hydrogenated copolymer composition of the present invention (each in the form of a mixture thereof with an additive) include (i) a reinforcing filler-containing composition, (ii) a crosslinked product, (iii) a foam, (iv) a molded article, such as a multilayer film and a multilayer sheet, (v) a building material, (vi) a vibration damping, soundproofing material, (vii) an electric wire coating material, (viii) a high frequency welding composition, (ix) a slush molding material, (x) an adhesive composition, and (xi) an asphalt composition. Especially, the modified hydrogenated copolymer and modified hydrogenated copolymer composition of the present invention can be advantageously used as any of the cross-linked product of item (ii) above, the foam of item (iii) above, the molded article of item (iv) above, such as a multilayer film and a multilayer sheet, the building material of item (v) above, the vibration damping, soundproofing material of item (vi) above, and the electric wire coating material of item (vii) above. Hereinbelow, explanations are made with respect to the above-mentioned specific forms.

(i) Reinforcing Filler-Containing Composition

The reinforcing filler-containing composition can be produced by mixing either the modified hydrogenated copolymer or modified hydrogenated copolymer composition of the present invention with at least one reinforcing filler (which is, hereinafter, frequently referred to as "component (c)") selected from the group consisting of a silica type inorganic filler, a metal oxide, a metal hydroxide, a metal carbonate and carbon black. The amount of the component (c) is generally in the range of from 0.5 to 100 parts by weight, preferably from 5 to 100 parts by weight, more preferably from 20 to 80 parts by weight, relative to 100 parts by weight of the modified hydrogenated copolymer or the modified hydrogenated copolymer composition. For producing the reinforcing filler-containing composition using the modified hydrogenated copolymer composition of the present invention, it is suitable to use the modified hydrogenated copolymer composition containing the component (b) (i.e., a thermoplastic resin and/or a rubbery polymer) in an amount of 0 to 500 parts by weight, preferably 5 to 300 parts by weight, more preferably 10 to 200 parts by weight, relative to 100 parts by weight of the modified hydrogenated copolymer (component (a)) of the present invention.

The silica type inorganic filler used as the reinforcing filler is a solid particle composed mainly of $SiO_2$. Examples of silica type inorganic fillers include silica, clay, talc, kaolin, mica, wollastonite, montmorillonite, zeolite and a fibrous inorganic substance, such as a glass fiber. Further, a silica type inorganic filler having its surface rendered hydrophobic and a mixture of the silica type inorganic filler and a non-silica type inorganic filler may also be used as the reinforcing filler. Among the above-exemplified silica type inorganic fillers, preferred are silica and a glass fiber. Specific examples of silica include a white carbon produced by the dry process, a white carbon produced by the wet process, a synthetic silicate type white carbon and the so-called colloidal silica. The preferred average particle diameter of the silica type inorganic filler is generally in the range of from 0.01 to 150 µm. For achieving the effects of addition of the silica type inorganic filler, it is preferred to disperse the filler finely in the composition such that the average particle diameter of the silica type inorganic filler dispersed in the composition is in the range of from 0.05 to 1 μm, preferably from 0.05 to 0.5 μm.

The metal oxide used as the reinforcing filler is a solid particle composed mainly of $M_xO_y$ (wherein M represents a metal atom, and each of x and y independently represents an integer of from 1 to 6). Examples of metal oxides include alumina, titanium oxide, magnesium oxide and zinc oxide. Further, the metal oxide may be used in the form of a mixture thereof with an inorganic filler other than the metal oxide.

The metal hydroxides used as the reinforcing filler are hydrated type inorganic fillers, such as aluminum hydroxide, magnesium hydroxide, zirconium hydroxide, hydrated aluminum silicate, hydrated magnesium silicate, basic magnesium carbonate, hydrotalcite, calcium hydroxide, barium hydroxide, hydrated tin oxide and hydrated inorganic metal compounds, such as borax. Of these, preferred are magnesium hydroxide and aluminum hydroxide.

Examples of metal carbonates used as the reinforcing filler include calcium carbonate and magnesium carbonate.

Further, as the reinforcing filler, carbon blacks of various grades, such as FT, SRF, FEF, HAF, ISAF and SAF, can be used. It is preferred that the carbon black used has a specific surface area (measured by the nitrogen adsorption method) of 50 mg/g or more, and a DBT (dibutyl phthalate) oil absorption of 80 ml/100 g or more.

The reinforcing filler-containing composition, which comprises the modified hydrogenated copolymer or modified hydrogenated copolymer composition of the present invention and a reinforcing filler, may further contain a silane coupling agent (which is, hereinafter, frequently referred to as "component (d)"). The silane coupling agent is used to strengthen the interaction between the modified hydrogenated copolymer and the reinforcing filler, and is a compound having a group which exhibits an affinity or bonding ability to either or both of the modified hydrogenated copolymer and the reinforcing filler. As a preferred example of the silane coupling agent, there can be mentioned a compound having a polysulfide linkage containing a silanol group or an alkoxysilane in combination with two or more sulfur atoms, wherein any of the sulfur atoms may be present in the form of a mercapto group. Specific examples of silane coupling agents include bis[3-(triethoxysilyl)propyl]tetrasulfide, bis[3-(triethoxysilyl)propyl]disulfide, bis[2-(triethoxysilyl)ethyl]-tetrasulfide, 3-mercaptopropyl-trimethoxysilane, 3-triethoxysilylpropyl-N,N-dimethylthiocarbamoyltetrasulfide and 3-triethoxysilylpropylbenzothiazoletetrasulfide. From the viewpoint of obtaining the desired effect, the amount of the silane coupling agent is generally in the range of from 0.1 to 30% by weight, preferably from 0.5 to 20% by weight, more preferably from 1 to 15% by weight, based on the weight of the reinforcing filler.

The reinforcing filler-containing composition, which comprises the modified hydrogenated copolymer or modified hydrogenated copolymer composition of the present invention and a reinforcing filler, may be subjected to a vulcanization reaction (i.e., a crosslinking reaction) in the presence of a vulcanizing agent to produce a vulcanized composition. Examples of vulcanizing agents include a radical generator, such as an organic peroxide and an azo compound, an oxime compound, a nitroso compound, a polyamine compound, sulfur, a sulfur-containing compound (such as sulfur monochloride, sulfur dichloride, a disulfide compound and a polymeric polysulfide compound). The vulcanizing agent is generally used in an amount of from 0.01 to 20 parts by weight, preferably 0.1 to 15 parts by weight, relative to 100 parts by weight of the modified hydrogenated copolymer or the modified hydrogenated copolymer composition.

Examples of organic peroxides (hereinafter, referred to as "component (e)") used as the vulcanizing agent, which are preferred from the viewpoint of low odor and scorch stability (i.e., a property such that a crosslinking reaction does not occur when the components for the composition are mixed with each other, but occurs rapidly when the resultant mixture is placed under conditions suitable for effecting a crosslinking reacting), include 2,5-dimethyl-2,5-di(tert-butylperoxy)hexane, 2,5-dimethyl-2,5-di(tert-butylperoxy)hexane-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate and di-tertbutyl peroxide. Further examples of organic peroxides which can be used as the vulcanizing agent include dicumyl peroxide, benzoyl peroxide, p-chlorobenzoyl peroxide, 2,4-dichlorobenzoyl peroxide, tert-butyl peroxybenzoate, tert-butylperoxyisopropyl carbonate, diacetyl peroxide, lauroyl peroxide and tert-butyl cumyl peroxide.

In the above-mentioned vulcanization reaction, a vulcanization accelerator (hereinafter, frequently referred to as "component (f)") may be used in a desired amount. Examples of vulcanization accelerators include a sulphenic amide type accelerator, a guanidine type accelerator, a thiuram type accelerator, an aldehyde-amine type accelerator, an aldehyde-ammonia type accelerator, a thiazole type accelerator, a thiourea type accelerator and a dithiocarbamate type accelerator. An auxiliary vulcanizing agent, such as zinc oxide and stearic acid, may also be used in a desired amount.

Further, especially when the above-mentioned organic peroxide is used for crosslinking (vulcanizing) the reinforcing filler-containing composition, it is preferred to use a vulcanization accelerator in combination with the organic peroxide. Examples of vulcanization accelerators which may be used in combination with the organic peroxide include sulfur; auxiliaries (hereinafter, frequently referred to as "component (g)") for a peroxide crosslinking agent, such as p-quinone dioxime, p,p'-dibenzoylquinone dioxime, N-methyl-N-4-dinitrosoaniline, nitrosobenzene, diphenylguanidine and trimethylolpropane-N,N'-m-phenylene dimaleimide; divinyl benzene; triallyl cyanurate; multifunctional methacrylate monomers, such as ethyleneglycol dimethacrylate, diethyleneglycol dimethacrylate, polyethyleneglycol dimethacrylate, trimethylol propane trimethacrylate and allyl methacrylate; multifunctional vinyl monomers (hereinafter, frequently referred to as "component (h)"), such as vinyl butylate and vinyl stearate. The vulcanization accelerator as mentioned above is generally used in an amount of from 0.01 to 20 parts by weight, preferably from 0.1 to 15 parts by weight, relative to 100 parts by weight of the modified hydrogenated copolymer or the modified hydrogenated copolymer composition.

The above-mentioned vulcanization reaction can be performed by a conventional method. For example, with respect to the reaction temperature, the vulcanization reaction may be conducted at 120 to 200° C., more preferably 140 to 180° C. The vulcanized reinforcing filler-containing composition has excellent properties, such as high heat resistance, flexibility and oil resistance.

In the present invention, for improving the processability of the reinforcing filler-containing composition, a rubber-softening agent (hereinafter, frequently referred to as "component (i)") may be added. As the rubber-softening agent, it is suitable to use a mineral oil, or a liquid or low molecular weight synthetic softening agent. It is especially preferred to use a naphthene type and/or paraffin type process oil(s) or extender oil(s), which is/are generally used for softening a rubber, for increasing the volume of a rubber or for improving the processability of a rubber. The mineral oil type softening agent is a mixture of an aromatic compound, a naphthene and a chain paraffin. With respect to the mineral oil type softening agents, a softening agent in which the number of carbon atoms constituting the paraffin chains is 50% or more (based on the total number of carbon atoms present in the softening agent) is generally referred to as a "paraffin type softening agent"; a softening agent in which the number of carbon atoms constituting the naphthene rings is 30 to 45% (based on the total number of carbon atoms present in the softening agent) is generally referred to as a "naphthene type softening agent"; and a softening agent in which the number of carbon atoms constituting the aromatic rings is more than 30% (based on the total number of carbon atoms present in the softening agent) is generally referred to as an "aromatic type softening agent". The reinforcing filler-containing composition may also contain a synthetic softening agent, such as a polybutene, a low molecular weight polybutadiene and a liquid paraffin. However, the above-mentioned mineral oil type softening agent is more preferred. The amount of the rubber-softening agent used in the reinforcing filler-containing composition is generally in the range of from 0 to 100 parts by weight, preferably from 10 to 90 parts by weight, more preferably from 30 to 90 parts by weight, relative to 100 parts by weight of the modified hydrogenated copolymer or the modified hydrogenated copolymer composition. When the amount of the rubber-softening agent exceeds 100 parts by weight, the rubber-softening agent is likely to bleed out from the composition, thereby leading to a danger that the surface tack of the composition occurs.

The reinforcing filler-containing composition, which comprises the modified hydrogenated copolymer or modified hydrogenated copolymer composition of the present invention and a reinforcing filler, may be used as a building material, an electric wire coating material, a vibration damping material, material for interior and exterior parts of automobiles, material for home electric appliances, material for food packages, and material for household goods and toys. Further, the vulcanized product of the reinforcing filler-containing composition may be used for producing a tire, a rubber cushion, a belt, an industrial article, a footwear, a foam and the like, taking advantage of its characteristics.

(ii) Crosslinked Product

The modified hydrogenated copolymer or modified hydrogenated copolymer composition of the present invention can be crosslinked in the presence of a vulcanizing agent, to obtain a crosslinked product (i.e., a crosslinked modified hydrogenated copolymer or a crosslinked modified hydrogenated copolymer composition). By crosslinking the modified hydrogenated copolymer or modified hydrogenated copolymer composition of the present invention, it is possible to improve the heat resistance (as evaluated in terms of high temperature C-Set (compression set)) and flexibility of the modified hydrogenated copolymer or the modified hydrogenated copolymer composition. When the hydrogenated copolymer composition of the present invention (comprising the modified hydrogenated copolymer (a), and the thermoplastic resin (b) and/or the rubbery polymer (b)) is used for producing the crosslinked product, the component (a)/component (b) weight ratio in the modified hydrogenated copolymer composition is generally in the range of from 10/90 to 100/0, preferably from 20/80 to 90/10, more preferably from 30/70 to 80/20.

In the present invention, there is no particular limitation with respect to the method for crosslinking the modified hydrogenated copolymer or the modified hydrogenated copolymer composition. However, it is preferred to employ the so-called "dynamic crosslinking" method. In the dynamic crosslinking method, components (including a crosslinking agent) for a desired crosslinked product are melt-kneaded at a temperature at which a crosslinking reaction occurs, so as to effect the mixing of components and the crosslinking reaction simultaneously. The details of this method are described in A. Y. Coran et al., Rub. Chem. and Technol. vol. 53, pp. 141-(1980). In the dynamic crosslinking method, the crosslinking reaction is performed by using an enclosed kneader, such as a Banbury mixer or a pressurizing kneader, or a single-screw or twin-screw extruder. The kneading is generally conducted at 130 to 300° C., preferably 150 to 250° C., for 1 to 30 minutes. In the dynamic crosslinking method, an organic peroxide or a phenol resin type crosslinking agent is generally used as the vulcanizing agent. The amount of the vulcanizing agent is generally in the range of from 0.01 to 15 parts by weight, preferably from 0.04 to 10 parts by weight, relative to 100 parts by weight of the modified hydrogenated copolymer or the modified hydrogenated copolymer composition.

As the organic peroxide used as the vulcanizing agent in the dynamic crosslinking method, it is possible to use the above-mentioned component (e). When the crosslinking reaction is performed using the organic peroxide, the above-mentioned component (f) may be used as a vulcanization accelerator, if desired, in combination with the above-mentioned component (g) and/or the above-mentioned component (h). The amount of the vulcanization accelerator is generally in the range of from 0.01 to 20 parts by weight, preferably 0.1 to 15 parts by weight, relative to 100 parts by weight of the modified hydrogenated copolymer or the modified hydrogenated copolymer composition.

The crosslinked product of the present invention, if desired, may further contain an additive so long as the properties of the crosslinked product are not harmfully affected. Examples of additives include a softening agent, a thermal stabilizer, an antistatic agent, a weathering stabilizer, an antioxidant, a filler, a coloring agent and a lubricant. The above-mentioned component (i) may be used as a softening agent for controlling the hardness and fluidity of the final product. The softening agent may be added just before or during the kneading of the components for the crosslinked product, or may be incorporated into the modified hydrogenated copolymer during the production thereof so as to obtain the modified hydrogenated copolymer in the form of an oil extended rubber. The amount of the softening agent is generally in the range of from 0 to 200 parts by weight, preferably 10 to 150 parts by weight, more preferably 20 to 100 parts by weight, relative to 100 parts by weight of the modified hydrogenated copolymer or the modified hydrogenated copolymer composition. Further, the above-mentioned component (c) may be used as the filler in the crosslinked product. The amount of the filler is generally in the range of from 0 to 200 parts by weight, preferably 10 to 150 parts by weight, more preferably 20 to 100 parts by weight, relative to 100 parts by weight of the modified hydrogenated copolymer or the modified hydrogenated copolymer composition.

In the present invention, it is recommended that the dynamic crosslinking is performed so that the content of gel (exclusive of inherently insoluble components, such as the inorganic filler) is 5 to 80% by weight, preferably 10 to 70% by weight, more preferably 20 to 60% by weight, based on the weight of the crosslinked product. The gel content is determined by the following method. A sample (1 g) of a crosslinked product is refluxed in a Soxhlet's extractor for 10 hours using boiled xylene. The resultant residue is filtered through an 80-mesh wire mesh. The dry weight (g) of the insoluble matters remaining on the filter is measured, and the ratio (% by weight) of the obtained dry weight to the weight of the sample is calculated. The obtained ratio is defined as the gel content of the crosslinked product. The gel content may be controlled by changing the type and amount of the vulcanizing agent, and the crosslinking reaction conditions (such as temperature, residence time and shearing force).

As in the case of the vulcanized product of the reinforcing filler-containing composition of item (i) above, the crosslinked product of the present invention can be advantageously used as a building material, an electric wire coating material, a vibration damping material, material for interior and exterior parts of automobiles, material for home electric appliances and parts thereof, material for food packages, material for household goods and toys and the like, and for producing a tire, a rubber cushion, a belt, an industrial article, a footwear, a foam and the like. Further, the crosslinked product can also be advantageously used as a material for medical instruments.

(iii) Foam

The modified hydrogenated copolymer and modified hydrogenated copolymer composition of the present invention can also be used in the form of a foam. In this case, generally, the foam is produced by foaming a composition (which is, hereinafter, frequently referred to as a "foaming composition") containing the modified hydrogenated copolymer or modified hydrogenated copolymer composition of the present invention and a filler (which is, hereinafter, frequently referred to as "component (j)"). For producing the foam using the modified hydrogenated copolymer composition of the present invention, it is suitable to use the modified hydrogenated copolymer composition containing the component (b) (i.e., a thermoplastic resin and/or the rubbery polymer) in an amount of from 5 to 95% by weight, preferably 5 to 90% by weight, more preferably 5 to 80% by weight, based on the weight of the modified hydrogenated copolymer (a).

Further, the amount of the filler (j) is generally in the range of from 5 to 95% by weight, preferably 10 to 80% by weight, more preferably 20 to 70% by weight, based on the weight of the above-mentioned foaming composition.

Examples of fillers (j) used for producing the foam of the present invention include inorganic fillers, such as the above-mentioned reinforcing filler (component (c)), calcium sulfate, barium sulfate, potassium titanate whisker, mica, graphite and a carbon fiber; and organic fillers, such as a wood chip, a wood powder and a pulp. There is no particular limitation with respect to the form of the filler. The filler may be in the form of a scale, a sphere, a granule or a powder, or may have an irregular configuration. If desired, at least two different types of the above-mentioned fillers may be used in combination. The filler may be treated with a silane coupling agent prior to use.

The foaming for obtaining the foam of the present invention can be conducted by a chemical method or a physical method. In each of these methods, bubbles are formed throughout the composition by addition of a chemical foaming agent (such as an organic foaming agent or an inorganic foaming agent) or a physical foaming agent (hereinafter, both of the above-mentioned chemical and physical foaming agent is frequently-referred to as "component (k)").

The foam of the modified hydrogenated copolymer and modified hydrogenated copolymer composition of the present invention can be advantageously used for producing a shaped article having a light weight, an improved flexibility, an improved design, and the like. Examples of inorganic foaming agents include sodium bicarbonate, ammonium carbonate, ammonium bicarbonate, ammonium nitrite, an azide compound, sodium borohydride and a metal powder. Examples of organic foaming agents include azodicarbonamide, azobisformamide, azobisisobutylonitrile, barium azodicarboxylate, N,N'-dinitrosopentamethylenetetramine, N,N'-dinitroso-N,N'-dimethylterephtalamide, benzenesulfonylhydrazide, p-toluenesulfonylhydrazide, p,p'-oxybisbenzenesulfonylhydrazide and p-toluenesulfonylsemicarbazide. Examples of physical foaming agents include a hydrocarbon, such as pentane, butane or hexane; a halogenated hydrocarbon, such as methyl chloride or methylene chloride; a gas, such as nitrogen gas or air; and a fluorinated hydrocarbon, such as trichlorodifluoromethane, dichlorodifluoromethane, trichlorotrifluoroethane, chlorodifluoroethane or a hydrofluorocarbon. The foaming agents mentioned above may be used individually or in any combination. The amount of the foaming agent used for producing the foam of the present invention is generally in the range of from 0.1 to 8 parts by weight, preferably from 0.3 to 6 parts by weight, more preferably from 0.5 to 5 parts by weight, relative to 100 parts by weight of the modified hydrogenated copolymer or modified hydrogenated copolymer composition of the present invention.

The foam of the present invention, if desired, may further contain an additive in an appropriate amount. There is no limitation with respect to the type of the additive, and any additives which are conventionally used in thermoplastic resins or rubbery polymers can be used. As examples of additives, there can be mentioned various additives described in the above-mentioned "Gomu Purasuchikku Haigou Yakuhin (Additives for Rubber and Plastic)" (Rubber Digest Co., Ltd., Japan).

Further, if desired, the foam of the present invention may be crosslinked. As examples of the method for crosslinking, there can be mentioned a chemical crosslinking method in which a crosslinking agent (such as a peroxide or sulfur) and optionally an auxiliary crosslinking agent are added to the above-mentioned foaming composition; and a physical crosslinking method which utilizes an electron beam, a radiation or the like. The crosslinking may be conducted either in a static manner in which the crosslinking reaction is caused by irradiation without stirring the reaction system, or in a dynamic manner in which the crosslinking reaction system is stirred. Specifically, for example, the crosslinked foam can be produced as follows.

A mixture of the modified hydrogenated copolymer or the modified hydrogenated copolymer composition, a foaming agent and a crosslinking agent is applied to a substrate to form a sheet. The obtained sheet is heated at approximately 160° C. to cause foaming and crosslinking simultaneously, thereby obtaining a crosslinked foam. As the crosslinking agent, the above-mentioned component (e) (organic peroxide) and the above-mentioned component (f) (vulcanization accelerator) may be used. Further, the above-mentioned components (g) and (h) (auxiliaries for a peroxide crosslinking agent) may also be used in combination with the crosslinking agent. The amount of the crosslinking agent is generally in the range of from 0.01 to 20 parts by weight, preferably from 0.1 to 15 parts by weight, relative to 100 parts by weight of the modified hydrogenated copolymer or the modified hydrogenated copolymer composition.

The foam of the present invention can be advantageously used as various molded articles, such as an injection-molded article, a blow-molded article, an air-pressure-molded article, a vacuum-molded article and an extrusion-molded article, which may have various shapes, such as a sheet and a film. Especially, the foam can be advantageously used as a wrapping material or container for food (such as a wrapping material for fruits or eggs, a meat tray or a lunch box), which is required to exhibit high flexibility. As an example of the foam which can be used as a wrapping material or container for food, there can be mentioned a foam produced by foaming a composition comprising a plurality of resins or polymers, namely, an olefin resin, such as PP (polypropylene); a vinyl aromatic polymer, such as PS (polystyrene), or a rubber-modified styrene resin, such as HIPS; and the modified hydrogenated copolymer of the present invention; and optionally a block copolymer of a conjugated diene and a vinyl aromatic compound, or a hydrogenation product thereof (other than the modified hydrogenated copolymer of the present invention).

The foam of the present invention can be used as not only a wrapping material or container for food, but also as a building material, material for interior parts of automobiles, material for home electric appliances, material for household goods and toys, and raw materials for footwear.

Further, the foam of the present invention can be used in a cushioning hybrid article which comprises a hard resin molded article in combination with the foam. The cushioning hybrid article is produced by injection molding method, such as an insert/mold cavity expansion method disclosed in Unexamined Japanese Patent Application Laid-Open Specification No. Hei 6-234133.

(iv) Multilayer Film and a Multilayer Sheet

The modified hydrogenated copolymer or modified hydrogenated copolymer composition of the present invention can also be used as a multilayer film and a multilayer sheet. The film of the modified hydrogenated copolymer or modified hydrogenated copolymer composition of the present invention has various excellent properties, such as high heat resistance, shrinking property, heat sealability, transparency and fog resistance. While maintaining these excellent properties of the film or sheet of the present invention, another resin layer can be formed on the film or sheet of the present invention, so that various additional properties can be imparted. By such lamination, it becomes possible to provide various forms of the multilayer film and sheet of the present invention, which are excellent with respect to various properties, such as pressure-sensitiveness, tear growth resistance, pierce resistance, mechanical strength (such as elongation at break), extensibility, roll property (i.e., a property such that a rolled film or sheet can be easily unrolled), elasticity recovery, pierce-induced tear resistance, tear resistance, distortion recovery and gas barrier properties. The above-mentioned multilayer film and multilayer sheet can be used as a wrapping material composed of a non-vinyl chloride stretch film, which is used for wrapping by means of a hand wrapper or a stretch package machine. Examples of multilayer films or multilayer sheets which comprise a layer of the modified hydrogenated copolymer or modified hydrogenated copolymer composition of the present invention include:

a). a multilayer film or multilayer sheet which comprises at least one layer of the modified hydrogenated copolymer or modified hydrogenated copolymer composition of the present invention;

b). the multilayer film or multilayer sheet of item a) above, wherein at least one of the two outermost layers (i.e., layers forming the surfaces of the film or the sheet) is composed of an adhesive resin (for example, an ethylene/vinyl acetate copolymer (EVA));

c). the multilayer film or multilayer sheet of item a) above, which further comprises at least one layer composed of a polyolefin resin;

d). the multilayer film or multilayer sheet of item a) above, which further comprises at least one layer composed of a gas barrier resin (for example, an ethylene/vinyl alcohol copolymer (EVOH), polyvinylidene chloride (PVDC) or a polyamide resin), wherein the layer composed of the gas barrier resin has a width of 25 µm and an oxygen permeability of 100 cc/m$^2$·24 hrs·atm or less, as measured at 23° C. under a humidity of 65% RH;

e). the multilayer film or multilayer sheet of item a) above, which further comprises at least one layer composed of a heat sealing resin (for example, polyethylene, polypropylene, a nylon resin, an ethylene/vinyl acetate copolymer (EVA), an ethylene/ethyl acrylate copolymer (EEA), an ethylene/methyl methacrylate copolymer (EMMA), an α-olefin copolymer, a modified hydrogenated copolymer or a hydrogenated copolymer);

f). the multilayer film or multilayer sheet of any one of items a), b), c), d) and e) above, wherein at least one layer other than the two outermost layers of the multilayered film or the multilayered sheet is composed of an adhesive resin;

g). the multilayer film or multilayer sheet of any one of items a), b), c), d), e) and f) above, which is a stretched film or sheet; and h). the multilayer film or multilayer sheet of any one of items a), b), c), d), e) and f) above, which is a heat shrinkable, uniaxially stretched film or sheet, or is a heat shrinkable, biaxially stretched film or sheet.

Hereinbelow, the multilayer film or multilayer sheet of the present invention is described in detail.

The multilayer film or multilayer sheet of the present invention, if desired, may further contain a filler, a stabilizer, an antioxidant, a weatherability improver, an ultraviolet absorber, a plasticizer, a softening agent, a lubricant, a processing aid, a coloring agent, a pigment, an antistatic agent, a flame retardant, an anti-fogging agent, an anti-blocking agent, a nucleating agent, a foaming agent and the like. Among the above-mentioned additives, the anti-blocking agent is effective for suppressing the blocking of the film or the sheet. Examples of anti-blocking agents include erucic acid amide, oleic acid amid, stearic acid monoglyceride and a petroleum wax (such as microcrystalline wax). There is no particular limitation with respect to the amount of the above-mentioned additives. However, in view of the balance of the properties of the film or sheet and the cost, the amount of the additive is preferably 10 parts by weight or less, more preferably 5 parts by weight or less, relative to 100 parts by weight of the multilayer film or multilayer sheet. However, in the case of an additive which exhibits desired effects only when used in a large amount, such an additive may be used in an amount larger than mentioned above. Each of the above-mentioned additives can be added to the modified hydrogenated copolymer or the modified hydrogenated copolymer composition before producing the film or sheet.

When the modified hydrogenated copolymer composition of the present invention (comprising the modified hydrogenated copolymer (a), and the thermoplastic resin (b) and/or the rubbery polymer (b)) is used for producing the multilayer film or the multilayer sheet, it is recommended that the component (a)/component (b) weight ratio in the modified hydrogenated copolymer composition is in the range of from 100/0 to 5/95, preferably 100/0 to 20/80, more preferably 100/0 to 40/60.

The multilayer film or multilayer sheet of the present invention, if desired, may be subjected to surface treatment with corona, ozone, plasma or the like, or may be coated with an anti-fog agent, a lubricant, or may be printed. The multilayer film or multilayer sheet of the present invention, if desired, may also be subjected to a uniaxial orientation or a biaxial orientation. Further, the films or sheets constituting the multilayer film or multilayer sheet may be strongly bonded to each other by bonding treatment (such as welding by heat, supersonic waves, high frequency waves and the like, and adhesion by using a solvent), and any other shaped articles of a thermoplastic resin and the like may also be bonded to the multilayer film or multilayer sheet by the above-mentioned bonding treatment.

There is no limitation with respect to the thickness of the multilayer film or multilayer sheet. However, the thickness of the multilayer film is preferably in the range of from 3 μm to 0.3 mm, more preferably from 10 μm to 0.2 mm, and the thickness of the multilayer sheet is preferably more than 0.3 mm and 3 mm or less, more preferably in the range of from 0.5 mm to 1 mm. When the multilayer film of the present invention is used as a stretched film or heat shrinkable, uniaxially or biaxially stretched film, the thickness of the film is preferably in the range of from 5 to 100 μm, more preferably from 10 to 50 μm. When such a film is used as a stretched film for wrapping food, the wrapping of food can be easily effected by means of an automatic wrapping machine or a manual wrapping machine. On the other hand, when the multilayer film of the present invention is used as a stretched film for producing a container, it is preferred that the thickness of the film is 100 μm or more. The multilayer film or multilayer sheet of the present invention may be formulated into a container or tray for packing food or electronic products by heat molding method, such as vacuum molding, compression molding or air-pressure molding.

The modified hydrogenated copolymer of the present invention per se has pressure-sensitiveness and adhesion properties to some extent. However, when the multilayer film or multilayer sheet of the present invention is required to exhibit a strong pressure-sensitiveness, the multilayer film or multilayer sheet of the present invention may have an adhesive layer which exhibits a strong pressure-sensitiveness. For forming such an adhesive layer, it is preferred to use an ethylene/vinyl acetate copolymer (EVA) resin. With respect to the EVA, it is preferred to use one which has a vinyl acetate content of from 5 to 25% by weight, more advantageously from 10 to 20% by weight, and has a melt flow rate (MFR) of from 0.1 to 30 g/min, more advantageously from 0.3 to 10 g/min, as measured at 230° C. under a load of 2.16 kgf. Further, the adhesive layer may be formed by using a mixture of the modified hydrogenated copolymer or modified hydrogenated copolymer composition of the present invention with a suitable amount of an adhesion property imparting agent.

In addition to the layer(s) of the modified hydrogenated copolymer or modified hydrogenated copolymer composition of the present invention, the multilayer film or multilayer sheet of the present invention may comprise any of various other layers (such as layers of an olefin polymer resin, a styrene polymer resin and polyethylene terephthalate) so as to improve the desired properties of the film or sheet. Examples of olefin polymer resins include an isotactic polypropylene, a syndiotactic polypropylene, an atactic polypropylene, a linear low density polyethylene (L-LDPE), a low density polyethylene (LDPE), a high density polyethylene (HDPE), a block or random copolymer of ethylene and/or propylene with an α-olefin (such as butene, hexene and octene), and polymethylpentene.

The multilayer film or multilayer sheet of the present invention may comprise a heat seal layer. The heat seal layer is a resin layer which adheres to other resins when heated and, if desired, pressurized. When the heat seal layer per se does not have satisfactory properties, or when the optimum sealing conditions are limited, it is preferred to form an auxiliary seal layer such that the auxiliary seal layer directly faces the heat seal layer in the multilayer film or sheet. For forming the heat seal layer, a composition composed mainly of an olefin polymer resin can be used. With respect to such a composition, the olefin polymer resin content is preferably in the range of from 50 to 100% by weight, based on the weight of the composition. Examples of olefin polymer resins contained in the heat seal layer include an ethylene polymer resin, a propylene polymer resin and a butene polymer resin. As an especially preferred example of the ethylene polymer resin, there can be mentioned an ethylene/α-olefin copolymer. Examples of α-olefins include those which have 3 to 10 carbon atoms, such as propylene, 1-butene, 1-pentene, 4-methyl-1-pentene, 1-hexene, 1-octene. Specific examples of ethylene polymer resins include a linear low density polyethylene (L-LDPE), a linear medium density polyethylene (M-LDPE) and a very low density polyethylene (VLDPE). The modified hydrogenated copolymer of the present invention may also be used for forming the heat seal layer.

Further, the heat seal layer may further contain an additive so as to improve heat seal strength, peeling property and the like. When the heat seal layer is required to have heat resistance, a nylon resin and/or an ethylene/ester copolymer may be used for forming the heat seal layer. Examples of ethylene/ester copolymers include an ethylene/vinyl acetate copolymer (EVA), an ethylene/ethyl acrylate copolymer (EEA) and an ethylene/methyl methacrylate copolymer (EMA). When an auxiliary seal layer is used, it is preferred that the crystalline melting point of the resin used in the seal layer is higher than the crystalline melting point of the resin used in the auxiliary seal layer.

If the adhesion between the layers of the multilayer film or multilayer sheet of the present invention is not satisfactory, an adhesive layer may be formed between the layers. Examples of materials for forming the adhesive layer include an ethylene/vinyl acetate copolymer; an ethylene/ethyl acrylate copolymer; an unsaturated carboxylic acid-modified thermoplastic copolymer (such as an olefin copolymer modified with maleic acid, maleic anhydride, acrylic acid, methacrylic acid, itaconic acid or the like) or a metal-modified product thereof, and a mixture containing any combinations of the above-exemplified unsaturated carboxylic acid-modified thermoplastic copolymers and/or the metal-modified products thereof; and a resin blend containing a thermoplastic polyurethane elastomer. There is no limitation with respect to the thickness of the adhesive layer, and the thickness may be appropriately selected depending on the purpose and use of the layer. However, the thickness of the adhesive layer is preferably in the range of from 0.1 to 100 μm, more preferably from 0.5 to 50 μm.

The multilayer film or multilayer sheet of the present invention may comprise a gas barrier resin layer (a gas barrier layer). As an example of gas barrier resins, there can be mentioned a resin which, in the form of a film having a thickness of 25 μm, exhibits an oxygen permeability of 100 cc/m$^2$·24 hr·atm or less, preferably 50 cc/m$^2$·24 hr·atm or less, as measured at 23° C. under a relative humidity of 65%. Specific examples of gas barrier resins include a vinylidene chloride copolymer (PVDC), an ethylene/vinyl alcohol copolymer (EVOH), an aromatic nylon and an amorphous nylon (such as a polyamide produced from meta-xylylene-diamine), and a copolymer composed mainly of acrylonitrile (such as polyacrylonitrile). Further examples of gas barrier resins include a vinylidene chloride copolymer resin composition which is composed mainly of a vinylidene chloride copolymer and which further contains at least one copolymer (such as a copolymer of ethylene with vinyl acetate, or an unsaturated acid, e.g., acrylic acid or methacrylic acid; a copolymer of ethylene with an alkyl ester of such an unsaturated acid; or at least one copolymer of an MBS (methylmethacrylate/butadiene/styrene) resin) other than the vinylidene chloride copolymer; a resin composition which is composed mainly of an ethylene/vinyl alcohol copolymer having a saponification ratio of 95 mol % or more (an ethylene/vinyl alcohol copolymer is produced by saponification of an ethylene/vinyl acetate resin, and the saponification ratio means the mol % of the vinyl acetate monomer units which are saponified), and which further contains at least one polymer (such as a polyester elastomer, a polyamide elastomer, an ethylene/vinyl acetate copolymer, an ethylene/acrylic ester copolymer, and an ethylene/vinyl alcohol copolymer having a saponification ratio of less than 95 mol %) other than the ethylene-vinyl alcohol copolymer having a saponification ratio of 95 mol % or more; and a resin composition comprising the above-mentioned aromatic nylon or amorphous nylon, and an aliphatic nylon. Further, when the gas barrier layer is required to have flexibility, it is especially preferred to use an ethylene/vinyl alcohol copolymer.

When it is necessary to improve the adhesion between the gas barrier layer and an adjacent layer, an adhesive resin layer may be formed between the gas barrier layer and the adjacent layer.

There is no particular limitation with respect to the thickness of the gas barrier layer, and the thickness may be appropriately selected depending on type of the article to be wrapped or packaged by the multilayer film or sheet, or the purpose of the use of the multilayer film or sheet. However, the thickness of the gas barrier layer is generally in the range of from 0.1 to 500 μm, preferably 1 to 100 μm, more preferably 5 to 50 μm. For example, when the multilayer film or sheet having a gas barrier layer composed of polyvinylidene chloride is produced by co-extrusion, it is preferred that the thickness of the gas barrier layer is 30% or less, based on the thickness of the film, from the viewpoint of heat stability and low temperature resistance of the multilayer film or sheet. Specifically, for example, with respect to a multilayer film which is composed of a layer of the modified hydrogenated copolymer of the present invention and a layer of polyvinylidene chloride, and which multilayer film has a thickness of 100 μm, the thickness of the polyvinylidene chloride layer may be approximately 20 μm.

The multilayer film or multilayer sheet of the present invention, which comprises the gas barrier layer, exhibits not only the above-mentioned excellent properties of the modified hydrogenated copolymer of the present invention, but also oxygen barrier property. By wrapping or packaging food, a precise machine and the like with the above-mentioned multilayer film or multilayer sheet comprising the gas barrier layer, it becomes possible to alleviate the quality-lowering (degradation, decay, oxidization and the like) of food, a precise machine and the like. The above-mentioned multilayer film or multilayer sheet can be formulated into a container which has oxygen barrier property.

With respect to the multilayer film of the present invention which is used as a heat shrinkable film, it is preferred that the multilayer film exhibits a heat shrinkage ratio of from 20 to 200%, as measured in at least one direction selected from the lengthwise direction and widthwise direction of the film at a specific temperature selected from the range of from 40 to 100° C. When the heat shrinkage ratio is less than 20%, the low temperature shrinkability of the film becomes unsatisfactory, so that the film is likely to suffer wrinkling and sagging after the shrinking treatment. On the other hand, when the heat shrinkage ratio exceeds 200%, the heat shrinkable film is likely to shrink during the storage of the film, thereby causing a change in the dimension of the film.

The multilayer film or multilayer sheet of the present invention is generally produced by molding method, such as co-extrusion method using an inflation film production apparatus, a T-die film production apparatus or the like, or extrusion coating method (which is also referred to as "extrusion lamination method"). The multilayer film or multilayer sheet of the present invention can also be produced by laminating together single-layer or multilayer films or sheets (which are obtained by using any of the above-mentioned apparatuses) by conventional method, such as dry lamination method, sandwich lamination method or hot melt lamination method. Further, when the multilayer film or multilayer sheet of the present invention is a heat shrinkable film, there is no particular limitation with respect to the method for producing the film, and any of the conventional methods for producing a stretched film may be employed. Specifically, for example, a heat shrinkable film can be obtained by stretching a multilayer film or sheet (produced by T-die extrusion method, tubular extrusion method, inflation extrusion method or the like) by stretching method, such as uniaxial stretching, biaxial stretching or multiaxial stretching. Specific examples of methods for the uniaxial stretching include a method in which an extruded sheet is stretched in a direction perpendicular to an extrusion direction using a tenter, and a method in which an extruded tubular film is stretched in a radial direction as viewed from the central axis of the tubular film. Specific examples of methods for the biaxial stretching include a method in which an extruded sheet is stretched in an extrusion direction using a roll, followed by stretching in a direction perpendicular to the extrusion direction using a tenter, and a method in which an extruded tubular film is stretched in a radial direction (as viewed from the central axis of the tubular film) and in an extrusion direction simultaneously or in a stepwise manner. If desired, the obtained multilayer film or multilayer sheet may be subjected to treatment, such as heat setting, corona treatment and plasma treatment.

Further, at least one layer of the multilayer film or multilayer sheet of the present invention may be crosslinked. The crosslinking can be effected by conventional method using an electron beam, a γ-ray or a peroxide. In the production of the multilayer film or the multilayer sheet, the lamination of the component films or sheets may be conducted after the crosslinking of a component sheet or film.

There is no limitation with respect to the use of the multilayer film or multilayer sheet of the present invention. For example, the multilayer film or multilayer sheet of the present invention can be used for producing a wrapping film, a bag, a pouch and the like. In the case of a multilayer film having excellent stretch property, such a multilayer film can be advantageously used as a stretched film for wrapping foods, a palette stretch film, a protective film and the like. In the case of a multilayer film having a gas barrier property, such a multilayer film can be advantageously used for forming a package for foods, beverages, precision machines, drugs and the like. In the case of a heat shrinkable multilayer film, such a multilayer film can be advantageously used as a shrink wrap, a shrink label and the like.

(v) Building Material

The modified hydrogenated copolymer or modified hydrogenated copolymer composition of the present invention can also be used as a building material. In this case, it is preferred to add a filler and/or a flame retardant to the modified hydrogenated copolymer or modified hydrogenated copolymer composition of the present invention. The building material comprising the modified hydrogenated copolymer or modified hydrogenated copolymer composition of the present invention has excellent properties, such as high abrasion resistance, scratch resistance and tensile property. Particularly, the building material of the present invention can be advantageously used as a flooring material, a wall material, a ceiling material, a sealing material and the like. Further, the building material of the present invention can also be advantageously used as a shaped foam.

When the modified hydrogenated copolymer composition of the present invention (comprising the modified hydrogenated copolymer (a), and the thermoplastic resin (b) and/or the rubbery polymer (b)) is used for producing the building material, the component (a)/component (b) weight ratio in the modified hydrogenated copolymer composition is generally in the range of from 100/0 to 5/95, preferably from 95/5 to 10/90, more preferably from 95/5 to 20/80.

The building material of the present invention may contain a filler. As the filler, any of those which are exemplified as component (j) in item (iii) above for the "foam" may be used.

The building material of the present invention may contain a flame retardant (hereinafter, frequently referred to as "component (l)"). Examples of flame retardants include a halogen type flame retardant, such as a bromine-containing compound; a phosphorus type flame retardant, such as a phosphorus-containing aromatic compound; and an inorganic flame retardant, such as a metal hydroxide.

Examples of halogen type flame retardants include tetrabromoethane, octabromodiphenyl oxide, decabromodiphenyl oxide, hexabromocyclododecane, tribromoneopentyl alcohol, hexabromobenzene, decabromodiphenylethane, tris(tribromophenoxy)-S-triazine, tris(2,3-dibromopropyl)isocyanurate, bis(tribromophenoxy)ethane, ethylenebis(tetrabromophthalimide), hexabromobenzene, pentabromoethylbenzene, hexabromobiphenyl, decabromodiphenyl oxide, pentabromochlorocyclohexane, a halogenated tetrabromobisphenol A, a tetrabromobisphenol A/carbonate oligomer, a tetrabromobisphenol A-bisphenol A oligomer, tetrabromobisphenol S, tris(2,3-dibromopropyl-1-)isocyanurate, 2,2-bis-[4-(2,3-dibromopropoxy)-3,5-dibromophenyl]propane, a halogenated epoxy resin, antimony silicon oxide, tris(chloroethyl) phosphate, tris(monochloropropyl) phosphate, tris(dichloropropyl) phosphate, bis(2,3-dibromopropyl) phosphate, tris(2-bromo-3-chloropropyl) phosphate, tris(bromocresyl) phosphate, tris(tribromophenyl) phosphate, tris(dibromophenyl) phosphate, tris(tribromoneopentyl) phosphate, diethyl-N,N-bis(2-hydroxyethyl) aminomethyl phosphate, a halogenated phosphoric ester, a chlorinated paraffin, a chlorinated polyethylene, perchlorocyclopentadecanone, tetrabromobisphenol A, tetrabromophtahalic anhydride, dibromoneopentyl alcohol, tribromophenol, pentabromobenzyl polyacrylate, chlorendic acid, dibromocresyl glycidyl ether, dibromophenyl glycidyl ether, chlorendic anhydride and tetrachlorophthalic anhydride.

However, in the present invention, it is preferred to use a flame retardant which contains substantially no halogen. Specific examples of such flame retardants include phosphorus type flame retardants, such as triphenyl phosphate, tricresyl phosphate, trixylenyl phosphate, cresyldiphenyl phosphate, xylenyldiphenyl phosphate, resorcinol-bis (diphenyl phosphate), 2-ethylhexyldiphenyl phosphate, dimethylmethyl phosphate, triallyl phosphate, condensation products of these phosphates, ammonium phosphate or a condensation product thereof and diethyl N,N-bis(2-hydroxyethyl)aminomethyl phosphonate; magnesium hydroxide; aluminum hydroxide; zinc borate; barium borate; kaolin-clay; calcium carbonate; alunite; basic magnesium carbonate; calcium hydroxide; red phosphorus; a guanidine compound; a melamine compound; antimony trioxide; antimony pentoxide; sodium antimonate and a silicone resin.

In recent years, in order to avoid environmental problems, inorganic flame retardants are mainly used as the flame retardant. Representative examples of preferred inorganic flame retardants include water-containing metal compounds, such as metal hydroxides (e.g., magnesium hydroxide, aluminum hydroxide and calcium hydroxide), zinc borate and barium borate, calcium carbonate, a clay, basic magnesium carbonate and hydrotalcite. Among the above-exemplified inorganic flame retardants, a metal hydroxide, such as magnesium hydroxide, is preferred for effectively improving the flame retardancy of the building material. Further, the above-exemplified flame retardants include the so-called auxiliary flame retardant, which per se has the poor ability to improve flame retardancy, but exhibits a synergistic effect when used in combination with the flame retardant.

Each of the filler and the flame retardant which are used in the building material of the present invention may be surface-treated with a silane coupling agent or the like before it is mixed with other components for the building material.

The amount of the filler and/or the flame retardant is generally in the range of from 5 to 95% by weight, preferably from 10 to 80% by weight, more preferably from 20 to 70% by weight, based on the weight of the modified hydrogenated copolymer or the modified hydrogenated copolymer composition. If desired, two or more different fillers may be used in combination, and two or more different flame retardants may be used in combination. Further, the filler and the flame retardant may be used in combination. When the filler and the flame retardant are used in combination, it is preferred that the total amount of the filler and the flame retardant is within the above-mentioned range.

The building material of the present invention, if desired, may further contain any of the conventional additives other than mentioned above. There is no limitation with respect to the type of the additive so long as it is an additive which is generally used in combination with a thermoplastic resin or a rubbery polymer. Examples of additives include a pigment or a coloring agent, such as carbon black or titanium oxide; a lubricant, such as stearic acid, behenic acid, zinc stearate, calcium stearate, magnesium stearate or ethylenebis (stearoamide); a mold release agent; an organic polysiloxane; an aliphatic acid ester, such as a phthalic ester, an adipic ester and an azelaic ester; a plasticizer, such as a mineral oil; an antioxidant, such as a hindered phenol type antioxidant and a phosphorus type antioxidant; a hindered amine type light stabilizer; a benzotriazole type ultraviolet absorber; an antistatic agent; a reinforcing filler, such as an organic fiber, a glass fiber, a carbon fiber and a metal whisker; and mixtures thereof.

The building material of the present invention, if desired, may be crosslinked using a crosslinking agent. Examples of methods for the crosslinking include a chemical method which uses a crosslinking agent, such as peroxide and sulfur, and optionally an auxiliary crosslinking agent, and a physical method which uses an electron beam or a radiation. The crosslinking may be conducted either in a static manner in which the crosslinking reaction is caused by irradiation without stirring the reaction system, or in a dynamic manner in which the crosslinking reaction system is stirred. As the crosslinking agent, it is possible to use any of the organic peroxides mentioned above as component (e). Further, it is also possible to use the above-mentioned component (f) (vulcanization accelerator), optionally in combination with the above-mentioned component (g) and/or component (h). The crosslinking agent is generally used in an amount of from 0.01 to 20 parts by weight, preferably from 0.1 to 15 parts by weight, relative to 100 parts by weight of the modified hydrogenated copolymer or the modified hydrogenated copolymer composition.

Furthermore, the building material of the present invention may be in the form of a foam (i.e., a foamed building material). The foamed building material is advantageous in that it has a light weight, an improved flexibility, an improved design and the like. Examples of methods for obtaining a foamed building material include a chemical method which uses a chemical foaming agent, such as an inorganic foaming agent and an organic foaming agent; and a physical method which uses a physical foaming agent. In each of these methods, bubbles are formed throughout the building material by addition of a foaming agent. As the foaming agent, it is possible to use any of those which are mentioned as component (k) in item (iii) above for the "foam". The amount of the foaming agent is generally in the range of from 0.1 to 8 parts by weight, preferably from 0.3 to 6 parts by weight, more preferably from 0.5 to 5 parts by weight, relative to 100 parts by weight of the modified hydrogenated copolymer or the modified hydrogenated copolymer composition.

The building material of the present invention can be advantageously used as various molded articles, such as an injection-molded article, a blow-molded article, an air-pressure-molded article, a vacuum-molded article, an extrusion-molded article and a calender-molded article, which may have various shapes, such as a sheet and a film. For improving the various properties (such as appearance, abrasion resistance, weatherability and scratch resistance) of the molded article of the building material of the present invention, the surface of the molded article may be treated by printing, coating, embossing or the like.

The building material of the present invention is suitable for printing and coating (that is, the building material has excellent printing property and coating property), as compared to a resin produced only from olefin monomers. However, for further improving the printing property and coating property of the building material, the building material may be subjected to surface treatment. There is no limitation with respect to the method for the surface treatment of the building material of the present invention, and any of the conventional methods, such as a physical method or a chemical method, can be employed. Examples of surface treatments include a corona discharge treatment, an ozone treatment, a plasma treatment, a flame treatment, and acid/alkali treatment. Among these treatments, a corona discharge treatment is preferred from the viewpoint of ease in practice and cost, and in view of the fact that the corona discharge treatment can be conducted in a continuous manner.

When the building material of the present invention is in the form of a shaped article having a planar structure, such as a film, a sheet, a tile or a board, which is used as a flooring material, a wall material, a ceiling material or the like, the building material may have a monolayer structure or a multilayer structure. Also when the building material of the present invention is in the form of a shaped article other than mentioned above, the building material, if desired, may have a multilayer structure. When the building material has a multilayer structure, for example, the building material may have layers which are different with respect to the composition, distribution of components, molecular weight and molecular weight distribution of the modified hydrogenated copolymer or modified hydrogenated copolymer composition of the present invention, and/or with respect to the type and amount of the filler or flame retardant used in the building material of the present invention. Such a multilayer building material may further comprise a layer of a resin or resin composition other than the modified hydrogenated copolymer or modified hydrogenated copolymer composition of the present invention and/or a layer of a material other than the building material of the present invention.

There is no limitation with respect to the use of the building material of the present invention. For example, when the building material is used as a flooring material, a wall material or a ceiling material, the building material may be used in the form of a coating material for coating the surface of a structural material made of a concrete, a metal, a wood or the like. In such a case, the building material of the present invention is provided in the form of a sheet, a film, a tile, a board or the like, and the building material is bonded to a substrate, such as a structural material, by using an adhesive agent, an adhesive material, a nail, a screw or the like. Further, the building material of the present invention may be used as a sealing material (such as a gasket used for improving the sealability). Specifically, for example, the building material of the present invention can be used as a flooring material, such as a tile, an inner wall material, a material for an inner wall of a ceiling, and a window frame gasket, which are used in general housings, office buildings, commercial or public facilities, and the like.

(vi) Vibration Damping, Soundproofing Material

The modified hydrogenated copolymer or modified hydrogenated copolymer composition of the present invention can also be advantageously used as a vibration damping, soundproofing material. When the modified hydrogenated copolymer or modified hydrogenated copolymer composition is used as the vibration damping, soundproofing material, it is preferred to add a filler and/or a flame retardant to the modified hydrogenated copolymer or modified hydrogenated copolymer composition of the present invention. The vibration damping, soundproofing material of the present invention not only has excellent flexibility, but also has various other excellent properties, such as high vibration damping property, soundproofing property, abrasion resistance, scratch resistance, and strength.

When the modified hydrogenated copolymer composition of the present invention (comprising the modified hydrogenated copolymer (a), and the thermoplastic resin (b) and/or the rubbery polymer (b)) is used for producing the vibration damping, soundproofing material, the component (a)/component (b) weight ratio in the modified hydrogenated copolymer composition is generally in the range of from 100/0 to 5/95, preferably from 95/5 to 10/90, more preferably from 95/5 to 20/80.

The vibration damping, soundproofing material of the present invention may further contain a filler and/or a flame retardant. As the filler, it is possible to use any of those which are exemplified as component (j) in item (iii) above for the "foam". As the flame retardant, it is possible to use any of those which are exemplified as component (l) in item (iv) for the "building material". The preferred flame retardants are also the same as mentioned above in connection with the building material.

Each of the filler and the flame retardant which are used in the vibration damping, soundproofing material of the present invention may be surface-treated with a silane coupling agent or the like before it is mixed with other components for the vibration damping, soundproofing material.

The amount of the filler and/or the flame retardant is generally in the range of from 5 to 95% by weight, preferably from 10 to 80% by weight, more preferably from 20 to 70% by weight, based on the weight of the modified hydrogenated copolymer or the modified hydrogenated copolymer composition. If desired, two or more different fillers may be used in combination, and two or more different flame retardants may be used in combination. Further, the filler and the flame retardant may be used in combination. When the filler and the flame retardant are used in combination, it is preferred that the total amount of the filler and the flame retardant is within the above-mentioned range.

The vibration damping, soundproofing material of the present invention, if desired, may further contain any of the conventional additives other than mentioned above. There is no limitation with respect to the type of the additive so long as it is an additive which is generally used in combination with a thermoplastic resin or a rubbery polymer. As examples of additives, there can be mentioned various additives described in the above-mentioned "Gomu Purasuchikku Haigou Yakuhin (Additives for Rubber and Plastic)" (Rubber Digest Co., Ltd., Japan).

The vibration damping, soundproofing material of the present invention, if desired, may be crosslinked. As examples of methods for crosslinking, there can be mentioned a chemical crosslinking method which uses a crosslinking agent (such as a peroxide or sulfur) and optionally an auxiliary crosslinking agent; and a physical crosslinking method which uses an electron beam, a radiation or the like. The crosslinking may be conducted either in a static manner in which the crosslinking reaction is caused by irradiation without stirring the reaction system, or in a dynamic manner in which the crosslinking reaction system is stirred. As the crosslinking agent, it is possible to use any of the organic peroxides mentioned above as component (e). Further, it is also possible to use the above-mentioned component (f) (vulcanization accelerator), optionally in combination with the above-mentioned component (g) and/or component (h). The crosslinking agent is generally used in an amount of from 0.01 to 20 parts by weight, preferably from 0.1 to 15 parts by weight, relative to 100 parts by weight of the modified hydrogenated copolymer or the modified hydrogenated copolymer composition.

Further, the vibration damping, soundproofing material of the present invention may be in the form of a foam (i.e., a foamed, vibration damping, soundproofing material). The foamed, vibration damping, soundproofing material is advantageous in that it has a light weight, an improved flexibility, an improved design and the like. Examples of methods for obtaining a foamed, vibration damping, soundproofing material include a chemical method which uses a chemical foaming agent, such as an inorganic foaming agent and an organic foaming agent; and a physical method which uses a physical foaming agent. In each of these methods, bubbles are formed throughout the vibration damping, soundproofing material by addition of a foaming agent. As the foaming agent, it is possible to use any of those which are mentioned as component (k) in item (iii) above for the "foam". The amount of the foaming agent is generally in the range of from 0.1 to 8 parts by weight, preferably from 0.3 to 6 parts by weight, more preferably from 0.5 to 5 parts by weight, relative to 100 parts by weight of the modified hydrogenated copolymer or modified hydrogenated copolymer composition of the present invention.

The vibration damping, soundproofing material of the present invention can be advantageously used as various molded articles, such as an injection-molded article, a blow-molded article, an air-pressure-molded article, a vacuum-molded article, an extrusion-molded article and a calender-molded article, which may have various shapes, such as a sheet and a film. For improving the various properties (such as appearance, abrasion resistance, weatherability and scratch resistance) of the molded article of the vibration damping, soundproofing material of the present invention, the surface of the molded article may be treated by printing, coating, embossing or the like.

The vibration damping, soundproofing material of the present invention is suitable for printing and coating (that is, the vibration damping, soundproofing material has excellent printing property and coating property), as compared to a resin produced only from olefin monomers. However, for further improving the printing property and coating property of the vibration damping, soundproofing material, the surface of the vibration damping, soundproofing material may be subjected to surface treatment. There is no limitation with respect to the method for the surface treatment of the vibration damping, soundproofing material, and any conventional methods, such as a physical method or a chemical method, can be employed. Examples of surface treatments include a corona discharge treatment, an ozone treatment, a plasma treatment, a flame treatment, and acid/alkali treatment. Among these treatments, a corona discharge treatment is preferred from the viewpoint of ease in practice and cost, and in view of the fact that the corona discharge treatment can be conducted in a continuous manner.

When the vibration damping, soundproofing material of the present invention is in the form of a shaped article having a planar structure, such as a film, a sheet, a tile or a board, which is used as a flooring material, a wall material, a ceiling material or the like, the vibration damping, soundproofing material may have a single-layer structure or a multilayer structure. Also when the vibration damping, soundproofing material of the present invention is in the form of a shaped article other than mentioned above, the vibration damping, soundproofing material, if desired, may have a multilayer structure. When the vibration damping, soundproofing material has a multilayer structure, for example, the vibration damping, soundproofing material may have layers which are different with respect to the composition, distribution of components, molecular weight and molecular weight distribution of the modified hydrogenated copolymer or modified hydrogenated copolymer composition of the present invention, and/or with respect to the type and amount of the filler or flame retardant used in the vibration damping, soundproofing material of the present invention. Such a multilayer, vibration damping, soundproofing material may further comprise a layer of a resin or resin composition other than the modified hydrogenated copolymer or modified hydrogenated copolymer composition of the present invention and/or a layer of a material other than the vibration damping, soundproofing material of the present invention. By the use of such layers of different materials, the multilayer, vibration damping, soundproofing material exhibits excellent vibration damping property and soundproofing property within a wide temperature range.

(vii) Electric Wire Coating Material

The modified hydrogenated copolymer or modified hydrogenated copolymer composition of the present invention can be used as an electric wire coating material. In such use, it is preferred that the modified hydrogenated copolymer or modified hydrogenated copolymer composition contains a filler and/or a flame retardant. The electric wire coating material of the present invention has excellent insulating property, excellent flexibility and excellent peelability, so that the electric wire coating material of the present invention can be advantageously used as a coating material for an electric wire, a power cable, a communication cable, a power transmission line and the like.

When the modified hydrogenated copolymer composition of the present invention (comprising the modified hydrogenated copolymer (a), and the thermoplastic resin (b) and/or the rubbery polymer (b)) is used for producing the electric wire coating material, the component (a)/component (b) weight ratio in the modified hydrogenated copolymer composition is generally in the range of from 100/0 to 5/95, preferably from 95/5 to 10/90, more preferably from 95/5 to 20/80.

As the filler for use in the electric wire coating material of the present invention, any one of the fillers (component (j)) which are exemplified in item (iii) above for the "foam" can be used. On the other hand, as the flame retardant for use in the electric wire coating material, any one of the flame retardants (component (l)) which are exemplified in item (v) above for the "building material" can be used. Preferred examples of flame retardants used in the electric wire coating material are the same as the preferred flame retardants exemplified in item (v) above for the "building material".

The filler and flame retardant used in the electric wire coating material of the present invention may be subjected, prior to use, to a surface treatment with a silane coupling agent or the like.

The amount of the filler and/or the flame retardant is generally in the range of from 5 to 95% by weight, preferably from 10 to 80% by weight, more preferably from 20 to 70% by weight, based on the weight of the modified hydrogenated copolymer or modified hydrogenated copolymer composition. If desired, two or more different fillers may be used in combination, and two or more different flame retardants may be used in combination. Further, the filler and the flame retardant may be used in combination. When the filler and the flame retardant are used in combination, the total amount of the filler and the flame retardant is preferably within the above-mentioned range.

If desired, the electric wire coating material of the present invention may optionally contain an additive. With respect to the additive, there is no particular limitation, and any additives which are conventionally used in thermoplastic resins or rubbery polymers can be used. For example, the additives as described in the above-mentioned "Gomu Purasuchikku Haigou Yakuhin (Additives for Rubber and Plastic)" (Rubber Digest Co., Ltd., Japan) can be used.

If desired, the electric wire coating material of the present invention may be crosslinked. The crosslinked, electric wire coating material is more advantageous than non-crosslinked electric wire coating material, with respect to the following points. In the crosslinked, electric wire coating material, the lowering of the dielectric breakdown voltage due to an impulse current applied to the material is more effectively suppressed than in the case of the non-crosslinked electric wire coating material. Further, the crosslinked, electric wire coating material can stand a large number of impulse current applications thereto without suffering from dielectric breakdown, as compared to the case of the non-crosslinked electric wire coating material. As examples of methods for crosslinking the electric wire coating material, there can be mentioned a chemical crosslinking method comprising addition of a crosslinking agent (such as a peroxide or sulfur) and optionally an auxiliary crosslinking agent, and a physical crosslinking method which utilizes an electron beam, a radiation or the like. In the crosslinking of the electric wire coating material, either static crosslinking or dynamic crosslinking can be employed. Examples of crosslinking agents include an organic peroxide (i.e., the above-mentioned component (e)) and a vulcanization accelerator (i.e., the above-mentioned component (f)). Further, these crosslinking agents can be used in combination with the above-mentioned components (g) and (h). The amount of the crosslinking agent is generally from 0.01 to 20 parts by weight, preferably from 0.1 to 15 parts by weight, relative to 100 parts by weight of the modified hydrogenated copolymer or modified hydrogenated copolymer composition of the present invention.

Further, the electric wire coating material of the present invention can be processed into a foam (i.e., a foamed, electric wire coating material). The foamed, electric wire coating material is advantageous in that it has a light weight, an improved flexibility, an improved design and the like. Examples of methods for obtaining the foamed, electric wire coating material of the present invention include a chemical method using a chemical foaming agent (such as an inorganic foaming agent or an organic foaming agent), and a physical method using a physical foaming agent or the like. In each of these methods, bubbles can be formed throughout the electric wire coating material by addition of a foaming agent to the electric wire coating material. Specific examples of foaming agents include any one of the foaming agents (component (k)) exemplified in item (iii) above for the "foam". The amount of the foaming agent is generally from 0.1 to 8 parts by weight, preferably from 0.3 to 6 parts by weight, more preferably from 0.5 to 5 parts by weight, relative to 100 parts by weight of the modified hydrogenated copolymer or modified hydrogenated copolymer composition of the present invention.

(viii) High Frequency Welding Composition

By using the modified hydrogenated copolymer of the present invention, it is possible to prepare a high frequency welding composition having the following composition α or β:

α) 100 parts by weight of the modified hydrogenated copolymer of the present invention, and 1 to 50 parts by weight of at least one member selected from the group consisting of an ethylene/acrylate copolymer, an ethylene/vinyl acetate copolymer, and a polymeric compound having a hydroxyl group in a molecular chain thereof (hereinafter, this component is frequently referred to as "component (m)"), or;

β) 100 parts by weight of the modified hydrogenated copolymer of the present invention, 1 to 50 parts by weight of the component (m), and 5 to 150 parts by weight of at least one member selected from the group consisting of a thermoplastic resin other than the component (m) and a rubbery polymer other than the component (m).

In the present invention, the term "high frequency welding composition" means a composition which is susceptible to welding by the use of a high frequency wave or a microwave, that is, a composition which is effectively susceptible to a high frequency weld molding.

From the viewpoint of the flexibility and sealability, high frequency welding property and extrusion moldability of the high frequency welding composition (especially the high frequency welding property and extrusion moldability of the high frequency welding composition), it is preferred that the ethylene/acrylate copolymer used in the high frequency welding composition has an acrylate content of 5% by weight or more, more advantageously from 5 to 20% by weight. Specific examples of acrylates used in the ethylene/acrylate copolymer include methyl acrylate, ethyl acrylate, butyl acrylate and 2-ethylhexyl acrylate. Of these acrylates, ethyl acrylate is most preferred.

From the viewpoint of the flexibility and sealability, high frequency welding property and extrusion moldability of the high frequency welding composition (especially the high frequency welding property and extrusion moldability of the high frequency welding composition), it is preferred that the ethylene/vinyl acetate copolymer used in the high frequency welding composition has a vinyl acetate content of 5% by weight or more, more advantageously from 5 to 20% by weight.

Specific examples of compounds having a hydroxyl group in a molecular chain thereof include a polyhydric alcohol, a phenolic compound, a vinyl alcohol resin, an epoxy group-containing compound, a resin having a hydroxyl group at both terminals thereof, and a hydroxyl group-grafted polyolefin resin.

The term "polyhydric alcohol" means a compound having two or more hydroxyl groups in a molecule thereof. Specific examples of polyhydric alcohols include a polyethylene glycol, a polypropylene glycol, 1,3-propanediol, 1,6-hexanediol, 2,5-hexanediol, 3,4-hexanediol, pentaerythritol, dipentaerythritol, tripentaerythritol, glycerol, trimethylolethane, trimethylolpropane, anhydrous ennea-heptitol, 1,2,4-butanetriol, 1,2,6-hexanetriol, pentitols (e.g., ribitol, arabinitol, D-arabinitol, L-arabinitol, D,L-arabinitol and xylitol), hexitols (e.g., allitol, dulcitol, galactitol, glucitol, D-glucitol, L-glucitol, D,L-glucitol, D-mannitol, L-mannitol, D,L-mannitol, altritol, D-altritol, L-altritol, D,L-altritol, iditol, D-iditol and L-iditol), tetrytols (erythritol, threitol, D-threitol, L-threitol and D,L-threitol), maltitol and lactitol. Of these polyhydric alcohols, especially preferred are a polyethylene glycol, pentaerythritol, glycerol and trimethylolpropane.

The term "phenolic compound" means an aromatic compound having at least one hydroxyl group in a molecule thereof. Specific examples of phenolic compounds include phenol, o-cresol, m-cresol, p-cresol, 3,5-xylenol, carvacrol, thymol, α-naphthol, β-naphthol, catechol, resorcin, hydroquinone, dimethylolphenol, pyrogallol and phloroglucin. Of these phenolic compounds, preferred are dihydric phenols, such as catechol and dimethylolphenol, and trihydric phenols, such as pyrogallol.

Specific examples of vinyl alcohol resins include a polyvinyl alcohol resin (PVA) obtained by saponifying a vinyl acetate resin with caustic soda, caustic potash or the like; and an α-olefin/vinyl acetate copolymer saponification resin obtained by subjecting a copolymer of an α-olefin (such as ethylene or propylene) and vinyl acetate to a saponification reaction. In the production of the α-olefin/vinyl acetate copolymer saponification resin, from the viewpoint of easy polymerization, ethylene is generally used as the α-olefin. An ethylene/vinyl alcohol copolymer resin (EVOH) is well known and is obtained by subjecting an ethylene/vinyl acetate resin to substantially the same saponification reaction as in the production of the above-mentioned polyvinyl alcohol resin (PVA). With respect to the PVA, various types of this resin are commercially available. Examples of commercially available products of PVA's include "Poval" (trade name of PVA, manufactured and sold by Kuraray Co., Ltd., Japan) and "Gohsenol" (trade name of PVA, manufactured and sold by The Nippon Synthetic Chemical Industry Co., Ltd., Japan). With respect to the EVOH, as a preferred example of this resin, there can be mentioned a saponification resin having a saponification ratio of from 30 to 100%, which is obtained by subjecting an ethylene/vinyl acetate copolymer having an ethylene content of from 15 to 90 mol % to a saponification reaction. Such EVOH's are also commercially available. Examples of commercially available products of such EVOH's include "EVAL" (trade name of EVOH, manufactured and sold by Kuraray Co., Ltd., Japan) and "SOARNOL" (trade name of EVOH, manufactured and sold by The Nippon Synthetic Chemical Industry Co., Ltd., Japan).

The term "epoxy group-containing compound" means a compound having both a hydroxyl group and an epoxy group in the molecular chain thereof. Specific examples of epoxy group containing compounds include $C_8$-$C_{20}$ epoxidated alcohols, such as an epoxidated stearyl alcohol.

The term "resin having hydroxyl groups at both terminals thereof" means a hydrocarbon polymer (such as a polybutadiene, a polyisoprene or a petroleum resin) having a hydroxyl group or a carboxyl group at both terminals thereof. The molecular weight of the resin is preferably 10,000 or less, more preferably 5,000 or less. Various types of such resin are commercially available. Examples of commercially available products of such resins include "Polytail H" (trade name thereof, manufactured and sold by Mitsubishi Chemical Corporation, Japan) and "Epol" (trade name thereof, manufactured and sold by Idemitsu Petrochemical Co., Ltd., Japan).

The term "hydroxyl group-grafted polyolefin resin" means a graft modified polyolefin obtained by grafting a hydroxyl group onto a polyolefin (such as a polypropylene) by using an organic peroxide or the like. Examples of commercially available products of hydroxyl group-grafted polyolefin resins include "Umex" (trade name thereof, manufactured and sold by Sanyo Chemical Industries, Ltd., Japan).

The above-mentioned components (m) can be used individually or in combination.

If desired, the high frequency welding composition of the present invention may optionally contain an additive. With respect to the additive, there is no particular limitation, and any additives which are conventionally used in thermoplastic resins or rubbery polymers can be used. For example, the additives as described in the above-mentioned "Gomu Purasuchikku Haigou Yakuhin (Additives for Rubber and Plastic)" (Rubber Digest Co., Ltd., Japan) can be used.

The high frequency welding composition of the present invention not only has excellent flexibility, abrasion resistance and scratch resistance, but also is susceptible to welding by the use of a high frequency wave or a microwave. The high frequency welding composition (which may or may not contain an additive) can be advantageously used as various shaped articles (such as a sheet, a film, a non-woven fabric shaped article, and a fibrous shaped article) produced by a method selected from the group consisting of an injection molding, a blow molding, air-pressure molding, a vacuum molding and an extrusion molding. The shaped articles can be used in various fields, such as materials for food packages; material for medical instruments; material for home electric appliances and parts thereof; raw materials for automobile parts, industrial components, household goods and toys; and raw materials for footwear. In the use of the shaped articles, the shaped articles can be welded to substrates by high frequency welding.

(ix) Slush Molding Material

The modified hydrogenated copolymer or modified hydrogenated copolymer composition of the present invention can be used as a slush molding material. More specifically, the modified hydrogenated copolymer or modified hydrogenated copolymer composition of the present invention can be used as a slush molding material having excellent processability and excellent scratch resistance, which can be advantageously used as a raw material for surface skins of car interior goods, such as an instrument panel. Further, a slush molding powder comprising the slush molding material, and a surface skin material comprising the slush molding material and the slush molding powder can be used in various fields.

As the slush molding material of the present invention, it is preferred to use the modified hydrogenated copolymer composition of the present invention, which comprises the modified hydrogenated copolymer (a) of the present invention and a thermoplastic resin (b) and/or a rubbery polymer (b). In the modified hydrogenated copolymer composition as the slush molding material, the component (a)/component (b) weight ratio is generally in the range of from 50/50 to 97/3, preferably from 70/30 to 95/5, more preferably from 80/20 to 90/10.

If desired, the slush molding material of the present invention may optionally contain an additive. With respect to the additive, there is no particular limitation, and any additives which are conventionally used in thermoplastic resins or rubbery polymers can be used. For example, the additives as described in the above-mentioned "Gomu Purasuchikku Haigou Yakuhin (Additives for Rubber and Plastic" (Rubber Digest Co., Ltd., Japan) can be used.

For the purpose of not only maintaining the moldability of the slush molding material, but also imparting excellent thermal resistance to the slush molding material, it is preferred to crosslink the modified hydrogenated copolymer composition (which comprises the components (a) and (b)) in the presence of a crosslinking agent, such as an organic peroxide, to obtain a crosslinked product. The gelation ratio of the crosslinked product is preferably in the range of from 50 to 98%, more preferably from 70 to 95%. In the present invention, the gelation ratio of the crosslinked product is obtained as follows. A sample of the crosslinked product is placed in a bottle in an amount of 5 mg (this weight is hereinafter referred to as $W_1$). To the bottle is added 50 ml of toluene. The resultant mixture in the bottle is heated at 120° C. for 12 hours by using an aluminum block bath, thereby effecting extraction. Then, the resultant mixture in the bottle is subjected to filtration using a stainless steel wire net to thereby obtain a filtration residue on the stainless steel wire net. The filtration residue is dried at 105° C. for five hours to obtain a dried residue. The dried residue is accurately weighed (this weight is hereinafter referred to as $W_2$). The gelation ratio of the crosslinked product is calculated by the following formula:

$$\text{Gelation ratio (\%)} = (W_2/W_1) \times 100.$$

The crosslinking agent is used for introducing a crosslinked structure into the modified hydrogenated copolymer composition, thereby imparting excellent thermal resistance to the modified hydrogenated copolymer composition. Examples of crosslinking agents include an organic peroxide (i.e., the above-mentioned component (e)) and a vulcanization accelerator (i.e., the above-mentioned component (f)). Further, these crosslinking agents can be used in combination with the above-mentioned components (g) and (h). The amount of the crosslinking agent (such as an organic peroxide) is generally from 0.1 to 7 parts by weight, preferably from 0.5 to 5 parts by weight, relative to 100 parts by weight of the modified hydrogenated copolymer composition. The amount of the auxiliary crosslinking agent (such as the component (g)) is generally from 0.03 to 5 parts by weight, preferably from 0.05 to 4 parts by weight, relative to 100 parts by weight of the modified hydrogenated copolymer composition.

Examples of methods for introducing a crosslinked structure into the modified hydrogenated copolymer composition include a method in which the modified hydrogenated copolymer composition, a crosslinking agent (such as an organic peroxide) and optionally an auxiliary crosslinking agent are dry blended, and the resultant mixture is either melt-kneaded at a temperature of from 120 to 230° C. by using a pressuring kneader, or melt-kneaded using a twin-screw extruder in a continuous manner.

It is preferred that the slush molding material of the present invention is used in the form of a powder having an average particle diameter of from 50 to 500 µm, more advantageously from 60 to 450 µm. Such a powder can be obtained by finely grinding the slush molding material by using a grinder, such as a turbo mill, a pin mill or a hammer mill. Generally, the fine grinding of the slush molding material is conducted at room temperature; however, the slush molding material can also be mechanically pulverized while lowering the temperature of the slush molding material to −60° C. or lower by using a refrigeration medium or a refrigeration equipment. When the slush molding material is in the form of a powder having an average particle diameter of from 50 to 500 µm, the fluidity of the powder is improved, so that a shaped article obtained by molding the powder has a smooth surface free of a pinhole. When the average particle diameter of the slush molding material powder is less than 50 µm, the fluidity of such too fine a powder is poor, and a shaped article obtained by molding such powder exhibits a poor appearance. On the other hand, when the average particle diameter of the slush molding material powder is more than 500 µm, the moldability of such too coarse a powder is poor, so that a shaped article obtained by molding such powder tends to suffer a marked occurrence of pinholes.

In the present invention, a surface skin material can be produced by subjecting the slush molding material to a molding, such as a compression molding, a roll forming, an extrusion molding or an injection molding. Alternatively, a surface skin material also can be produced by grinding or pulverizing the slush molding material and subjecting the resultant slush molding material powder to a powder slush molding. In the present invention, the powder slush molding can be performed as follows. For example, a raw material powder of the modified hydrogenated copolymer composition for the powder slush molding is fed to the box type container made of stainless steel (hereinafter, this container is referred to as "powder feeding box"), which is connected to a single-shaft rotational powder slush molding device equipped with a single-shaft rotation handle. To the top of the powder feeding box is attached an electroformed mold, wherein the mold has been preheated to a temperature of from 180 to 300° C., preferably from 200 to 280° C. By rotating the single-shaft rotation handle which is connected to and can rotate on the revolution shaft of the molding device, the powder feeding box and the electroformed mold are caused to simultaneously rotate in a clockwise direction and in a counterclockwise direction alternately every several times, thereby introducing the powder into the mold. The mold is knocked several times using a wooden hammer or the like to remove an excess amount of the powder from the mold. Then, the mold (which contains the modified hydrogenated copolymer composition powder) is removed from the powder feeding box, placed in a heating furnace and heated at a temperature of from 250 to 450° C., preferably from 300 to 430° C., for a period of from 5 to 60 seconds, preferably from 10 to 30 seconds, thereby melting the modified hydrogenated copolymer composition powder in the mold. The mold is cooled using water to thereby obtain a shaped article of the modified hydrogenated copolymer composition. The obtained shaped article is taken out from the mold.

A surface skin material produced using the slush molding material of the present invention or the slush molding powder comprising the slush molding material can be advantageously used as surface skin materials for car interior goods (e.g., an instrument panel, a ceiling, a door, a seat, a pillar, a steering wheel, a handle) and inner linings for furniture, miscellaneous goods or buildings.

(x) Adhesive Composition

By adding an adhesion property imparting agent (hereinafter, frequently referred to as "component (n)") to the modified hydrogenated copolymer or modified hydrogenated copolymer composition of the present invention, an adhesive composition can be prepared. The adhesive composition exhibits an excellent balance of adhesion properties (such as adhesion strength) and exhibits an excellent stability in melt viscosity at high temperatures, so that the adhesive composition can be advantageously used not only as a material for an adhesive layer of an adhesive tape, an adhesive sheet or film, and a surface protection sheet or film for an adhesive label, but also as an adhesive.

When the adhesive composition is prepared using the modified hydrogenated copolymer composition of the present invention, the component (a)/component (b) weight ratio is generally from 50/50 to 97/3, preferably from 60/40 to 95/5, more preferably from 70/30 to 90/10.

With respect to the adhesion property imparting agent, there is no particular limitation, and it is possible to use any conventional adhesion property imparting resins, such as a polyterpene resin, a hydrogenated rosin terpene resin, a terpene/phenol resin and an alicyclic hydrocarbon resin. These agents can be used individually or in combination. Specific examples of adhesion property imparting agents include those which are described in the above-mentioned "Gomu Purasuchikku Haigou Yakuhin (Additives for Rubber and Plastic)" (Rubber Digest Co., Ltd., Japan), such as Clearon P105 (polyterpene resin), Clearon P125 (polyterpene resin), Arkon P-90 (alicyclic hydrocarbon resin) and Arkon P-115 (alicyclic hydrocarbon resin). The amount of the adhesion property imparting agent is generally from 20 to 400 parts by weight, preferably from 50 to 350 parts by weight, relative to 100 parts by weight of the modified hydrogenated copolymer or modified hydrogenated copolymer composition of the present invention. When the amount of the adhesion property imparting agent is less than 20 parts by weight, it is unlikely that the adhesive composition exhibits satisfactory adhesion. On the other hand, when the amount of the adhesion property imparting agent is more than 400 parts by weight, the softening point of the adhesive composition becomes lower. Therefore, in either case, the adhesion properties of the adhesive composition tend to be impaired.

The adhesive composition may contain a conventional softening agent, such as a naphthenic process oil, a paraffinic process oil, or a mixture thereof. Specific examples of softening agents include any one of the rubber-softening agent (i.e., component (i)) which are exemplified in item (i) above for the "reinforcing filler-containing composition". The addition of a softening agent to the adhesive composition is advantageous in that the viscosity of the adhesive composition is reduced, so that the processability and adhesion property of the adhesive composition are improved. The amount of the softening agent is preferably from 0 to 200 parts by weight, more preferably from 0 to 150 parts by weight, relative to 100 parts by weight of the modified hydrogenated copolymer or modified hydrogenated copolymer composition of the present invention. When the amount of the softening agent is more than 200 parts by weight, the retention of the adhesion property of the adhesive composition tends to be markedly impaired.

Further, if desired, the adhesive composition may contain a stabilizer, such as an antioxidant, a light stabilizer or an ultraviolet light absorber, each of which is described in the above-mentioned "Gomu Purasuchikku Haigou Yakuhin (Additives for Rubber and Plastic)" (Rubber Digest Co., Ltd., Japan). Also, the adhesive composition may contain at least one member selected from the group consisting of pigments (such as red iron oxide and titanium dioxide); waxes (such as a paraffin wax, a microcrystalline wax, and a low molecular weight polyethylene wax); thermoplastic resins (such as polyolefin thermoplastic resins (e.g., amorphous polyolefin and an ethylene/ethylacrylate copolymer) and low molecular weight vinyl aromatic thermoplastic resins); natural rubbers; synthetic rubbers, such as a polyisoprene rubber, a polybutadiene rubber, a styrene/butadiene rubber, an ethylene/propylene rubber, a chloroprene rubber, an acrylic rubber, an isoprene/isobutylene rubber, a polypentenamer rubber, a styrene/butadiene block copolymer, a hydrogenated block copolymer obtained by hydrogenating a styrene/butadiene block copolymer, a styrene/isoprene block copolymer, a styrene/butadiene/isoprene block copolymer and the hydrogenation products of these synthetic rubbers.

With respect to the method for producing the adhesive composition, there is no particular limitation. For example, the adhesive composition can be produced by a method in which the above-mentioned components for the adhesive composition are uniformly mixed using a conventional mixer or kneader while heating.

The adhesive composition exhibits not only excellent melt viscosity and excellent adhesive strength, but also excellent stability in melt viscosity. That is, the adhesive composition exhibits excellent balance adhesion properties. By virtue of these excellent properties, the adhesive composition can be advantageously used as a material for an adhesive tape and label, a pressure-sensitive lamina, a pressure-sensitive sheet, a surface protection sheet and film; a back adhesive for fixing a lightweight plastic shaped article, a back adhesive for fixing a carpet or tile, and an adhesive. Especially, the adhesive composition can be advantageously used as a material for an adhesive tape, an adhesive sheet and film, an adhesive label, a surface protection sheet and film, and an adhesive.

(xi) Asphalt Composition

By adding asphalt (hereinafter, referred to as "component (o)") to the modified hydrogenated copolymer of the present invention, an asphalt composition can be prepared. The asphalt composition exhibits excellent balance of asphalt properties, such as ductility, and storage stability at high temperatures. By virtue of these excellent properties, the asphalt composition can be advantageously used as a material for road paving, a roofing sheet, a waterproof sheet, and a sealant.

Examples of asphalts for use in the asphalt composition of the present invention include a petroleum asphalt (i.e., asphalt by-produced by oil refining), a mixture thereof with petroleum, natural asphalt, and a mixture thereof with petroleum. Each of the above-mentioned asphalts contains bitumen as the main component thereof. Specific examples of asphalts include a straight asphalt, a semi-blown asphalt, a blown asphalt, tar, pitch, a cutback asphalt (i.e., a mixture of asphalt with oil), and an asphalt emulsion. These asphalts can be used individually or in combination.

As a preferred asphalt, there can be mentioned a straight asphalt having a penetration ratio of from 30 to 300, preferably from 40 to 200, more preferably from 45 to 150, wherein the penetration ratio of the asphalt is measured in accordance with JIS K2207. The amount of the modified hydrogenated copolymer of the present invention contained in the asphalt composition is generally from 0.5 to 50 parts by weight, preferably from 1 to 30 parts by weight, more preferably from 3 to 20 parts by weight, relative to 100 parts by weight of the asphalt contained in the asphalt composition.

If desired, the asphalt composition may contain an additive. Examples of additives include inorganic fillers, such as calcium carbonate, magnesium carbonate, talc, silica, alumina, titanium oxide, glass fiber, and glass beads; organic reinforcing agents, such as organic fiber and a coumarone/indene resin; crosslinking agents, such as an organic peroxide and an inorganic peroxide; pigments, such as titanium white, carbon black and iron oxide; dyes; flame retardants; antioxidants; ultraviolet absorbers; antistatic agents; lubricants; softening agents, such as a paraffinic process oil, a naphthenic process oil, an aromatic process oil, a paraffin, an organopolysiloxane and mineral oil; plasticizers; adhesion imparting resins, such as a coumarone/indene resin and a terpene resin.

Further examples of additives for the asphalt composition include polyolefin resins, such as an atactic polypropylene and an ethylene/ethyl acrylate copolymer; low molecular weight vinyl aromatic thermoplastic resins; natural rubbers; synthetic rubbers, such as a polyisoprene rubber, an ethylene/propylene rubber, a chloroprene rubber, an acrylic rubber, an isoprene/isobutylene rubber, a styrene/butadiene block copolymer and a hydrogenation product thereof (other than the modified hydrogenated copolymer of the present invention), a styrene/isoprene block copolymer and a hydrogenation product thereof (other than the modified hydrogenated copolymer of the present invention) and a styrene/butadiene/isoprene copolymer and a hydrogenation product thereof (other than the modified hydrogenated copolymer of the present invention); vulcanizing agents, such as sulfur; auxiliary vulcanizing agents; and fillers. These additives can be used individually or in combination. When it is intended to use the asphalt composition as a material for road paving, the composition is generally used in the form of a mixture thereof with an aggregate, such as mineral type crushed stone, sand or slag.

As mentioned above, the modified hydrogenated copolymer or modified hydrogenated copolymer composition of the present invention can be used in various fields. When it is intended to use the modified hydrogenated copolymer or modified hydrogenated copolymer composition in the form of a shaped article, the molding of the modified hydrogenated copolymer or modified hydrogenated copolymer composition can be conducted by a method selected from the group consisting of an extrusion molding, an injection molding, a blow molding, air-pressure molding, a vacuum molding, a foam molding, a multilayer extrusion molding, a multilayer injection molding, a high frequency weld molding, a slush molding and a calender molding. Examples of shaped articles include a sheet, a film, a tube, a nonwoven fabric, a fibrous shaped article, and a synthetic leather substitute. The shaped articles of the modified hydrogenated copolymer or modified hydrogenated copolymer composition of the present invention can be advantageously used in various fields, such as a material for food packages; a material for medical instruments; a raw material for home electric appliances and parts thereof, electronic devices and parts thereof, automobile parts, industrial parts, household utensils and toys; a raw material for footwear, fiber and an adhesive; and an asphalt modifier. Specific examples of automobile parts include a side mall, a grommet, a knob, a weather-strip, a window frame and a sealant therefor, an armrest, a door grip, a steering wheel grip, a console box, a headrest, an instrument panel, a bumper, a spoiler, and a storage cover for an air-bag device. Specific examples of medical instruments include a blood bag, a bag for storing platelets, a transfusion bag, a bag for artificial dialysis, a medical tubing, and a catheter. Further, the modified hydrogenated copolymer or modified hydrogenated copolymer composition of the present invention can be used in a substrate for an adhesive tape, sheet or film; a substrate for a surface protection film, an adhesive for a surface protection film; an adhesive for a carpet; a stretch wrapping film; a heat shrinkable film; a coating material for a coated steel pipe; and a sealant.

In the above, the use of the compositions disclosed in the present invention is explained mainly in connection with various shaped articles of the compositions. Hereinbelow, a detailed explanation on the shaped articles of the present invention is made, taking as examples the multilayer extrusion molded articles and the multilayer injection molded articles.

Multilayer Extrusion Molded Article

The multilayer extrusion molded article of the present invention is produced by a method in which the modified hydrogenated copolymer or modified hydrogenated copolymer composition of the present invention, or a composition (such as the above-mentioned reinforcing filler composition, the above-mentioned crosslinking product or the above-mentioned building material) (other than the above-mentioned modified hydrogenated copolymer composition) of the present invention is subjected to a coextrusion with a thermoplastic resin and/or a rubbery polymer to thereby produce a multilayer sheet, and the produced multilayer sheet is subjected to heat forming. A shaped article obtained by subjecting the multilayer film or sheet of item (iv) above to heat forming is also a multilayer extrusion molded article.

The above-mentioned coextrusion is conducted using two or more extruders having one die in common as follows. The modified hydrogenated copolymer or modified hydrogenated copolymer composition of the present invention, or the composition (other than the modified hydrogenated copolymer composition) of the present invention is fed to at least one of the extruders, and the thermoplastic resin and/or the rubbery polymer are/is fed to the other extruder(s). By extruding these components through the die, a multilayer sheet is produced. The produced multilayer sheet is subjected to heat forming, such as a vacuum molding or air-pressure molding, to obtain a multilayer extrusion molded article. Examples of dies used for the coextrusion include a multimanifold die, a combining, an adapter die and a multislot die. A multimanifold die and the like can also be used for producing a multilayer blow molded article or a multilayer tubular article.

Examples of thermoplastic resins include those which are exemplified above for the "component (b)" used in the modified hydrogenated copolymer composition of the present invention. Also, examples of rubbery polymers include those which are exemplified above for the "component (b)" used in the modified hydrogenated copolymer composition of the present invention.

The multilayer extrusion molded article of the present invention can be used as a material for interior and exterior parts of automobiles, parts of furnishings, household electrical appliances, parts of office automation apparatuses, materials for food packages and containers, and materials for medical instruments. Especially, the multilayer tubular extrusion molded article can be used as a material for tubes for medical instruments (such as a blood circuit tube, a drip transfusion tube and a catheter), household hoses (such as a garden hose), tubes for a vending machine, and the like.

Multilayer Injection Molded Article

The multilayer injection molded article of the present invention is produced by a method in which the modified hydrogenated copolymer or modified hydrogenated copolymer composition of the present invention, or a composition (such as the above-mentioned reinforcing filler composition, the above-mentioned crosslinking product or the above-mentioned building material) (other than the above-mentioned modified hydrogenated copolymer composition) of the present invention is subjected, together with a thermoplastic resin and/or a rubbery polymer, to two-color injection molding or multilayer insert injection molding.

The multilayer injection molding is conducted using two or more injection molding machines as follows. The modified hydrogenated copolymer or modified hydrogenated copolymer composition of the present invention, or the composition (other than the above-mentioned modified hydrogenated copolymer composition) of the present invention is fed to at least one of the injection molding machines, and the thermoplastic resin and/or the rubbery polymer are/is fed to the other injection molding machine(s). First, the thermoplastic resin and/or the rubbery polymer are/is molded to obtain a molded article of the thermoplastic resin and/or the rubbery polymer, and the molded article is inserted into a mold into which the copolymer or composition is to be injected. Then, the copolymer or composition is injected into the mold to form a molded article of the copolymer or composition, thereby obtaining a multilayer injection molded article comprising a layer of the copolymer or composition and a layer of the thermoplastic resin and/or the rubbery polymer.

In the production of the multilayer injection molded article of the present invention, a two-color injection molding machine and an insert injection molding machine can be used individually or in combination. Preferred examples of two-color injection molding machines include a two-color injection molding machine equipped with a core-back mold which is generally used in the art, and a two-color injection molding machine equipped with a mold having the ability to rotate in 180 degrees (this injection molding machine is called "of DC type"). Preferred examples of insert injection molding machines include a vertical system molding machine, that is, a composite automatic molding machine equipped with an automatic insertion unit and a product-drawing unit, which has the ability to conduct pretreatment and after-processing.

Examples of thermoplastic resins include those which are exemplified above for the "component (b)" used in the modified hydrogenated copolymer composition of the present invention. Also, examples of rubbery polymers include those which are exemplified above for the "component (b)" used in the modified hydrogenated copolymer composition of the present invention.

Also, in the present invention, as a multilayer injection molded article, a molded article containing a metal part can be obtained. With respect to the material and shape of the metal part, there is no particular limitation. Representative examples of metal parts include a bolt and a metal core, each of which is made of iron, stainless steel, copper, brass, nickel or the like.

The multilayer injection molded article of the present invention has excellent adherence with respect to mutually adjacent constituent layers thereof. The multilayer injection molded article can be widely used in various fields, such as fields of interior or exterior parts of automobiles, parts of furnishings, household electrical appliances and parts of office automation apparatuses.

BEST MODE FOR CARRYING OUT THE INVENTION

Hereinbelow, the present invention will be described in more detail with reference to the following Reference Example, Examples and Comparative Examples, which should not be construed as limiting the scope of the present invention.

I. Modified Hydrogenated Copolymer

In Examples 1 to 7 and Comparative Example 1, modified unhydrogenated copolymers were produced, and the modified unhydrogenated copolymers were then hydrogenated to thereby obtain modified hydrogenated copolymers. In Comparative Example 2, a commercially available unmodified unhydrogenated copolymer (styrene/butadiene random copolymer) was hydrogenated to thereby obtain an unmodified hydrogenated copolymer.

The characteristics and properties of the modified hydrogenated copolymers and unmodified hydrogenated copolymers were determined by the following methods.

I-1) Styrene Content:

The styrene content of the unmodified unhydrogenated copolymer was determined using an ultraviolet spectrophotometer (trade name: UV-2450; manufactured and sold by Shimadzu Corporation, Japan).

I-2) Polystyrene Block (H) Content (Os Value):

The polystyrene block (H) content of the unmodified unhydrogenated copolymer was determined by the osmium tetraoxide degradation method described in I. M. Kolthoff et al., J. Polym. Sci. 1, 429 (1946). For the degradation of the unmodified unhydrogenated copolymer, a solution obtained by dissolving 0.1 g of osmic acid in 125 ml of tertiary butanol was used. (Hereinafter, the polystyrene block content obtained by the above-mentioned method is referred to as the "Os value").

The polystyrene block (H) content of the modified hydrogenated copolymer was measured by the method described in Y. Tanaka et al., RUBBER CHEMISTRY and TECHNOLOGY 54, 685 (1981), using a nuclear magnetic resonance (NMR) apparatus (trade name: JMN-270WB; manufactured and sold by JEOL LTD., Japan). Specifically, a sample solution was prepared by dissolving 30 mg of the modified hydrogenated copolymer in 1 g of deuterated chloroform, and the sample solution was subjected to $^1$H-NMR spectrometry to obtain the $^1$H-NMR spectrum of the modified hydrogenated copolymer. From the $^1$H-NMR spectrum, the total integral value, the integral value of the chemical shifts in the range of from 6.9 to 6.3 ppm, and the integral value of the chemical shifts in the range of from 7.5 to 6.9 ppm were obtained. Using these integral values, the polystyrene block content (Ns value) of the modified hydrogenated copolymer was obtained. The Ns value was then converted to the Os value. The Os value is obtained by the following calculation:

Block styrene (St) intensity=((6.9 to 6.3 ppm) integral value)/2

Random styrene (St) intensity =

(7.5 to 6.9 ppm) integral value − 3(block St intensity)

Ethylene/butylene (EB) intensity =

{total integral value − 3(block St intensity + radom St intensity)}/8

Polystyrene block content (Ns value) = 104 (block St intensity)/
{104 (block St intensity + random St intensity) + 56 (EB intensity)}

Os value=−0.012($Ns$)$^2$+1.8($Ns$)−13.0

I-3) Vinyl Bond Content of the Unmodified Unhydrogenated Copolymer:

The vinyl bond content of the unmodified unhydrogenated copolymer was calculated by the Hampton method, using an infrared spectrophotometer (trade name: FT/IR-230; manufactured and sold by Japan Spectroscopic Co., Ltd., Japan).

I-4) Weight Average Molecular Weight and Molecular Weight Distribution:

The weight average and number average molecular weights of the modified unhydrogenated copolymer and the unmodified hydrogenated copolymer, and the molecular weight distributions of the modified unhydrogenated copolymer and the unmodified hydrogenated copolymer were measured by gel permeation chromatography (GPC) using a GPC apparatus (manufactured and sold by Waters Corporation, U.S.A.) under conditions wherein tetrahydrofuran was used as a solvent and the column temperature was 35° C. With respect to each of the modified unhydrogenated copolymer and the unmodified hydrogenated copolymer, the weight average molecular weight thereof was determined from a GPC chromatogram (obtained by GPC) showing the peak molecular weight thereof, using a calibration curve obtained with respect to commercially available monodisperse standard polystyrene samples and a standard type polystyrene gel column. The number average molecular weights of the modified unhydrogenated copolymer and the unmodified hydrogenated copolymer were determined in substantially the same manner as mentioned above. With respect to each of the modified unhydrogenated copolymer and the unmodified hydrogenated copolymer, the molecular weight distribution thereof is defined as the ratio (Mw/Mn) of the weight average molecular weight (Mw) thereof to the number average molecular weight (Mn) thereof.

I-5) Modification Ratio:

A modified unhydrogenated copolymer adsorbs on a silica gel column but not on a polystyrene gel column. Based on such an unique property of the modified unhydrogenated copolymer, the modification ratio of the modified unhydrogenated copolymer was determined as follows. A sample solution containing a modified unhydrogenated copolymer sample and a low molecular weight internal standard polystyrene was prepared and the prepared sample solution was subjected to GPC using the standard type polystyrene gel column and the GPC apparatus used in item I-4) above, to thereby obtain a chromatogram. On the other hand, the same sample solution was subjected to GPC in substantially the same manner as mentioned above, except that a silica gel column (trade name: Zorbax; manufactured and sold by DuPont, U.S.A) was used. From the chromatogram obtained using the polystyrene gel column and the chromatogram obtained using the silica gel column, the amount of modified unhydrogenated copolymers adsorbed on the silica gel column was determined, from which the modification ratio of the modified unhydrogenated copolymer was obtained.

I-6) Hydrogenation Ratio of the Double Bonds in Conjugated Diene Monomer Units:

The hydrogenation ratio was measured by means of a nuclear magnetic resonance (NMR) apparatus (trade name: DPX-400; manufactured and sold by BRUKER, Germany).

I-7) Crystallization Peak and Quantity of Heat at the Crystallization Peak:

With respect to each of the modified or unmodified hydrogenated copolymer, the crystallization peak and the quantity of heat at the crystallization peak were measured by means of a differential scanning calorimeter (DSC) (trade name: DSC3200S; manufactured and sold by MAC Science Co., Ltd., Japan). Specifically, the modified or unmodified hydrogenated copolymer was fed into the differential scanning calorimeter. The internal temperature of the differential scanning calorimeter was elevated at a rate of 30° C./min from room temperature to 150° C. and, then, lowered at a rate of 10° C./min from 150° C. to −100° C., thereby obtaining a DSC chart (i.e., crystallization curve) with respect to the modified or unmodified hydrogenated copolymer. From the obtained DSC chart, whether or not the crystallization peak was present was confirmed. When a crystallization peak was observed in the DSC chart, the temperature at which the crystallization peak was observed was defined as the crystallization peak temperature, and the quantity of heat at the crystallization peak was measured.

I-8) Dunlop Impact Resilience:

The Dunlop impact resilience was measured at 23° C. in accordance with the Dunlop impact resilience test prescribed in BS 903.

I-9) Scratch Resistance (Pencil Scratch Test):

The scratch resistance of the modified or unmodified hydrogenated copolymer was measured in accordance with the pencil scratch test prescribed in JIS K 5400. Specifically, a sample of the modified or unmodified hydrogenated copolymer was scratched using an HB pencil at 23° C. under a load of 200 g. After the pencil scratch test, the appearance of the sample of the modified or unmodified hydrogenated copolymer was visually observed and evaluated by the following criteria.

|   | Appearance of the sample after the pencil scratch test |
|---|---|
| ⊚ | Scratch is not observed |
| Δ | Slight scratch is observed |
| x | Conspicuous scratch is observed |

I-10) Flexibility:

The 100% modulus was used as an index for flexibility. The tensile property of a compression-molded specimen of the modified or unmodified hydrogenated copolymer was measured in accordance with JIS K 6251 to obtain the stress sustained by the specimen when the specimen was stretched by 100% (hereinafter, this stress value is referred to as the "100% modulus" of the modified or unmodified hydrogenated copolymer). The smaller the 100% modulus of the modified or unmodified hydrogenated copolymer, the better the flexibility of the modified or unmodified hydrogenated copolymer. It is preferred that the 100% modulus of the modified or unmodified hydrogenated copolymer is 120 kg/cm² or less.

I-11) Abrasion Resistance:

Using a Color Fastness Rubbing Tester (trade name: AB-301; manufactured and sold by TESTER SANGYO CO., LTD., Japan), the leather grained surface of a sheet obtained by molding the modified or unmodified hydrogenated copolymer was abraded 10,000 times with an abrading cloth (canequim No. 3) under a load of 500 g. The decrease in volume of the sheet, which was caused by the 10,000 times abrasion of the sheet, was measured, and used as a yardstick for the abrasion resistance of the modified or unmodified hydrogenated copolymer. Specifically, the abrasion resistance of the modified or unmodified hydrogenated copolymer was evaluated by the following criteria:

|   | Decrease in volume of the sheet, which is caused by the 10,000 times abrasion of the sheet |
|---|---|
| ⊚ | 0.01 ml or less |
| ○ | From more than 0.01 ml to 0.05 ml |
| Δ | From more than 0.05 ml to 0.10 ml |
| x | More than 0.10 ml |

I-12) Adhesiveness

The adhesiveness of the modified or unmodified hydrogenated copolymer was evaluated using the adhesion strength measured by the T-type peel strength test as a yardstick. (That is, the greater the adhesion strength, the better the adhesiveness.)

The adhesion of the sample copolymer to an adherend and the peel strength test were performed under the following conditions.

(Conditions for Adhesion)

A sample copolymer and an adherend were preheated at 160° C. for five minutes and, then, pressed for five minutes under a load of 1 kg/cm², thereby obtaining a test specimen.

(Peel Strength Test)

The peel strength test was performed at a pulling rate of 200 mm/min.

The adherend used for preparing the test specimen was an aluminum plate (thickness: 100 μm) or a PET film (thickness: 50 μm).

The modifiers (below-mentioned M1 to M5) which were used in Examples and Comparative Examples, and the structures of the modified hydrogenated copolymers obtained by using the modifiers, are explained below.

M1: When M1 is used as a modifier, the obtained modified hydrogenated copolymer has a structure represented by formula (III), wherein $C^1$ represents a unit which is represented by any one of formulae (d-1) and (e-1), and $D^1$ represents a unit which is represented by formula (f-1).

M2: When M2 is used as a modifier, the obtained modified hydrogenated copolymer has a structure represented by formula (IV), wherein $C^1$ represents a unit which is represented by any one of formulae (d-1) and (e-1), and $D^1$ represents a unit which is represented by formula (f-1).

M3: When M3 is used as a modifier, the obtained modified hydrogenated copolymer has a structure represented by formula (I) or (II), wherein $A^1$ represents a unit which is represented by any one of formulae (a-1) and (b-1), and $B^1$ represents a unit which is represented by formula (c-1).

M4: When M4 is used as a modifier, the obtained modified hydrogenated copolymer has a structure represented by formula (V), wherein $E^1$ represents a unit which is represented by formula (g-1), and $F^1$ represents a unit which is represented by any one of formulae (h-1), (i-1) and (j-1).

M5: When M5 is used as a modifier, the obtained modified hydrogenated copolymer has a structure represented by formula (V), wherein $E^1$ represents a unit which is represented by formula (g-1), and $F^1$ represents a unit which is represented by any one of formulae (h-1), (i-1) and (j-1).

REFERENCE EXAMPLE 1

<Preparation of a Hydrogenation Catalyst>

A hydrogenation catalyst used in the hydrogenation reactions of modified or unmodified unhydrogenated copolymers in the following Examples and Comparative Examples was prepared by the following method.

A reaction vessel was purged with nitrogen. The reaction vessel was charged with two liters of dried, purified cyclohexane. Subsequently, 40 mmol of bis-($\eta^5$-cyclopentadienyl)titanium di-(p-tolyl) and 150 g of 1,2-polybutadiene (1,2-vinyl bond content: about 85 mol %) having a molecular weight of about 1,000 were added to and dissolved in the cyclohexane in the reaction vessel. A cyclohexane solution containing 60 mmol of n-butyllithium was charged into the reaction vessel, thereby effecting a reaction at room temperature for five minutes, immediately followed by addition of 40 mmol of n-butanol while stirring. The resultant reaction mixture was stored at room temperature to obtain a hydrogenation catalyst containing titanium.

EXAMPLE 1

An unmodified unhydrogenated copolymer was produced by performing a continuous polymerization by the following method in which two reaction vessels (i.e., a first reaction vessel and a second reaction vessel) were used, each of which has an internal volume of 10 liters and is equipped with a stirrer and a jacket.

A cyclohexane solution of butadiene (butadiene concentration: 24% by weight), a cyclohexane solution of styrene (styrene concentration: 24% by weight), and a cyclohexane solution of n-butyllithium (which solution contained 0.077 part by weight of n-butyllithium, relative to 100 parts by weight of the total of the monomers for copolymerization (i.e., the total of the above-mentioned butadiene and styrene) were fed to the bottom portion of the first reaction vessel at rates of 4.51 liters/hr, 5.97 liters/hr and 2.0 liters/hr, respectively. A cyclohexane solution of N,N,N',N'-tetramethylethylenediamine was further fed to the bottom portion of the first reaction vessel at a rate wherein the amount of N,N,N',N'-tetramethylethylenediamine fed to the first reaction vessel was 0.44 mole, per mole of the n-butyllithium, to thereby perform a continuous polymerization at 90° C. The reaction temperature was adjusted by controlling the jacket temperature. The temperature around the bottom portion of the first reaction vessel was about 88° C. and the temperature around the top of the first reaction vessel was about 90° C. The average residence time of a polymerization reaction mixture in the first reaction vessel was about 45 minutes. The conversion of butadiene was approximately 100% and the conversion of styrene was 99%.

From the first reaction vessel, a copolymer solution was withdrawn and fed to the bottom portion of the second reaction vessel. Simultaneously with the feeding of the copolymer solution, a cyclohexane solution of styrene (concentration of styrene: 24% by weight) was fed to the bottom portion of the second reaction vessel at 2.38 liters/hr. In the second reaction vessel, a continuous polymerization was performed at 90° C. to thereby produce an unmodified unhydrogenated copolymer (living polymer). The conversion of styrene as measured at the outlet of the second reaction vessel was 98%.

The produced unmodified unhydrogenated copolymer was analyzed by the above-mentioned methods. As a result, it was found that the unmodified unhydrogenated copolymer had a styrene content of 67% by weight, a polystyrene block (H) content (Os value) of 20% by weight and a vinyl bond content (as measured with respect to the butadiene monomer units in the copolymer) of 14 mol %.

Subsequently, the unmodified unhydrogenated copolymer (living polymer) produced by the above-mentioned continuous polymerization was subjected to a modification reaction as follows. The unmodified unhydrogenated copolymer was charged into a separate reaction vessel which has an internal volume of 10 liters and is equipped with a stirrer and a jacket. To the reaction vessel was added 1,3-dimethyl-2-imidazolidinone as a modifier (modifier M1), wherein the modifier was used in an equimolar amount, relative to n-butyllithium used in the polymerization, and the unmodified unhydrogenated copolymer was reacted with the modifier at 70° C. for 20 minutes, thereby obtaining a modified unhydrogenated copolymer. The obtained modified unhydrogenated copolymer had a weight average molecular weight of 200,000, a molecular weight distribution of 1.9 and a modification ratio of 80%.

Then, to the obtained modified unhydrogenated copolymer in the reaction vessel was added the above-mentioned hydrogenation catalyst in an amount of 100 ppm by weight, in terms of the amount of titanium, based on the weight of the modified unhydrogenated copolymer. A hydrogenation reaction was performed under conditions wherein the hydrogen pressure was 0.7 MPa and the reaction temperature was 65° C. After completion of the hydrogenation reaction, methanol was added to the reaction vessel, followed by addition of, as a stabilizer, octadecyl-3-(3,5-di-t-butyl-4-hydroxyphenyl)propionate (0.3 part by weight, relative to 100 parts by weight of the modified unhydrogenated copolymer), to thereby obtain a modified hydrogenated copolymer (polymer 1).

Polymer 1 had a hydrogenation ratio of 99%. The Ns value of polymer 1 (measured by the above-mentioned NMR method) was 21% by weight, and the polystyrene block content (Os value) calculated from the Ns value by the above-mentioned method was 20% by weight. Further, the styrene content of polymer 1 was measured by the above-mentioned NMR method, and found to be 67% by weight. In a DSC chart obtained with respect to polymer 1, no crystallization peak was observed. The characteristics and properties of polymer 1 are shown in Table 1.

EXAMPLE 2

An unmodified unhydrogenated copolymer was produced by performing a continuous polymerization by the following method in which a reaction vessel which has an internal volume of 10 liters and is equipped with a stirrer and a jacket was used.

A cyclohexane solution which contained, as monomers for copolymerization, butadiene and styrene (butadiene/styrene weight ratio: 30/70; total concentration of the butadiene and styrene monomers: 22% by weight), and a cyclohexane solution of n-butyllithium (which solution contained 0.067 part by weight of n-butyllithium, relative to 100 parts by weight of the total of the butadiene and styrene monomers) were fed to the bottom portion of the reaction vessel at rates of 13.3 liters/hr and 1.0 liter/hr, respectively. A cyclohexane solution of N,N,N',N'-tetramethylethylenediamine was further fed to the bottom portion of the reaction vessel at a rate wherein the amount of N,N,N',N'-tetramethylethylenediamine fed to the reaction vessel was 0.82 mole, per mole of the n-butyllithium, to thereby perform a continuous polymerization at 90° C., thereby producing an unmodified unhydrogenated copolymer. In the production of the unmodified unhydrogenated copolymer, the reaction temperature was adjusted by controlling the jacket temperature. The temperature around the bottom portion of the reaction vessel was about 87° C. and the temperature around the top of the reaction vessel was about 90° C. The average residence time of a polymerization reaction mixture in the reaction vessel was about 45 minutes. The conversion of butadiene was approximately 100% and the conversion of styrene was approximately 96%.

Next, using the produced unmodified unhydrogenated copolymer, a modified hydrogenated copolymer (polymer 2) was produced in the same manner as in Example 1 (i.e., modification, hydrogenation, addition of methanol, and addition of the stabilizer were conducted in the same manner as in Example 1). The characteristics and properties of polymer 2 were measured by the above-mentioned methods. The results are shown in Table 1.

EXAMPLE 3

An unmodified unhydrogenated copolymer (living polymer) was produced by performing substantially the same continuous polymerization as in Example 2, except that the butadiene/styrene weight ratio of the cyclohexane solution containing butadiene and styrene monomers was changed to 24/76. Using the produced unmodified unhydrogenated copolymer, a modified hydrogenated copolymer (polymer 3) was produced in the same manner as in Example 2 (i.e., modification, hydrogenation, addition of methanol, and addition of the stabilizer were conducted in the same manner as in Example 2). The characteristics and properties of polymer 3 were measured by the above-mentioned methods. The results are shown in Table 1.

EXAMPLE 4

An unmodified unhydrogenated copolymer (living polymer) was produced by performing substantially the same continuous polymerization as in Example 1, except that the amount of n-butyllithium fed to the reaction vessel was changed to 0.07 part by weight, relative to 100 parts by weight of the total of the butadiene and styrene monomers.

The produced unmodified unhydrogenated copolymer (living polymer) was subjected to a modification reaction in substantially the same manner as in Example 1, except that the modifier was changed to N-methylpyrrolidone (modifier M2), thereby obtaining a modified unhydrogenated copolymer.

Next, using the modified unhydrogenated copolymer, a modified hydrogenated copolymer (polymer 4) was obtained in substantially the same manner as in Example 1, except that the amount of hydrogen fed to the reaction vessel (i.e., hydrogen pressure) was reduced so as to adjust the hydrogenation ratio of the resultant modified hydrogenated copolymer to 85%. The characteristics and properties of polymer 4 were measured by the above-mentioned methods. The results are shown in Table 1.

EXAMPLE 5

An unmodified unhydrogenated copolymer (living polymer) was produced by performing substantially the same continuous polymerization as in Example 2, except that the amount of n-butyllithium fed to the reaction vessel was changed to 0.21 part by weight, relative to 100 parts by weight of the total of the butadiene and styrene monomers.

The produced unmodified unhydrogenated copolymer (living polymer) was subjected to a modification reaction in substantially the same manner as in Example 1, except that the modifier was changed to tetraglycidyl-1,3-bisaminomethylcyclohexane (modifier M3) and the modifier was used in an amount of 0.4 mole, relative to n-butyllithium used in the polymerization, thereby obtaining a modified copolymer.

Next, using the modified unhydrogenated copolymer, a modified hydrogenated copolymer (polymer 5) was obtained in the same manner as in Example 2 (i.e., hydrogenation, addition of methanol, and addition of the stabilizer were conducted in the same manner as in Example 2). The characteristics and properties of polymer 5 were measured by the above-mentioned methods. The results are shown in Table 1.

EXAMPLE 6

An unmodified unhydrogenated copolymer was produced by the following method in which a reaction vessel which has an internal volume of 10 liters and is equipped with a stirrer and a jacket was used.

The reaction vessel was charged with 10 parts by weight of cyclohexane and the internal temperature of the reaction vessel was adjusted to 70° C. To the 70° C. reaction vessel were added 0.072 part by weight of n-butyllithium, relative to 100 parts by weight of the total of the monomers for copolymerization (i.e., the total of butadiene and styrene to be added to the reaction vessel) and 0.8 mole, per mole of the n-butyllithium, of N,N,N',N'-tetramethylethylenediamine, to thereby obtain a mixture. Then, a cyclohexane solution of 10 parts by weight of styrene as a monomer for copolymerization (styrene monomer concentration: 22% by weight) was added to the above-obtained mixture over about 3 minutes and the contents of the reaction vessel were subjected to a polymerization reaction for 30 minutes while maintaining the internal temperature of the reaction vessel at about 70° C.

Subsequently, a cyclohexane solution which contained, as monomers for copolymerization, butadiene and styrene (butadiene/styrene weight ratio: 35/45; total concentration of the butadiene and styrene monomers: 22% by weight) was continuously fed to the reaction vessel at a constant rate of 0.107 liter/min over 60 minutes while maintaining the internal temperature of the reaction vessel at about 70° C.

Then, a cyclohexane solution of 10 parts by weight of styrene as a monomer for copolymerization (styrene monomer concentration: 22% by weight) was further added to the reaction vessel over 3 minutes and the contents of the reaction vessel were subjected to a polymerization reaction for 30 minutes while maintaining the internal temperature of the reaction vessel at about 70° C., thereby obtaining an unmodified unhydrogenated copolymer (living polymer).

The obtained unmodified unhydrogenated copolymer was subjected to a modification reaction in the same manner as in Example 1 (i.e., the modifier M1 was used in an equimolar amount, relative to n-butyllithium used for performing the polymerization reaction) to thereby obtain a modified unhydrogenated copolymer. The modification ratio of the obtained modified unhydrogenated copolymer was 85%.

Next, using the modified unhydrogenated copolymer, a modified hydrogenated copolymer (polymer 6) was produced in the same manner as in Example 1 (i.e., hydrogenation, addition of methanol, and addition of the stabilizer were conducted in the same manner as in Example 1).

Polymer 6 had a hydrogenation ratio of 97%. In a DSC chart obtained with respect to polymer 6, no crystallization peak was observed. The characteristics and properties of polymer 6 are shown in Table 1.

EXAMPLE 7

An unmodified unhydrogenated copolymer was produced by the following method in which a reaction vessel which has an internal volume of 10 liters and is equipped with a stirrer and a jacket was used.

The reaction vessel was charged with 10 parts by weight of cyclohexane and the internal temperature of the reaction vessel was adjusted to 70° C. To the 70° C. reaction vessel were added 0.25 part by weight of n-butyllithium, relative to 100 parts by weight of the total of the monomers for copolymerization (i.e., the total of butadiene and styrene to be added to the reaction vessel) and 0.7 mole, per mole of the n-butyllithium, of N,N,N',N'-tetramethylethylenediamine, to thereby obtain a mixture. Then, a cyclohexane solution of 22 parts by weight of styrene as a monomer for copolymerization (styrene monomer concentration: 22% by weight) was added to the above-obtained mixture over about 3 minutes and the contents of the reaction vessel were subjected to a polymerization reaction for 30 minutes while maintaining the internal temperature of the reaction vessel at about 70° C.

Subsequently, a cyclohexane solution which contained, as monomers for copolymerization, butadiene and styrene (butadiene/styrene weight ratio: 34/44; total concentration of the butadiene and styrene monomers: 22% by weight) was continuously fed to the reaction vessel at a constant rate of 0.104 liter/min over 60 minutes while maintaining the internal temperature of the reaction vessel at about 70° C., thereby obtaining an unmodified unhydrogenated copolymer (living polymer).

The obtained unmodified unhydrogenated copolymer was subjected to a modification reaction in the same manner as in Example 5 (i.e., the modifier M3 was used in an amount of 0.4 mole, relative to n-butyllithium used for performing the polymerization reaction) to thereby obtain a modified unhydrogenated copolymer. The modification ratio of the obtained modified unhydrogenated copolymer was 80%.

Next, using the modified unhydrogenated copolymer, a modified hydrogenated copolymer (polymer 7) was produced in the same manner as in Example 1 (i.e., hydrogenation, addition of methanol, and addition of the stabilizer were conducted in the same manner as in Example 1). The characteristics and properties of polymer 7 are shown in Table 1.

COMPARATIVE EXAMPLE 1

An unmodified unhydrogenated copolymer was produced by performing substantially the same continuous polymerization as in Example 1, except that the feeding rate of the cyclohexane solution of styrene to the first reaction vessel was changed to 2.06 liters/hr, and the feeding rate of the cyclohexane solution of styrene to the second reaction vessel was changed to 1.37 liters/hr. Using the produced unmodified unhydrogenated copolymer, a modified hydrogenated copolymer (polymer 8) was produced in the same manner as in Example 1 (i.e., modification, hydrogenation, addition of methanol, and addition of the stabilizer were conducted in the same manner as in Example 1). The characteristics and properties of polymer 8 were measured by the above-mentioned methods. The results are shown in Table 1.

COMPARATIVE EXAMPLE 2

A commercially available styrene-butadiene random copolymer (trade name: Asaprene 6500; manufactured and sold by Japan Elastomer Co., Ltd., Japan) was provided. Using this unmodified unhydrogenated copolymer, an unmodified hydrogenated copolymer (polymer 9) was produced in the same manner as in Example 1 (i.e., hydrogenation, addition of methanol, and addition of the stabilizer were conducted in the same manner as in Example 1). The characteristics and properties of polymer 9 were measured by the above-mentioned methods. The results are shown in Table 1. It should be noted that, in a DSC chart obtained with respect to polymer 9, a crystallization peak was observed at 35° C., and the quantity of heat at the crystallization peak was found to be 4.7 J/g.

TABLE 1

| | | Structures of polymer | | | | | | | | |
|---|---|---|---|---|---|---|---|---|---|---|
| | | Styrene content (% by weight) | Polystyrene block (H) content (% by weight) | Vinyl bond content (mol %) | Weight average molecular weight (×10,000) | Molecular weight distribution (Mw/Mn) | Modification | | Hydrogenation ratio (%) | Crystallization peak** |
| | Sample number | | | | | | Modifier* | Modification ratio (%) | | |
| Ex. 1 | Polymer 1 | 67 | 20 | 14 | 20.0 | 1.9 | M1 | 80 | 99 | no |
| Ex. 2 | Polymer 2 | 67 | 1 | 14 | 19.0 | 1.9 | M1 | 80 | 99 | no |
| Ex. 3 | Polymer 3 | 74 | 4 | 18 | 19.5 | 1.9 | M1 | 70 | 98 | no |
| Ex. 4 | Polymer 4 | 66 | 18 | 13 | 22.8 | 1.9 | M2 | 60 | 85 | no |
| Ex. 5 | Polymer 5 | 66 | 1 | 15 | 21.2 | 2.1 | M3 | 75 | 99 | no |
| Ex. 6 | Polymer 6 | 65 | 20 | 20 | 16.2 | 1.1 | M1 | 85 | 97 | no |
| Ex. 7 | Polymer 7 | 66 | 22 | 18 | 18.0 | 1.4 | M3 | 80 | 98 | no |
| Comp. Ex. 1 | Polymer 8 | 45 | 18 | 15 | 20.2 | 1.9 | M1 | 80 | 98 | no |
| Comp. Ex. 2 | Polymer 9 | 65 | 8 | 15 | 18.5 | 1.1 | — | 0 | 97 | 4.7 |

TABLE 1-continued

| | | Properties of polymer | | | | Adhesion property (gf/cm) | |
|---|---|---|---|---|---|---|---|
| | Sample number | Dunlop Impact resistance (%) | Scratch resistance | Flexibility (100% modulus (kg/cm$^2$)) | Abrasion resistance | On an aluminum plate | On a PET film |
| Ex. 1 | Polymer 1 | 16 | ⊚ | 39 | ○ | 75 | 48 |
| Ex. 2 | Polymer 2 | 7 | ⊚ | 30 | ⊚ | 75 | 45 |
| Ex. 3 | Polymer 3 | 10 | ⊚ | 40 | ⊚ | 70 | 43 |
| Ex. 4 | Polymer 4 | 10 | ⊚ | 24 | ⊚ | 55 | 40 |
| Ex. 5 | Polymer 5 | 8 | ⊚ | 35 | ⊚ | 55 | 55 |
| Ex. 6 | Polymer 6 | 12 | ⊚ | 30 | ⊚ | 80 | 50 |
| Ex. 7 | Polymer 7 | 14 | ○ | 40 | ○ | 60 | 55 |
| Comp. Ex. 1 | Polymer 8 | 50 | x | 7 | x | 65 | 41 |
| Comp. Ex. 2 | Polymer 9 | 3 | ⊚ | 160 | Δ | 10 | 22 |

*M1: 1,3-dimethyl-2-imidazolidinone
M2: N-methylpyrrolidone
M3: Tetraglycidyl-1,3-bisaminomethylcyclohexane
**If any, there is indicated the quantity of heat (J/g).

II. Resinous Polymer Composition

In Example 8 and Comparative Example 3, resinous polymer compositions (namely, compositions which exhibit properties possessed by a resin) were produced.

The properties of the resinous polymer compositions were measured and evaluated by the following methods.

II-1) Tensile Properties (Tensile Strength and Tensile Elongation):

The tensile properties were measured in accordance with ASTM D638 under conditions wherein the pulling rate was 5 mm/min.

EXAMPLE 8 and COMPARATIVE EXAMPLE 3

In Example 8 and Comparative Example 3, a HIPS and a PP were used as a thermoplastic resin other than the modified hydrogenated copolymer, and polymer 1 was used as a modified hydrogenated copolymer. The "HIPS" means a high impact polystyrene (trade name: 475D; manufactured and sold by A & M STYRENE CO., LTD., Japan). The "PP" means a polypropylene (i.e., propylene homopolymer) (trade name: PL500A; manufactured and sold by SunAllomer Ltd., Japan).

In Example 8, the HIPS (70 parts by weight), the PP (30 parts by weight) and polymer 1 (6 parts by weight) were kneaded and extruded by means of a twin-screw extruder (trade name: PCM30; manufactured and sold by Ikegai Corporation, Japan) under conditions wherein the cylinder temperature was 220° C. and the screw revolution rate was 250 rpm, thereby obtaining a polymer composition in the form of pellets. In Comparative Example 3, a polymer composition was produced in substantially the same manner as in Example 8, except that a modified hydrogenated copolymer (i.e., polymer 1) was not used. In each of Example 8 and Comparative Example 3, the obtained polymer composition was subjected to injection molding to prepare a test specimen. Using the test specimen, the above-mentioned properties of the polymer composition were measured.

As a result, it was found that the composition produced in Example 8 using a modified hydrogenated copolymer exhibited excellent properties. Specifically, the composition produced in Example 8 had a tensile strength of 330 Kg/cm$^2$ and an elongation of 17%. On the other hand, the composition produced in Comparative Example 3 without the use of a modified hydrogenated copolymer exhibited poor properties. Specifically, the composition produced in Comparative Example 3 had a tensile strength of 270 Kg/cm$^2$ and an elongation of as low as 3%.

EXAMPLES 9 TO 11 AND COMPARATIVE EXAMPLES 4 TO 6

In Examples 9 to 11, resinous polymer compositions were produced using 20 parts by weight of polymer 2 as a modified hydrogenated copolymer and 80 parts by weight of a thermoplastic resin other than the modified hydrogenated copolymer. Specifically, a polyamide (trade name: Amilan CM1017; manufactured and sold by Toray Industries Inc., Japan), a polyester (trade name: Mitsui PET SA135; manufactured and sold by Mitsui Chemicals, Japan) and a polycarbonate (trade name: CALIBRE 301-15; manufactured and sold by SUMITOMO DOW LIMITED, Japan) were used as the thermoplastic resin in Examples 9, 10, and 11, respectively. The polymer 2 and the thermoplastic resin were kneaded and extruded by means of a twin-screw extruder (trade name: PCM30; manufactured and sold by Ikegai Corporation, Japan), thereby obtaining a polymer composition in the form of pellets. The extrusion was performed under conditions wherein the cylinder temperature was 260° C. (Examples 9 and 11) or 250° C. (Example 10) and the screw revolution rate was 100 rpm.

In Comparative Examples 4, 5 and 6, resinous polymer compositions were respectively produced in substantially the same manner as in Examples 9, 10 and 11, except that the modified hydrogenated copolymer (i.e., polymer 2) was changed to an unmodified hydrogenated copolymer. The unmodified hydrogenated copolymer was produced in substantially the same manner as in Example 2 for producing polymer 2, except that an unmodified unhydrogenated copolymer was not modified with a modifier.

In each of Examples 9 to 11 and Comparative Examples 4 to 6, the obtained resinous polymer composition was subjected to injection molding to prepare a test specimen. Using the prepared test specimen, the impact resistance of the polymer composition was measured. As a result, it found that the compositions produced in Examples 9 to 11 exhibited excellent impact resistance as compared to those of the compositions produced in Comparative Examples 4 to 6. Further, the modified hydrogenated copolymer exhibited excellent compatibility with other thermoplastic resins as compared to the unmodified hydrogenated copolymer used in the Comparative Examples.

III. Rubbery Polymer Composition

In Examples 12 to 18, rubbery polymer compositions (namely, compositions which exhibit properties possessed by rubbers) were produced.

The properties of the rubbery polymer compositions were measured and evaluated by the following methods.

III-1) 100% Modulus, Tensile Strength and Elongation at Break:

In accordance with JIS K 6251 (in which a dumbbell No. 3 is used), the 100% modulus, tensile strength and elongation at break were measured by means of a tensile tester (trade name: AGS-100D; manufactured and sold by Shimadzu Corporation, Japan) under conditions wherein the tensile rate was 500 mm/min.

III-2) Heat Resistance:

The heat resistance of a rubbery polymer composition was measured in terms of high temperature C-set (compression set). A compression set test was conducted at 70° C. for 22 hours in accordance with JIS K 6260. The smaller the amount of the compression set, the better the heat resistance.

III-3) Abrasion Resistance:

The abrasion resistance was measured in the same manner as in item I-11) above.

EXAMPLES 12 AND 13

In Examples 12 and 13, rubbery polymer compositions having formulations indicated in Table 2 below were produced, using the following component rubbery polymers.

| SEBS: | a hydrogenation product of a styrene/butadiene block copolymer (trade name: TUFTEC H1221; manufactured and sold by ASAHI KASEI CORPORATION, Japan); and |
|---|---|
| SEPS: | a hydrogenation product of a styrene/isoprene block copolymer (trade name: HYBRAR 7125; manufactured and sold by Kuraray Co., Ltd., Japan). |

In Examples 12 and 13, polymer 1 was used as a modified hydrogenated copolymer.

In each of Examples 12 and 13, polymer 1 (70 parts by weight) and a component rubbery polymer (30 parts by weight) were kneaded and extruded by means of a twin-screw extruder (trade name: PCM30; manufactured and sold by Ikegai Corporation, Japan) under conditions wherein the cylinder temperature was 230° C. and the screw revolution rate was 300 rpm, thereby obtaining a rubbery polymer composition in the form of pellets. The obtained rubbery polymer composition was subjected to compression molding, thereby obtaining a test specimen.

Using the test specimen, the tensile properties of the rubbery polymer composition were measured by the methods described in items I-10) and III-1) above. The results are shown in Table 2.

TABLE 2

|  |  |  | Ex. 12 | Ex. 13 |
|---|---|---|---|---|
| Formulation (part by weight) | Modified hydrogenated copolymer | Polymer 1 | 70 | 70 |
|  | Component rubbery polymer | SEBS | 30 | — |
|  |  | SEPS | — | 30 |
| Tensile properties | 100% modulus (kg/cm$^2$) |  | 30 | 45 |
|  | Tensile strength (kg/cm$^2$) |  | 180 | 170 |
|  | Elongation (%) |  | 600 | 500 |

EXAMPLES 14 TO 18

In Examples 14 to 18, rubbery polymer compositions having formulations indicated in Table 3 below were produced, using the following components (i.e., rubbery polymers, thermoplastic resins and optionally a rubber-softening agent).

<Component Rubbery Polymers>

SEBS-1: a hydrogenation product of a styrene/butadiene block copolymer (trade name: TUFTEC H1221; manufactured and sold by ASAHI KASEI CORPORATION, Japan);

SEBS-2: a hydrogenation product of a styrene/butadiene block copolymer (trade name: TUFTEC H1272; manufactured and sold by ASAHI KASEI CORPORATION, Japan);

| < Component thermoplastic resins > | |
|---|---|
| PP-1: | a random polypropylene (trade name: PC630A; manufactured and sold by SunAllomer Ltd., Japan) |
| PP-2: | a propylene homopolymer (trade name: PM801A; manufactured and sold by SunAllomer Ltd., Japan) |
| PPE: | a polyphenylene ether resin [poly(2,6-dimethyl-1,4-phenylene)ether having a reduced viscosity of 0.54 was prepared] |
| ABS: | an ABS resin (trade name: Stylac ABS121; manufactured and sold by ASAHI KASEI CORPORATION., Japan) |

<Rubber-Softening Agent>

A Paraffin Oil (Trade Name: Diana Process Oil PW-380; Manufactured and Sold by Idemitsu Kosan Co., Ltd., Japan)

In each of Examples 14 to 18, the modified hydrogenated polymer (polymer 1), the rubbery polymer (SEBS), the thermoplastic resin (PP, PPE or ABS) and optionally the rubber-softening agent were, respectively, used in amounts as indicated in Table 3, and kneaded and extruded by means of a twin-screw extruder (trade name: PCM30; manufactured and sold by Ikegai Corporation, Japan) under conditions wherein the cylinder temperature was 230° C. (in Examples 14, 15, 17 and 18) or 270° C. (in Example 16) and the screw revolution rate was 300 rpm, thereby obtaining a rubbery polymer composition in the form of pellets. The obtained composition was subjected to compression molding, thereby obtaining a test specimen having a thickness of 2 mm. Using the obtained test specimen, the properties of the composition were measured. The results are shown in Table 3.

TABLE 3

|  |  |  | Ex. 14 | Ex. 15 | Ex. 16 | Ex. 17 | Ex. 18 |
|---|---|---|---|---|---|---|---|
| Formulation (part by weight) | Modified hydrogenated copolymer | Polymer 1 | 30 | 70 | 70 | 30 | 30 |
|  | Rubbery polymer | SEBS-1 | 35 | — | — | — | — |
|  |  | SEBS-2 | — | — | — | 30 | 30 |
|  | Thermoplastic resin | PP-1 | 35 | — | — | 5 | 5 |
|  |  | PP-2 | — | 30 | — | — | — |
|  |  | PPE | — | — | 30 | 20 | — |
|  |  | ABS | — | — | — | — | 20 |
|  | Rubber-softening agent | Paraffin oil | — | — | — | 15 | 15 |
| Tensile properties | 100% modulus (kg/cm$^2$) |  | 54 | 110 | 110 | 25 | 24 |
|  | Tensile strength (kg/cm$^2$) |  | 140 | 145 | 210 | 100 | 60 |
|  | Elongation (%) |  | 700 | 500 | 320 | 450 | 700 |
| Heat resistance | Compression set (%) |  | 80 | nd* | nd* | 60 | 80 |
| Abrasion resistance | Color fastness rubbing test |  | ○ | ⊚ | ⊚ | ⊚ | ⊚ |

*"nd" means that the measurement was not conducted.

The composition obtained in Example 14 was subjected to extrusion molding using a film extrusion molding machine (i.e., an extrusion molding machine obtained by combining a T-die and a single-screw extruder), thereby obtaining a sheet (a test specimen) having a thickness of 0.2 mm. In the extrusion molding, for suppressing the blocking of the film, erucic acid amide and microcrystalline wax were incorporated into the composition in amounts of 1% by weight and 0.4% by weight, respectively, based on the weight of the composition. The obtained sheet had excellent abrasion resistance and, therefore, the rubbery polymer composition produced using the modified hydrogenated copolymer composition of the present invention is a material which can be advantageously used as a substitute material for a flexible vinyl chloride resin in the field of synthetic leathers.

Further, the rubbery polymer composition produced using the modified hydrogenated copolymer composition of the present invention, which has excellent abrasion resistance, can be advantageously used as a building material or an electric wire coating material.

EXAMPLE 19

A rubbery polymer composition having a formulation indicated in Table 4 was produced in the same manner as in Examples 14 to 18, and the properties of the obtained compositions were measured in the same manner as in Examples 14 to 18. The results are shown in Table 4.

TABLE 4

|  |  |  | Ex. 19 |
|---|---|---|---|
| Formulation (part by weight) | Modified hydrogenated copolymer | Polymer 1 | 30 |
|  | Rubbery polymer | SEBS-1 | 35 |
|  | Thermoplastic resin | PP-1 | 35 |
|  | Cross-linking agent | Peroxide* | 0.3 |
| Tensile properties | 100% modulus (kg/cm$^2$) |  | 50 |
|  | Tensile strength (kg/cm$^2$) |  | 85 |
|  | Elongation (%) |  | 1000 |
| Heat resistance | Compression set (%) |  | 80 |

*Peroxide: PERHEXA 25B (trade name; manufactured and sold by NOF Corporation, Japan)

IV. Flame Retardant Composition

In Example 20, a flame retardant resin composition was produced.

IV-1) Hardness:

In accordance with JIS K 6253, the hardness of a test specimen of the flame retardant composition was measured by means of a durometer (type A).

IV-2) Tensile Strength and Elongation at Break:

The tensile strength and elongation at break were measured in the same manner as in item III-1) above.

IV-3) Abrasion Resistance:

The abrasion resistance was measured in the same manner as in item I-11) above.

IV-4) Flame Retardancy:

The flame retardancy of the flame retardant composition was evaluated in accordance with UL94. Specifically, from the test specimen was cut out a rectangular sample (127 mm×12.7 mm). The rectangular sample was subjected to a flame retardancy test in accordance with UL94, and the flame retardancy of the composition was evaluated by the criteria prescribed in UL94.

EXAMPLE 20

Polymer 1 was used as a modified hydrogenated copolymer and magnesium hydroxide (trade name: KISUMA 5A; manufactured and sold by KYOWA CHEMICAL INDUSTRY Co., Ltd., Japan) was used as a flame retardant. Polymer 1 (40 parts by weight) and the magnesium hydroxide (60 parts by weight) were mixed together by means of a Henschel mixer. The resultant mixture was melt-kneaded and extruded by means of a twin-screw extruder (trade name: PCM30; manufactured and sold by Ikegai Corporation, Japan) under conditions wherein the cylinder temperature was 220° C. and the screw revolution rate was 250 rpm, thereby obtaining a flame retardant composition in the form of pellets. The obtained composition was subjected to compression molding to produce a sheet (test specimen) having a thickness of 2 mm. Using the test specimen, the properties of the flame retardant composition were measured. The results are shown in Table 5.

TABLE 5

|  |  | Example 20 |
|---|---|---|
| Formulation (part by weight) | Modified hydrogenated copolymer: polymer 1 | 40 |
|  | Flame retardant: Mg(OH)$_2$ | 60 |
| Properties | Hardness | 78 |
|  | Tensile strength (kg/cm$^2$) | 85 |
|  | Elongation at break (%) | 400 |
|  | Abrasion resistance | ⊚ |
|  | Flame retardancy | V-0 |

The flame retardant composition produced using the modified hydrogenated copolymer of the present invention can be advantageously used as a building material or an electric wire coating material, wherein such a material is required to exhibit excellent flame retardancy.

Further, with respect to the flame retardant composition produced in Example 20, the dynamic viscoelastic spectrum thereof was measured in the torsional mode (frequency: 1 Hz) using an ARES dynamic analyzer (trade name: ARES-2KFRTN1-FCO-STD; manufactured and sold by Rheometric Scientific FE, Japan). The dynamic viscoelastic spectrum is shown in FIG. 1.

As apparent from FIG. 1, the peak of the tan δ of the dynamic viscoelastic spectrum of the flame retardant composition produced in Example 20 was around room temperature. This means that the composition exhibits an excellent vibration-proof property (i.e., the ability to absorb or reduce vibrations) at around room temperature. Such composition exhibiting excellent vibration-proof property can be advantageously used as a vibration damping, soundproofing material and a building material.

EXAMPLES 21 AND 22

In Examples 21, a modified hydrogenated copolymer (polymer 10) was produced in substantially the same manner as in Example 1, except that N-(1,3-dimethylbutylidene)-3-(triethoxysilyl)-1-propaneamine (modifier M4) was used instead of modifier M1.

On the other hand, in Example 22, a modified hydrogenated copolymer (polymer 11) was produced in substantially the same manner as in Example 1, except that γ-glycidoxypropyl triethoxysilane (modifier M5) was used instead of modifier M1.

The properties of the produced modified hydrogenated copolymers were measured in the same manner as in Example 1. As a result, these modified hydrogenated copolymers (i.e., polymers 10 and 11) exhibited excellent properties which are comparable to those of polymer 1. In a DSC chart obtained with respect to each of polymers 10 and 11, no crystallization peak was observed.

Further, rubbery polymer compositions were produced in substantially the same manner as in Example 14 except that polymers 10 and 11 were individually used as a modified hydrogenated copolymer. Various properties of the produced rubbery polymer compositions were measured in the same manner as in Example 14. As a result, these polymer compositions exhibited excellent properties which are comparable to those of the polymer composition produced in Example 14.

EXAMPLE 23

A continuous polymerization was performed in substantially the same manner as in Example 1, except that the amounts of styrene and butadiene (monomers for copolymerization) and the amount of n-butyllithium were changed so as to produce an unmodified unhydrogenated copolymer (living polymer) having a styrene content of 62% by weight, a polystyrene block content (Os value) of 35% by weight and a vinyl bond content (as measured with respect to the butadiene monomer units in the copolymer) of 15 mol %. Next, using the produced unmodified unhydrogenated copolymer, a modified hydrogenated copolymer (polymer 12) was produced in the same manner as in Example 1 (i.e., modification, hydrogenation, addition of methanol, and addition of the stabilizer were conducted in the same manner as in Example 1). Polymer 12 had a weight average molecular weight of 130,000 and a molecular weight distribution of 2.2. In a DSC chart obtained with respect to polymer 12, no crystallization peak was observed.

EXAMPLE 24

A continuous polymerization was performed in substantially the same manner as in Example 2, except that the amounts of styrene and butadiene (monomers for copolymerization) and the amount of n-butyllithium were changed so as to produce an unmodified unhydrogenated copolymer (living polymer) having a styrene content of 85% by weight, a polystyrene block content (Os value) of 13% by weight and a vinyl bond content (as measured with respect to the butadiene monomer units in the copolymer) of 18 mol %. Next, using the produced unmodified unhydrogenated copolymer, a modified hydrogenated copolymer (polymer 13) was produced in the same manner as in Example 2 (i.e., modification, hydrogenation, addition of methanol, and addition of the stabilizer were conducted in the same manner as in Example 2). Polymer 13 had a weight average molecular weight of 350,000 and a molecular weight distribution of 2.0. In a DSC chart obtained with respect to polymer 13, no crystallization peak was observed.

V. Multilayer Film

In Examples 25 and 26, multilayer films were produced using polymer 1 and the following components.

| PE: | L2340 (trade name; manufactured and sold by Asahi Kasei Corporation, Japan); and |
|---|---|
| PP: | F-226D (trade name; manufactured and sold by Grand Polymer Co., Ltd., Japan. |

EXAMPLE 25

Using a three-layer film extrusion molding machine (i.e. an extrusion molding machine obtained by combining a T-die for three-layer films and a single-screw extruder), two three-layer films (first and second films) were produced. Each of the produced three-layer films had a thickness of 60 μm and comprised a first layer of the above-mentioned PE, a second layer of polymer 1 and a third layer of the PE (i.e., the film had a PE/polymer 1/PE layer structure), wherein the PE/polymer 1/PE thickness ratio was 1/3/1. The first film was laid upon the second film and, then, the two films were heat sealed at 130° C. and at a width of 15 mm. The heat sealed films were subjected to the peel strength test. As a result, it was found that the peel strength was 1 kg, which shows that the multilayer film comprising a polymer 1 layer has a satisfactory sealability.

EXAMPLE 26

In substantially the same manner as in Example 25, two two-layer films (first and second films) were produced. Each of the first and second films had a thickness of 30 μm, and comprised a first layer of the above-mentioned PP and a second layer of polymer 1 (i.e., each of the films had a PP/polymer 1 layer structure), wherein, in each of the films, the PP/polymer 1 layer thickness ratio was 1/1. The first film was laid upon the second film so that the polymer 1 layer of the first film and the polymer 1 layer of the second film were contacted with each other. Then, the polymer 1 layer of the first film and the polymer 1 layer of the second film were heat sealed at 120° C. and at a width of 15 mm. The heat sealed films were subjected to the peel strength test. As a result, it was found that the peel strength was 3 kg, which shows that polymer 1 has a satisfactory sealability.

VI. Asphalt Composition

In Example 27, an asphalt composition was produced.

The properties of the asphalt composition were measured by the following methods.

VI-1) Softening Point (Ring-and-Ball Method):

The softening point of the asphalt composition was measured in accordance with JIS K 2207. Specifically, the ring of a ring-and-ball apparatus as defined in JIS K 2207 (which comprises a ring, and a ring-supporting member having a bottom plate placed several centimeters below the ring) was filled with a sample of the asphalt composition so as to have the sample asphalt composition securely held in the hole of the ring. The ring-and-ball apparatus was immersed in glycerol, and the ring was maintained level in glycerol. Then, a ball having a weight of 3.5 g was placed at the center of the ring filled with the sample. The temperature of the glycerol was elevated at a rate of 5° C./min, so as to soften the sample gradually. The central portion of the softening sample was gradually sagged under the weight of the ball, and the temperature (softening point) at which the sagged central portion of the sample reaches the bottom plate was measured.

VI-2) Elongation:

The elongation of an asphalt composition was measured in accordance with JIS K 2207. Specifically, a sample of the asphalt composition was poured into a mold to shape the sample in a prescribed form. Then, the shaped sample was placed in a thermostatic vessel and the temperature of the sample was maintained at 15° C. The resultant sample was pulled at a rate of 5 cm/min, and the elongation of the sample when the sample was broken was measured.

VI-3) High Temperature Storage Stability:

An aluminum can having an internal diameter of 50 mm and a height of 130 mm was fully filled with an asphalt composition just after the production thereof. The aluminum can containing the asphalt composition was placed in an oven and heated at 180° C. for 24 hours. The aluminum can was taken out from the oven and allowed to stand so that the asphalt composition in the aluminum can cooled to room temperature. As samples, upper and lower portions of the resultant solidified asphalt composition, which were a 4 cm-thick lower layer at a lower end portion and a 4 cm-thick upper layer at an upper end portion, were taken by cutting. The softening points of both samples were measured. The difference in softening point between the samples was used as a yardstick for high temperature storage stability of the asphalt composition. The smaller the difference, the better the high temperature storage stability of the asphalt composition.

EXAMPLE 27

In Example 27, an asphalt composition having a formulation indicated in Table 6 was produced.

Specifically, 400 g of straight asphalt 60-80 (manufactured and sold by NIPPON OIL COMPANY, LIMITED, Japan) was fed to a metal can having a volume of 750 ml. The metal can containing the straight asphalt was put into an oil bath having a temperature of 180° C. so that the straight asphalt was satisfactorily heated, thereby melting the asphalt. Then, to the resultant molten asphalt was added a prescribed amount of the modified hydrogenated copolymer bit by bit while stirring. After completion of addition of the modified hydrogenated copolymer, the resultant mixture was stirred at a revolution rate of 5,000 rpm for 90 minutes, thereby obtaining an asphalt composition.

The properties of the asphalt composition are shown in Table 6.

TABLE 6

| | Modified hydrogenated copolymer | | Amount of asphalt (part by weight) | Softening point (° C.) | Elongation (cm) | High temperature storage stability (difference in softening point) (° C.) |
|---|---|---|---|---|---|---|
| | Type | Amount (part by weight) | | | | |
| Ex. 27 | Polymer 1 | 8.5 | 100 | 83 | 35 | 4 |

As apparent from Table 6, the asphalt composition of the present invention exhibits an excellent balance of the softening point, the elongation and the high temperature storage stability.

VII. Adhesive Composition

In Example 28, an adhesive composition was produced. The components used for producing the adhesive composition and the method for measuring the various properties thereof are as follows.

(a) Adhesion Property Imparting Agent:

Clearon P-105 (trade name; manufactured and sold by YASUHARA CHEMICAL CO., LTD., Japan)

(b) Softening Agent:

Diana process oil PW-90 (trade name; manufactured and sold by Idemitsu Kosan Co., Ltd., Japan)

VII-1) Melt Viscosity (cP):

The melt viscosity of the adhesive composition was measured at 180° C. by means of a Brookfield viscometer.

VII-2) Softening Point (Ring-and-Ball Method):

The softening point of the adhesive composition was measured in accordance with JIS K 2207. Specifically, the ring of a ring-and-ball apparatus as defined in JIS K 2207 (which comprises a ring, and a ring-supporting member having a bottom plate placed several centimeters below the ring) was filled with a sample of the adhesive composition so as to have the sample adhesive composition securely held in the hole of the ring. The ring-and-ball apparatus was immersed in water, and the ring was maintained level in water. Then, a ball having a weight of 3.5 g was placed at the center of the ring filled with the sample. The temperature of the water was elevated at a rate of 5° C./min, so as to soften the sample gradually. The central portion of the softening sample was gradually sagged under the weight of the ball, and the temperature (softening point) at which the sagged central portion of the sample reached the bottom plate was measured.

VII-3) Melt Viscosity Change Ratio:

The melt viscosity change ratio was measured by means of a Brookfield viscometer. The melt viscosity of the adhesive composition just after kneading at 180° C. was defined as $\eta_0$ and the melt viscosity of the adhesive composition which had been allowed to stand still at 180° C. for 48 hours was defined as $\eta_1$. The melt viscosity change ratio was calculated by the formula below and used as a yardstick for heat stability.

Melt viscosity change ratio (%)={$(\eta^1-\eta_0)/\eta_0$}×100.

VII-4) Adhesiveness:

The adhesive composition in a molten state was coated on a polyester film by means of an applicator, thereby forming an adhesive tape sample having a 50 μm-thick adhesive composition layer. Using the adhesive tape sample, the adhesiveness of the adhesive composition was measured as follows.

The adhesive tape sample having a width of 25 mm was attached to a stainless board and, then, peeled therefrom at a peeling rate of 300 mm/min to measure a peel strength (peel angle: 180°).

EXAMPLE 28

Polymer 1 (100 parts by weight), the adhesion property imparting agent (300 parts by weight) and the softening agent (100 parts by weight) were melt-kneaded at 180° C. for 2 hours by means of a vessel which has a volume of 1 liter and is equipped with a stirrer, thereby obtaining a hot-melt type adhesive composition. To the adhesive composition was added, as a stabilizer, 2-t-butyl-6-(3-t-butyl-2-hydroxy-5-methylbenzyl)-4-methylphenylacrylate in an amount of 1 part by weight, relative to 100 parts by weight of polymer 1.

With respect to the adhesive composition, the melt viscosity (cP at 180° C.) was 13,000 (cP), the softening point was 118° C., the melt viscosity change ratio (%) was 8.0% and the adhesion strength was 1,700 gf/10 mm.

INDUSTRIAL APPLICABILITY

The modified hydrogenated copolymer of the present invention not only has excellent flexibility, impact resilience, scratch resistance, abrasion resistance and anti-blocking property, but also exhibits excellent properties of adhesion to other resins and metals. Further, the modified hydrogenated copolymer composition obtained by blending the above-mentioned modified hydrogenated copolymer with a thermoplastic resin and/or rubbery polymer which are/is other than the modified hydrogenated copolymer has excellent properties, such as high tensile strength and abrasion resistance. By virtue of these excellent properties, each of the modified hydrogenated copolymer and modified hydrogenated copolymer composition of the present invention can be advantageously used as a reinforcing filler-containing composition, a foam, a multilayer film or multilayer sheet, a building material, a vibration damping, soundproofing material, an electric wire coating material, a high frequency welding composition, a slush molding material, an adhesive composition, an asphalt composition and the like. In addition, various shaped articles obtained by subjecting the modified hydrogenated copolymer, the modified hydrogenated copolymer composition or the above-mentioned composition (other than the above-mentioned modified hydrogenated copolymer composition) of the present invention to injection molding, extrusion molding or the like can be advantageously used as a material for parts of automobiles (automobile interior and exterior parts), various containers (such as food packaging), household electrical appliances, medical appliances, industrial components, toys and the like.

The invention claimed is:

1. A modified hydrogenated copolymer comprising:
    a hydrogenated copolymer obtained by hydrogenating an unhydrogenated copolymer comprising conjugated diene monomer units and vinyl aromatic monomer units, said unhydrogenated copolymer having at least one polymer block (H) of said vinyl aromatic monomer units, and
    a functional group-containing modifier group bonded to said hydrogenated copolymer,
    said modified hydrogenated copolymer having the following characteristics (1) to (4):
    (1) a content of said vinyl aromatic monomer units of from more than 60% by weight to less than 90% by weight, based on the weight of said hydrogenated copolymer,
    (2) a content of said polymer block (H) of from 0.1 to 40% by weight, based on the weight of said unhydrogenated copolymer,
    (3) a weight average molecular weight of from more than 100,000 to 1,000,000, and
    (4) a hydrogenation ratio of 70% or more, as measured with respect to the double bonds in said conjugated diene monomer units.

2. The modified hydrogenated copolymer according to claim 1, which is represented by a formula selected from the group consisting of the following formulae (I) to (V):

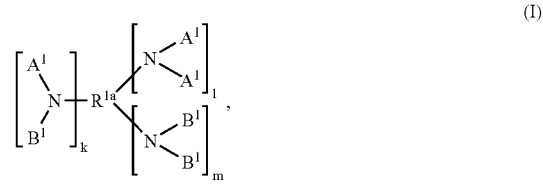

and

wherein:

$A^1$ represents a unit which is represented by any one of the following formulae (a-1) and (b-1):

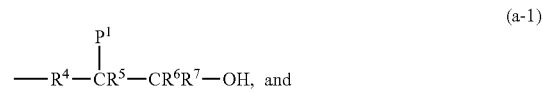

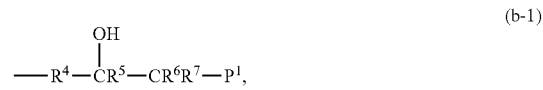

$B^1$ represents a unit which is represented by the following formula (c-1):

$C^1$ represents a unit which is represented by any one of the following formulae (d-1) and (e-1):

$D^1$ represents a unit which is represented by the following formula (f-1):

$$—R^8—NHR^3, \quad (f\text{-}1)$$

$E^1$ represents a unit which is represented by the following formula (g-1):

$$—R^9—P^1, \quad (g\text{-}1)$$

and $F^1$ represents a unit which is represented by any one of the following formulae (h-1) to (j-1):

wherein, in the formulae (I) to (III) and (a-1) to (j-1):

N represents a nitrogen atom, Si represents a silicon atom, O represents an oxygen atom, C represents a carbon atom, and H represents a hydrogen atom, $P^1$ represents said hydrogenated copolymer, each of $R^{1a}$, $R^{1b}$, $R^3$, $R^4$, $R^8$ to $R^{10}$ and $R^{13}$ to $R^{15}$ independently represents a $C_1$-$C_{48}$ hydrocarbon group and optionally independently has at least one functional group selected from the group consisting of a hydroxyl group, an epoxy group, an amino group, a silanol group and a $C_1$-$C_{24}$ alkoxysilane group, each of $R^2$ and $R^{11}$ independently represents a $C_1$-$C_{48}$ hydrocarbon group, each of $R^5$ to $R^7$ and $R^{12}$ independently represents a hydrogen atom or a $C_1$-$C_{48}$ hydrocarbon group, wherein each of $R^{1a}$, $R^{1b}$, $R^2$ to $R^4$ and $R^8$ to $R^{15}$ optionally independently has bonded thereto at least one atom selected from the group consisting of an oxygen atom, a nitrogen atom, a sulfur atom and a silicon atom, said at least one atom being present in a linkage other than a hydroxyl group, an epoxy group, an amino group, a silanol group and an alkoxysilane group, and each of k, l, m and o is independently an integer of 0 or more, provided that both k and l are not simultaneously 0, and n is an integer of 1 or more.

3. The modified hydrogenated copolymer according to claim 1, which exhibits substantially no crystallization peak observed at −50 to 100° C. in a differential scanning calorimetry (DSC) chart obtained with respect to said modified hydrogenated copolymer.

4. The modified hydrogenated copolymer according to claim 1, which has a molecular weight distribution of from 1.5 to 5.0.

5. The modified hydrogenated copolymer according to claim 2, which is represented by the formula (I).

6. The modified hydrogenated copolymer according to claim 2, which is represented by the formula (II).

7. The modified hydrogenated copolymer according to claim 2, which is represented by the formula (III).

8. The modified hydrogenated copolymer according to claim 2, which is represented by the formula (IV).

9. The modified hydrogenated copolymer according to claim 2, which is represented by the formula (V).

10. The modified hydrogenated copolymer according to any one of claims 1 to 4, which is a foam.

11. The modified hydrogenated copolymer according to any one of claims 1 to 4, which is a shaped article.

12. The modified hydrogenated copolymer according to claim 11, which is a single-layer film, a single-layer sheet, multilayer film having at least one layer of said modified hydrogenated copolymer, or a multilayer sheet having at least one layer of said modified hydrogenated copolymer.

13. The modified hydrogenated copolymer according to claim 11, which is a shaped article produced by a method selected from the group consisting of an extrusion molding, an injection molding, a blow molding, an air-pressure molding, a vacuum molding, a foam molding, a multilayer extrusion molding, effected for forming a shaped article having at least one layer of a said modified hydrogenated copolymer, a multilayer injection molding, effected for forming a shaped article having at least one layer of a said modified hydrogenated copolymer, a high frequency weld molding, a slush molding and a calender molding.

14. The modified hydrogenated copolymer according to any one of claims 1 to 4, which is a building material, a vibration damping, soundproofing material or an electric wire coating material.

15. A crosslinked, modified hydrogenated copolymer obtained by subjecting the modified hydrogenated copolymer of any one of claims 1 to 4 to a crosslinking reaction in the presence of a vulcanizing agent.

16. A modified hydrogenated copolymer composition comprising:

1 to 99 parts by weight, relative to 100 parts by weight of the total of components (a) and (b), of (a) the modified hydrogenated copolymer of any one of claims 1 to 4, and 99 to 1 part by weight, relative to 100 parts by weight of the total of components (a) and (b), of (b) at least one polymer selected from the group consisting of a thermoplastic resin other than said modified hydrogenated copolymer (a) and a rubbery polymer other than said modified hydrogenated copolymer (a).

17. The modified hydrogenated copolymer composition according to claim 16, which is a foam.

18. The modified hydrogenated copolymer composition according to claim 16, which is a shaped article.

19. The modified hydrogenated copolymer composition according to claim 18, which is a single-layer film, a single-layer sheet, a multilayer film having at least one layer of a said modified hydrogenated copolymer composition, or a multilayer sheet having at least one layer of a said modified hydrogenated copolymer composition.

20. The modified hydrogenated copolymer composition according to claim 18, which is a shaped article produced by a method selected from the group consisting of an extrusion molding, an injection molding, a blow molding, an air-pressure molding, a vacuum molding, a foam molding, a multilayer extrusion molding, effected for forming a shaped article having at least one layer of a said modified hydrogenated copolymer composition, a multilayer injection molding effected for forming a shaped article having at least one layer of a said modified hydrogenated copolymer composition, a high frequency weld molding, a slush molding and a calender molding.

21. The modified hydrogenated copolymer composition according to claim 16, which is a building material, a vibration damping, soundproofing material or an electric wire coating material.

22. A crosslinked, modified hydrogenated copolymer composition obtained by subjecting the modified hydrogenated copolymer composition of claim 16 to a crosslinking reaction in the presence of a vulcanizing agent.

* * * * *